(12) United States Patent
Holalakere Sreenivasa Rao

(10) Patent No.: US 11,793,251 B2
(45) Date of Patent: Oct. 24, 2023

(54) DONNING STATION FOR PERSONAL PROTECTIVE EQUIPMENT

(71) Applicant: Anoop Kumar Holalakere Sreenivasa Rao, Albuquerque, NM (US)

(72) Inventor: Anoop Kumar Holalakere Sreenivasa Rao, Albuquerque, NM (US)

(73) Assignee: EXPEDONN LLC, Albuquerque, NM (US)

( * ) Notice: Subject to any disclaimer, the term of this patent is extended or adjusted under 35 U.S.C. 154(b) by 0 days.

(21) Appl. No.: 17/816,675

(22) Filed: Aug. 1, 2022

(65) Prior Publication Data
US 2023/0033310 A1     Feb. 2, 2023

Related U.S. Application Data

(63) Continuation-in-part of application No. 17/548,024, filed on Dec. 10, 2021, now Pat. No. 11,470,893.

(60) Provisional application No. 63/227,440, filed on Jul. 30, 2021.

(51) Int. Cl.
*A41D 13/12*     (2006.01)
*B25J 11/00*     (2006.01)

(52) U.S. Cl.
CPC ................ *A41D 13/129* (2013.01); *B25J 11/008* (2013.01)

(58) Field of Classification Search
CPC ...... A41D 13/129; A41D 13/12; B25J 11/008; B25J 11/00; B25J 11/009; A47G 25/90; A47G 25/904
See application file for complete search history.

(56) References Cited

U.S. PATENT DOCUMENTS

| | | | |
|---|---|---|---|
| 895,510 A | 8/1908 | Snellenburg | |
| 1,989,309 A | 1/1935 | Fowler | |
| 2,490,477 A | 12/1949 | Emilie | |
| 2,756,430 A * | 7/1956 | West | A41D 13/04 206/820 |
| 3,218,649 A | 11/1965 | Ricter | |
| 3,230,546 A | 1/1966 | Sabee | |
| 3,311,112 A | 3/1967 | Jean | |
| 3,359,569 A | 12/1967 | Rotanz et al. | |

(Continued)

FOREIGN PATENT DOCUMENTS

| | | |
|---|---|---|
| CN | 210353339 U | 4/2020 |
| DE | 102018113366 A1 | 12/2019 |

(Continued)

OTHER PUBLICATIONS

International Search Report for International Patent Application No. PCT/US2022/074390 dated Dec. 14, 2022, 4 pages.

*Primary Examiner* — Ismael Izaguirre
(74) *Attorney, Agent, or Firm* — Dorsey & Whitney LLP

(57) ABSTRACT

A medical gown includes a main body having a neck edge, a first side edge, and a second side edge. The first side edge may extend from the neck edge. The second side edge may extend from the neck edge, opposite the first side edge. The neck edge may define a neck engagement feature between the first and second side edges. The medical gown may further include a first strap feature coupled with the main body and defining a first loop with the first side edge. The medical gown may further include a second strap feature coupled with the main body and defining a second loop with the second side edge.

20 Claims, 44 Drawing Sheets

(56) References Cited

U.S. PATENT DOCUMENTS

| | | | |
|---|---|---|---|
| 3,721,999 | A | 3/1973 | Goya et al. |
| 4,000,521 | A | 1/1977 | Zoephel et al. |
| 4,214,320 | A | 7/1980 | Belkin |
| 4,215,434 | A | 8/1980 | Barron |
| 4,254,341 | A * | 3/1981 | Herr et al. ............ A61B 6/447 250/519.1 |
| 4,255,818 | A | 3/1981 | Crowley et al. |
| 4,384,370 | A | 5/1983 | Singer |
| 4,558,468 | A | 12/1985 | Landry et al. |
| 4,674,132 | A | 6/1987 | Stein et al. |
| 5,142,704 | A | 9/1992 | Viemeister et al. |
| 5,154,691 | A | 10/1992 | Box et al. |
| 5,367,710 | A | 11/1994 | Karmin |
| 5,624,154 | A * | 4/1997 | Kishi .................... A61B 46/10 297/188.2 |
| 5,836,310 | A | 11/1998 | Winters et al. |
| 5,862,525 | A | 1/1999 | Tankersley et al. |
| 5,867,825 | A | 2/1999 | Scheerer |
| 6,421,833 | B1 | 7/2002 | Khanamirian et al. |
| 7,462,138 | B2 * | 12/2008 | Shetty et al. .......... A61H 3/008 482/69 |
| 7,546,643 | B1 | 6/2009 | De La Rotta |
| 7,549,179 | B1 | 6/2009 | Saied |
| D604,477 | S | 11/2009 | Stafstrom |
| 8,067,759 | B1 | 11/2011 | Swartz et al. |
| 8,146,175 | B2 | 4/2012 | Otenbaker et al. |
| 8,332,965 | B1 | 12/2012 | Ryer |
| 8,550,314 | B2 | 10/2013 | Kelly et al. |
| 8,608,022 | B1 * | 12/2013 | Kory ..................... A47G 25/90 221/33 |
| 8,960,493 | B1 | 2/2015 | Dennison et al. |
| 9,078,647 | B2 | 7/2015 | Dennison et al. |
| 9,687,032 | B2 | 6/2017 | McBride et al. |
| 9,861,537 | B2 | 1/2018 | Louwrens |
| 10,034,566 | B1 | 7/2018 | Shin et al. |
| 10,231,496 | B1 | 3/2019 | Glassner |
| 10,292,517 | B1 | 5/2019 | Lawver |
| 10,334,895 | B1 | 7/2019 | Levine |
| 11,116,263 | B2 | 9/2021 | Czajka et al. |
| 11,470,893 | B1 | 10/2022 | Holalakere Sreenivasa Rao |
| 2003/0003844 | A1 | 1/2003 | Jones et al. |
| 2006/0049199 | A1 | 3/2006 | West |
| 2007/0138415 | A1 | 6/2007 | Rees |
| 2009/0165186 | A1 | 7/2009 | Mijares et al. |
| 2009/0256044 | A1 | 10/2009 | Miller et al. |
| 2010/0064414 | A1 | 3/2010 | Kemper |
| 2012/0280004 | A1 | 11/2012 | Huang |
| 2013/0036526 | A1 | 2/2013 | Rashman |
| 2013/0105511 | A1 * | 5/2013 | Graneto, III ........... B65D 85/18 493/405 |
| 2013/0318682 | A1 | 12/2013 | Graneto, III |
| 2013/0318693 | A1 | 12/2013 | Mcbride et al. |
| 2015/0135397 | A1 | 5/2015 | Levine |
| 2015/0157064 | A1 | 6/2015 | Inoue et al. |
| 2016/0058078 | A1 | 3/2016 | Monir |
| 2017/0265537 | A1 | 9/2017 | Audet et al. |
| 2018/0192713 | A1 | 7/2018 | Genender et al. |
| 2018/0228227 | A1 | 8/2018 | Dieu |
| 2018/0343940 | A1 | 12/2018 | Genender et al. |
| 2018/0368501 | A1 | 12/2018 | Freeman |
| 2019/0343198 | A1 | 11/2019 | Palomo et al. |
| 2021/0077321 | A1 | 3/2021 | Louwrens |
| 2021/0169158 | A1 | 6/2021 | Mithani et al. |
| 2022/0047018 | A1 | 2/2022 | Koos |
| 2022/0105370 | A1 | 4/2022 | Tabbara et al. |

FOREIGN PATENT DOCUMENTS

| | | | | |
|---|---|---|---|---|
| GB | 1437831 | A * | 6/1976 | .............. A47F 1/08 |
| GB | 2532241 | A * | 5/2016 | .......... B65D 83/0817 |

* cited by examiner

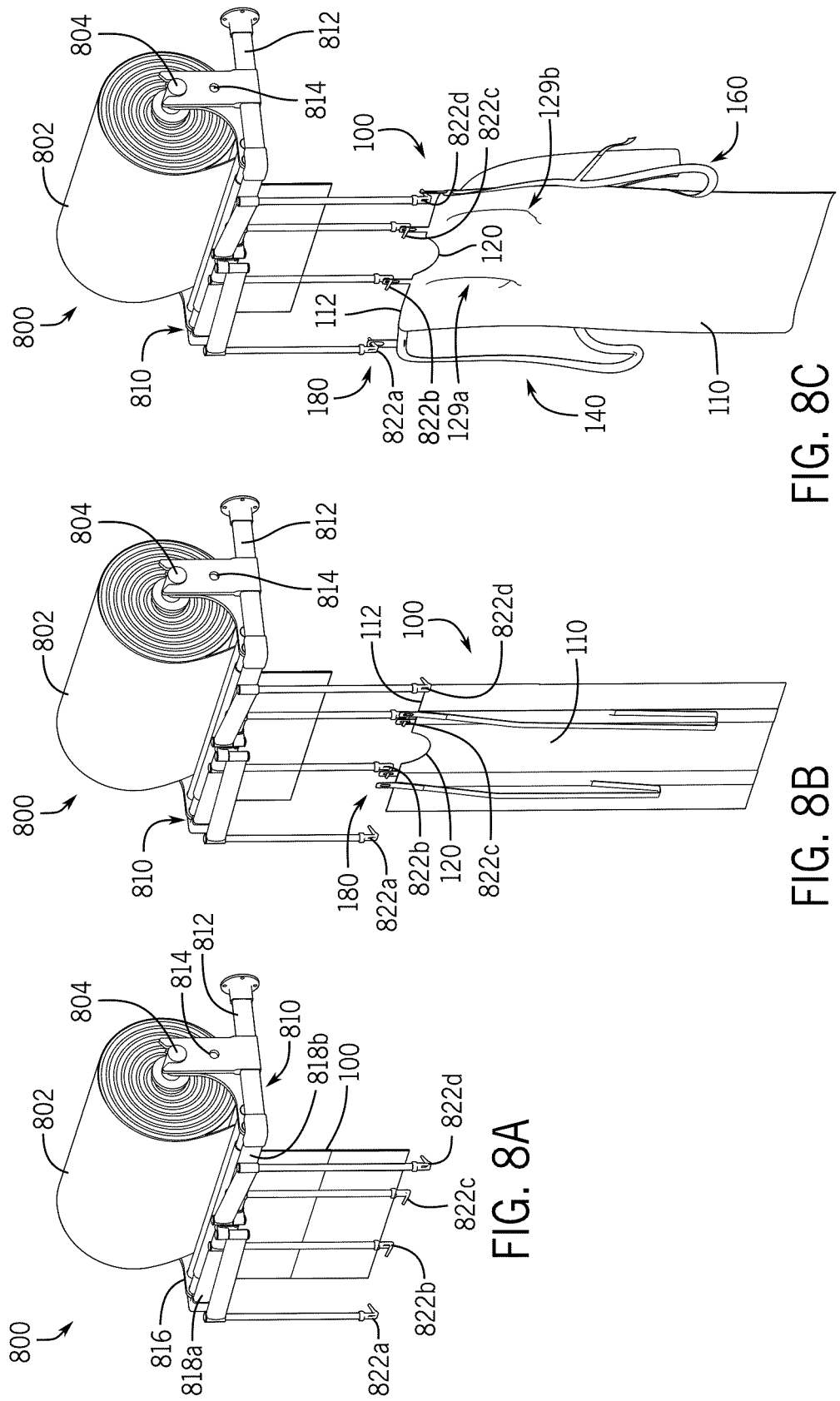

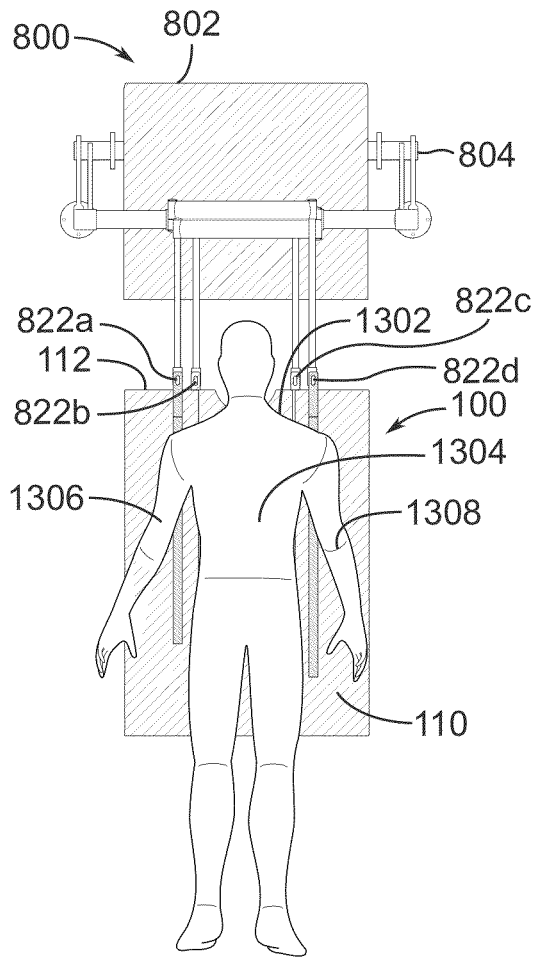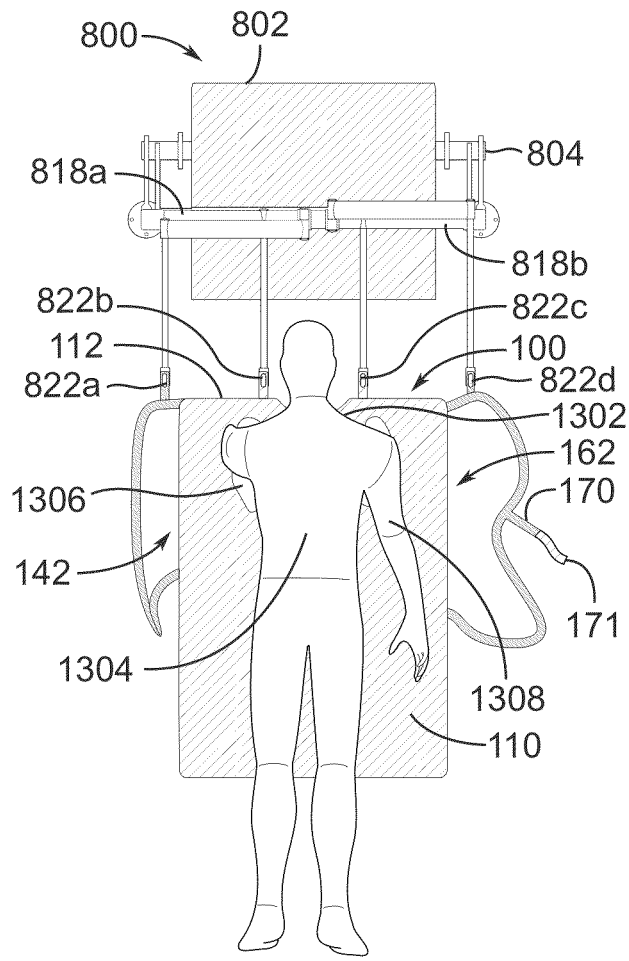
FIG. 13A
FIG. 14A
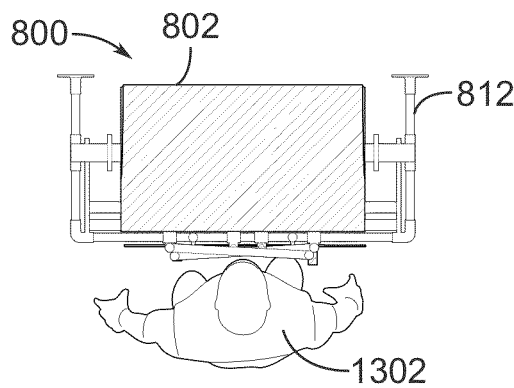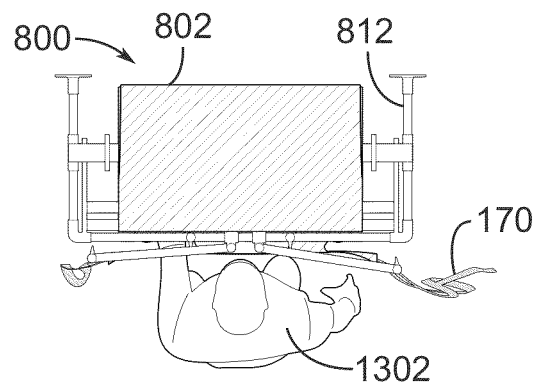
FIG. 13B
FIG. 14B

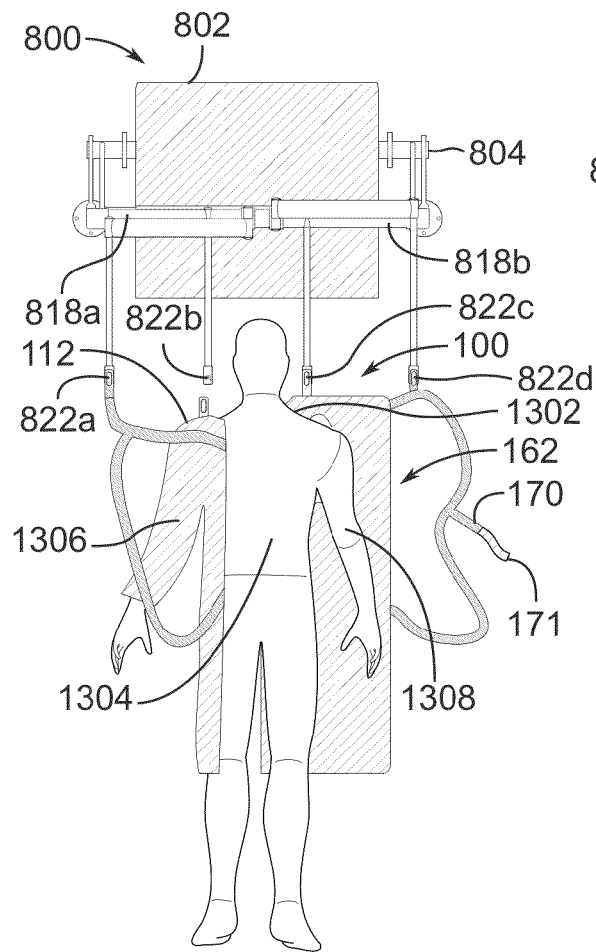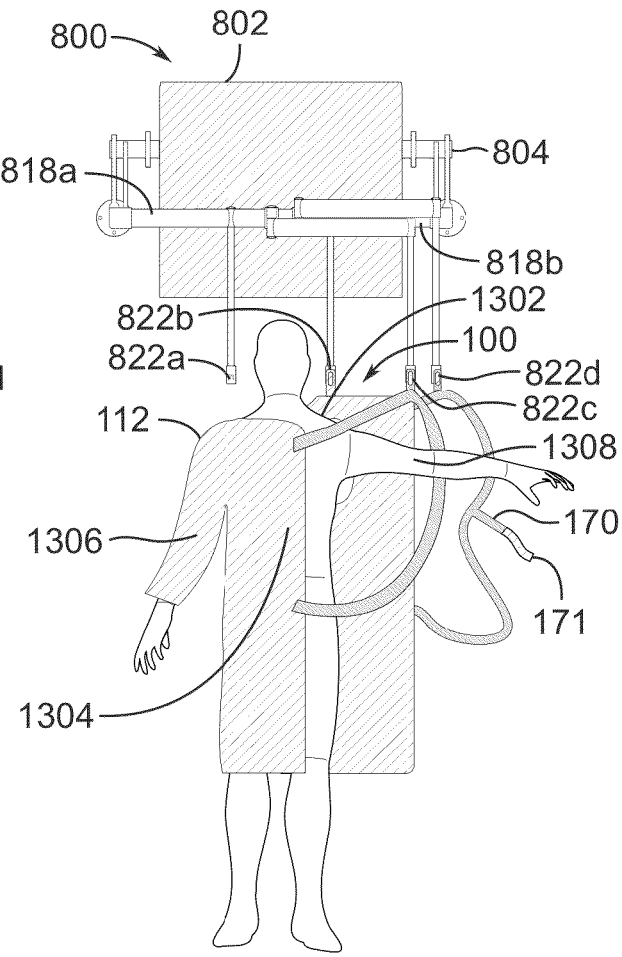
FIG. 15A
FIG. 16A
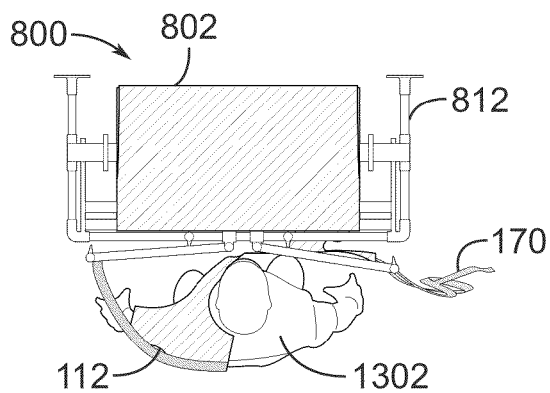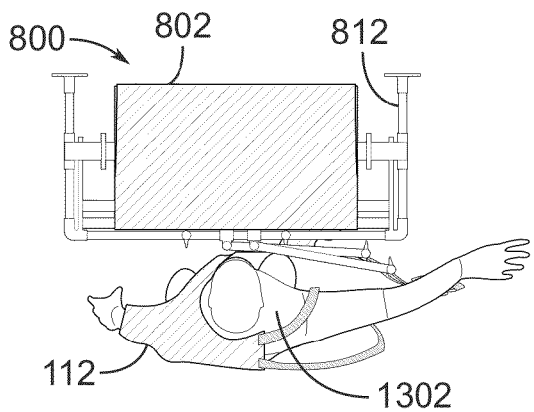
FIG. 15B
FIG. 16B

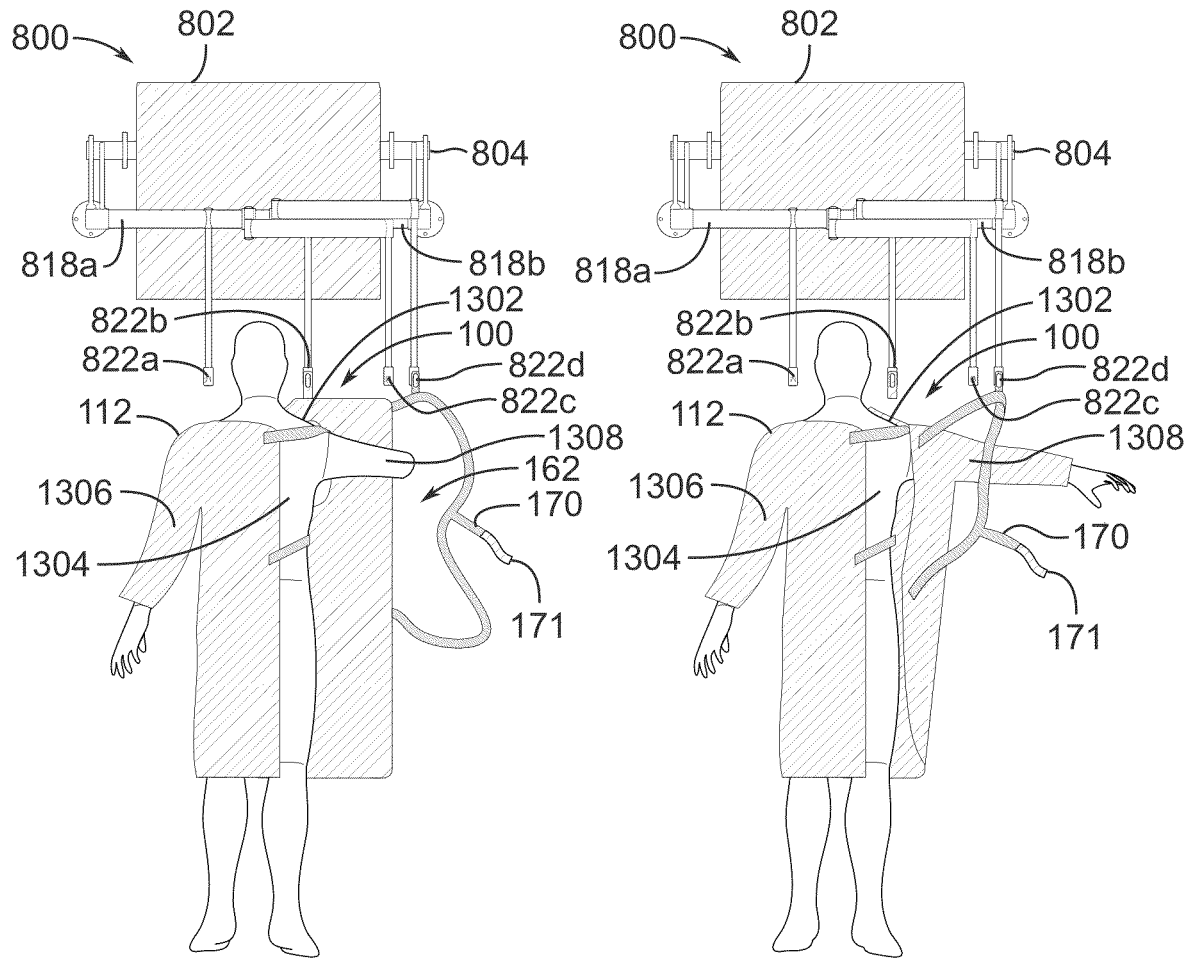
FIG. 17A    FIG. 18A
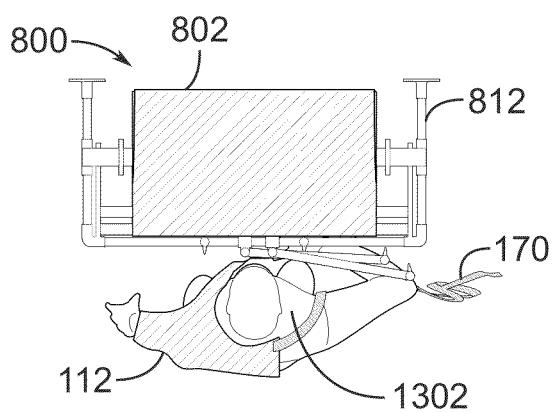 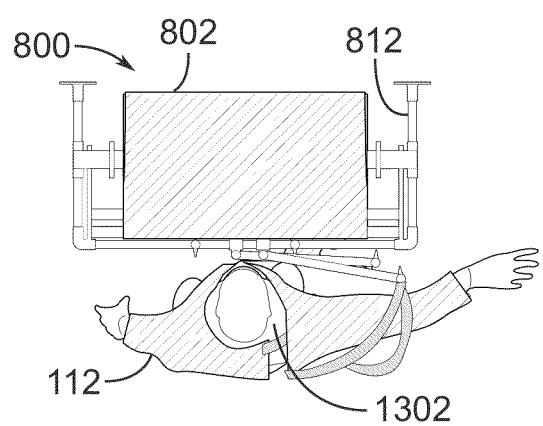
FIG. 17B    FIG. 18B

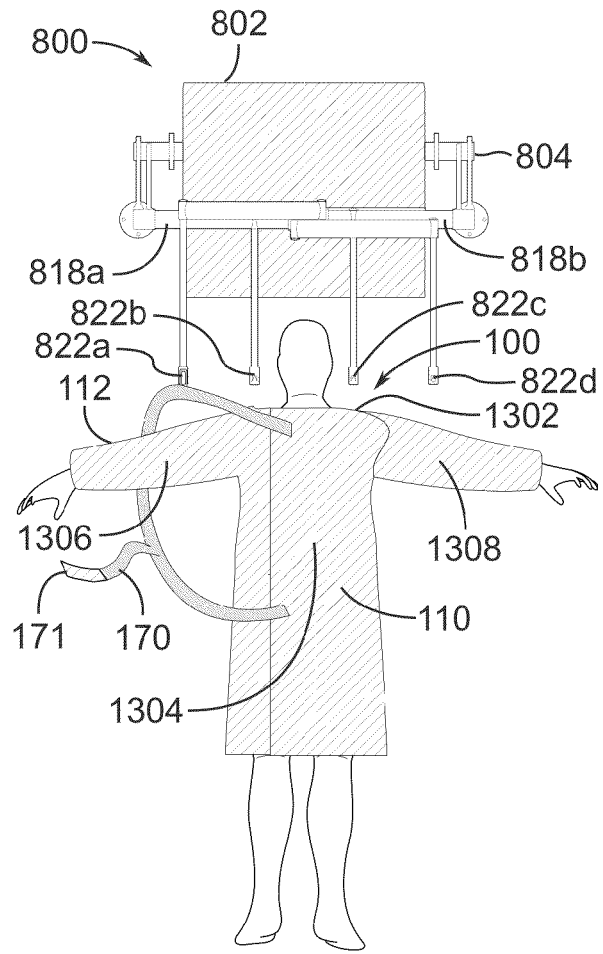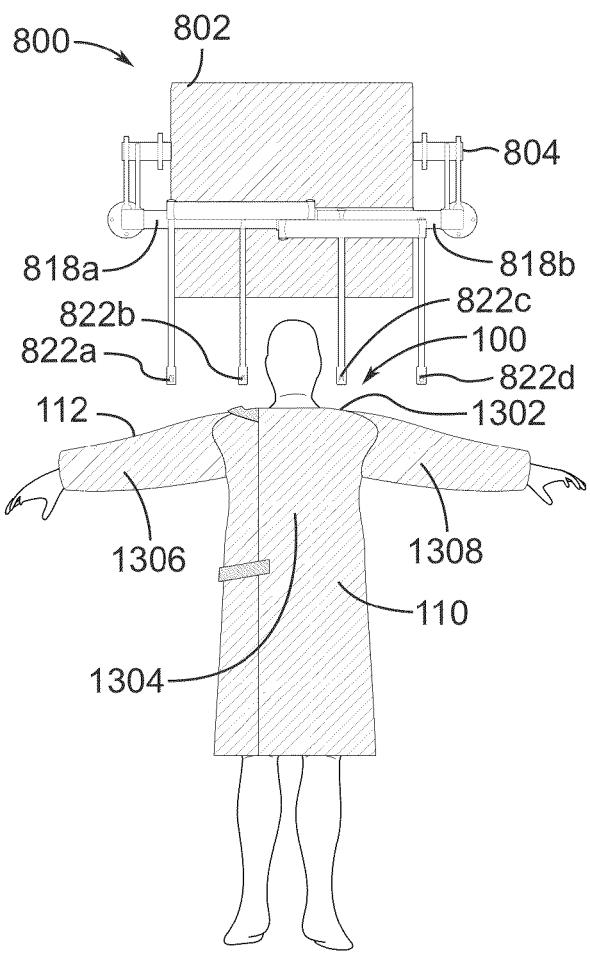
FIG. 19A
FIG. 20A
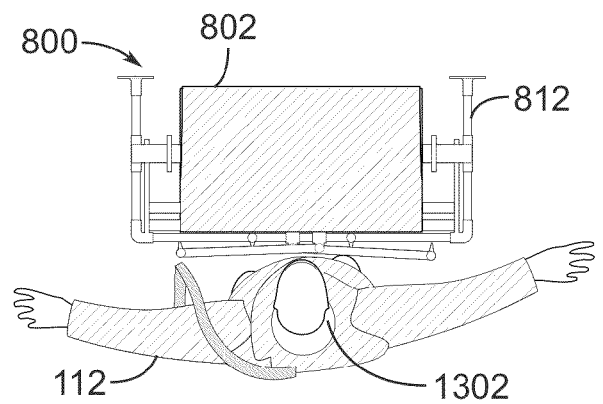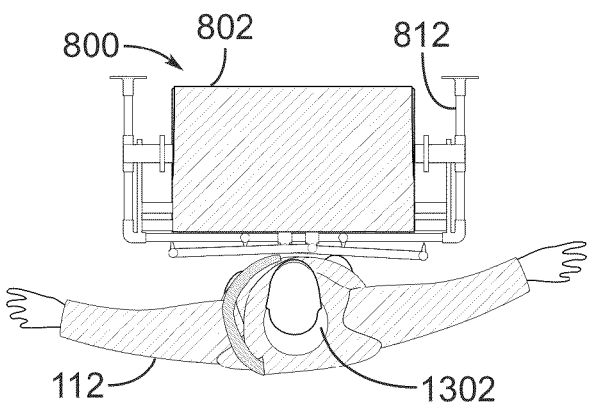
FIG. 19B
FIG. 20B

DONNING STATION FOR PERSONAL PROTECTIVE EQUIPMENT

CROSS-REFERENCE TO RELATED APPLICATIONS

This application is a continuation-in-part of U.S. Pat. Application No. 17/548,024, filed on Dec. 10, 2021, and entitled "Medical Gown, Packaging of Same, and Methods For Expedited Donning," and claims the benefit of priority pursuant to 35 U.S.C. §119(e) of U.S. Provisional Application No. 63/227,440, filed Jul. 30, 2021, and entitled "Donning Station For Personal Protective Equipment," both of which are hereby incorporated by reference in their entireties for all purposes.

FIELD

The described examples relate generally to personal protective equipment, methods of donning, and associated devices and systems.

BACKGROUND

Medical professionals, including those in research, examination, and treatment may be required, upon entering a given area (laboratory, patient room, examination room, surgery suite, etc.), to protect themselves and/or others located in the same area. In many cases, to protect themselves and others, the medical professionals are required to don personal protective equipment (PPE) before entering those areas. Finding, selecting, and donning PPE may be a slow, time-consuming, difficult, and/or inefficient process requiring the professional to search various locations for the needed item, the proper size, as well as un-package the item, unfurl/spread-out the item, don the item, and/or fasten the item. As such, there is a need for systems and techniques to facilitate PPE donning.

SUMMARY

Examples of the present invention are directed to medical gowns, packagings of same, and methods for expedited donning and fastening.

In one example, a medical gown is disclosed. The medical gown includes a main body having a neck edge, a first side edge, and a second side edge. The first side edge extends from the neck edge. The second side edge extends from the neck edge, opposite the first side edge. The neck edge defines a neck engagement feature between the first and second side edges. The medical gown further includes a first strap feature coupled with the main body and defining a first loop with the first side edge. The medical gown further includes a second strap feature coupled with the main body and defining a second loop with the second side edge. The medical gown further includes a plurality of retention tabs coupled to the medical gown, where each retention tab includes a strip of material protruding from the medical gown, a first end fixed to the medical gown, a second end opposite the first end an moveable relative to the medical gown, and an aperture extending through the strip of material, where the aperture is configured to suspend the medical gown from a manipulation feature of a gown dispensing device.

In another example, the main body may further include a terminal edge extending from the first side edge to the second side edge, opposite the neck edge. Further, the first strap feature may include a first strap forming the first loop. The first strap may have a first strap top end connected to the main body adjacent an intersection of the neck edge and the first side edge. The first strap may further have a first strap bottom end connected to the main body at the first side edge and offset from the neck edge and the terminal edge. The first loop may be configured to extend generally from a backside of a user to a front side of the user, receiving a length of an arm of the user. In some cases, the first strap may include an elastic component configured to permit expansion of the first loop to an expanded state to accommodate a user. In the expanded state of the first loop, the elastic component may exert a return force that causes the first strap to substantially conform to a shape of the user.

In another example, the second strap feature may include a second strap first portion having a second strap top end connected to the main body adjacent an intersection of the neck edge and the second side edge. The second strap feature may include a second strap second portion having a second strap bottom end connected to the body at the second side edge and offset from the neck edge and the terminal edge. The second strap first portion and the second strap second portion may be connected with one another to form the second loop with the second strap first portion defining a cross belt, and the second strap second portion defining a lap belt for the user. Further, the second strap feature may include a fastening feature configured to secure the second strap feature relative to the main body.

In another example, the neck feature may be interposed between a first subset of the retention tabs of the plurality of retention tabs and a second subset of the plurality of retention tabs. Further, the main body may include a first material portion and a second material portion. In this regard, the first subset of retention tabs may be coupled with at least one of the main body or the first strap feature. The first subset of retention tabs may be configured to cause a manipulation the first material portion relative to the second material portion in response to a first input force. Further, the second subset of retention tabs may be coupled with at least one of the main body or the second strap feature. The second subset of retention tabs may be configured to cause a manipulation of the second material portion relative to the first material portion in response to a second input force.

In another example, each respective tab of the plurality of retention tabs may be formed from a tab body. The tab body may define a peripheral region about the aperture. The peripheral region of each respective retention tab may be, collectively, configured to support a weight of the medical gown for hanging on the manipulation features. Further, the peripheral region of each respective retention tab may be, collectively, configured to rupture upon a downward force supplied by a user of the medical gown.

In another example, the medical gown may further include a first arm feature and a second arm feature. The first arm feature and the second arm feature may extend from the main body and define respective first and second sleeves for arms of a user. In a first configuration, the first and second arm features may be substantially collapsed, with the first and second sleeves closed. In a second configuration, in response to a burst of air, one or both of the first or second arm features may be substantially unfurled, with the corresponding first or second sleeves open for receipt of the arms of the user.

In another example, a packaging assembly of medical gowns is disclosed. The packaging assembly includes a first medical gown. The first medical gown includes a first main body having a first neck edge and a first terminal edge opposite the first neck edge. The packaging assembly further includes a second medical gown. The second medical gown includes a second main body having a second neck edge, a second terminal edge opposite the second neck edge, and a plurality of tabs configured for hanging the second medical gown and disposed along the second neck edge. The packaging assembly further includes an interface between the first terminal edge of the first medical gown and the second neck edge of the second medical gown. The first and second medical gowns may be removably coupled along the interface such that, in a first configuration, the first and second medical gowns are physically connected to one another. The first and second medical gowns may be removably coupled along the interface such that, in a second configuration, the first and second medical gowns are physically separated from one another.

In another example, the interface may be defined by a line of perforations extending along the first terminal edge and the second neck edge. For example, the second medical gown may include a plurality of sacrificial connectors extending form the second neck edge and adhered to the first terminal edge. The line of perforations may be defined, collectively, by the sacrificial connectors.

In another example, the plurality of tabs may be removably adhered to the first terminal edge and cooperate to define the interface.

In another example, the first and second medical gowns may be at least partially folded and arranged in the packaging assembly in one of a roll or a stack.

In another example, a method of donning a medical gown is disclosed. The method includes presenting the medical gown suspended from a plurality of retention features disposed along a neck edge of the medical gown. The neck edge is defined by a main body of the medical gown. The method further includes manipulating the main body via the plurality of retention features to partially encompass a torso of a user with the main body and provide access to the user to one or more strap features of the medical gown. The method further includes receiving a first arm of the user in a first sleeve of the medical gown and causing the medical gown to wrap partially around the torso of the user using a first subset of the retention features.

In another example, the method may further include causing the medical gown to become unfurled using one or both of a mechanical input force or a fluidic input force. The fluidic input force may be provided by a burst of air delivered by a gown dispensing device.

In another example, the plurality of retention features may include a plurality of tabs having an aperture extending therethrough. In this regard, the presenting may further include hanging plurality of tabs on respective ones of a corresponding plurality of manipulation features of a gown dispensing device.

In another example, the neck edge includes a neck feature that may be interposed between the first subset of retention features of the plurality of retention features and a second subset of the plurality of retention features. Further, the main body may include a first material portion and a second material portion. The medical gown may further include a first arm feature and a second arm feature. The first arm feature and the second arm feature may extend from the main body and define respective first and second sleeves for arms of a user.

In another example, the one or more strap features may include a first strap feature coupled with the main body and defining a first loop with a first side edge of the main body. In this regard, the method may further include, subsequent to the receiving of the first arm of the user in the first sleeve, receiving a second arm through the first loop and securing the first material portion relative to the user.

In another example, the method may further include receiving a second arm of the user in the second sleeve. The method may further include causing the second material portion to wrap partially around the torso and a section of the first material portion using the second subset of retention features.

In another example, the one or more strap features may include a second strap feature coupled with the main body and defining a second loop with a second side edge of the main body. In this regard, the method may further include, subsequent to the receiving of the second arm of the user in the second sleeve, receiving the first arm through the second loop. The method may further include, subsequent to causing the second material portion to wrap partially around the torso, securing the second strap feature to the main body.

In another example, the plurality of retention features may be a plurality of retention tabs coupled to the medical gown, where each retention tab of the plurality of retention tabs includes a strip of material protruding from the medical gown, a first end fixed to the medical gown, and a second end opposite the first end and moveable relative to the medical gown, and an aperture extending through the strip of material, where the aperture is configured to suspend the medical gown from a manipulation feature of a gown dispensing device. Each respective tab of the plurality of retention tabs may be formed from a tab body, where the tab body defines a peripheral region about the aperture. In this regard, the method may further include rupturing the peripheral region of each respective retention tab upon a downward force supplied by the user.

In another example, a method of donning a medical gown is disclosed. The method includes presenting, to a user, the medical gown suspended from a plurality of retention features disposed along a neck edge of the medical gown, the neck edge defined by a main body of the medical gown. The medical gown further comprises a first arm feature and a second arm feature, where the first arm feature and the second arm feature extend from the main body and define respective first and second sleeves for arms of the user. The method further includes manipulating the main body via the plurality of retention features to partially open the gown, presenting the first sleeve to the user, and receiving a first arm of the user in the first sleeve. The method further includes wrapping a first material portion of the medical gown at least partially around a torso of the user and presenting a first loop, defined by a first strap feature for insertion of the second arm of the user.

In another example, wrapping the first material portion of the medical gown may be aided by a first subset of the plurality of retention features. The first strap feature may include an elastic component and may comprise at least one fastener for securing the first strap around the torso of the user.

In another example, the method may further include, after presenting the first loop, presenting the second sleeve feature to the user for receiving the second arm of the user and wrapping a second material portion of the medical gown at least partially around the torso of the user. The wrapping the second material portion of the medical gown may be aided by a second subset of the plurality of retention features. The method may further include, after wrapping the second material portion at least partially around the torso of the user, presenting a second loop, defined by a second strap feature, to the user for receiving the second arm of the user. The second strap feature may include at least one fastening feature, and the fastening feature may be an adhesive.

In another example, a device for donning a gown is disclosed. The device includes a support structure and a manipulation assembly. The manipulation assembly includes a first engagement arm and a second engagement arm, where each of the first engagement arm and the second engagement arm include a plurality of manipulation features for engaging a retention feature of the gown. At least one of the first or second engagement arms may be movable relative to the support structure. The at least one of the first or second engagement arms may be movable to unfold the gown. The at least one of the first or second engagement arms may be movable to assist a user of the device in donning the gown.

In another example, the device may further include a gown storage container, where the gown storage container retains a plurality of gowns including a gown. The plurality of gowns are contained in a packaging assembly. The packaging assembly may be one of a stack or a roll. The gown storage container may be movable relative to the support structure. The plurality of manipulation features may engage the retention feature of the gown responsive to the movement of the gown storage container relative to the support structure.

In one aspect, a system for donning a medical gown, includes a device for hanging and manipulating the medical gown, and a gown storage container. In some aspects, the gown storage container may include at least two medical gowns, and, optionally, the medical gown may include; a main body having a neck edge, a first side edge, and a second side edge, where the first side edge extends from the neck edge, the second side edge extends from the neck edge, opposite the first side edge, and the neck edge defines a neck engagement feature between the first and second side edges. The medical gown of the system may also include a first strap feature coupled with the main body and defining a first loop with the first side edge, and the medical gown may also include a second strap feature coupled with the main body and defining a second loop with the second side edge, a plurality of retention tabs coupled to the medical gown, where each retention tab of the plurality of retention tabs includes a strip of material protruding from the medical gown, a first end fixed to the medical gown, a second end opposite the first end and moveable relative to the medical gown, and an aperture extending through the strip of material, where the aperture is configured to suspend the medical gown from a manipulation feature of a gown dispensing device. The system may also include at least two medical gowns, wherein the medical gowns are at least partially folded and arranged in the packaging assembly in one of a roll, or a stack.

In addition to the exemplary aspects and examples described above, further aspects and examples will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIG. 8A depicts an operation of a gown donning system;

FIG. 8B depicts another operation of the gown donning system of FIG. 8A;

FIG. 8C depicts another operation of the gown donning system of FIG. 8A;

FIG. 13A depicts a rear view of an operation of donning a medical gown;

FIG. 13B depicts a top view of the operation of donning a medical gown of FIG. 13A;

FIG. 14A depicts a rear view of another operation of donning a medical gown;

FIG. 14B depicts a top view of the operation of donning a medical gown of FIG. 14A;

FIG. 15A depicts a rear view of another operation of donning a medical gown;

FIG. 15B depicts a top view of the operation of donning a medical gown of FIG. 15A;

FIG. 16A depicts a rear view of another operation of donning a medical gown;

FIG. 16B depicts a top view of the operation of donning a medical gown of FIG. 16A;

FIG. 17A depicts a rear view of another operation of donning a medical gown;

FIG. 17B depicts a top view of the operation of donning a medical gown of FIG. 17A;

FIG. 18A depicts a rear view of another operation of donning a medical gown;

FIG. 18B depicts a top view of the operation of donning a medical gown of FIG. 18A;

FIG. 19A depicts a rear view of another operation of donning a medical gown;

FIG. 19B depicts a top view of the operation of donning a medical gown of FIG. 19A;

FIG. 20A depicts a rear view of another operation of donning a medical gown;

FIG. 20B depicts a top view of the operation of donning a medical gown of FIG. 20A;

Figure 1:
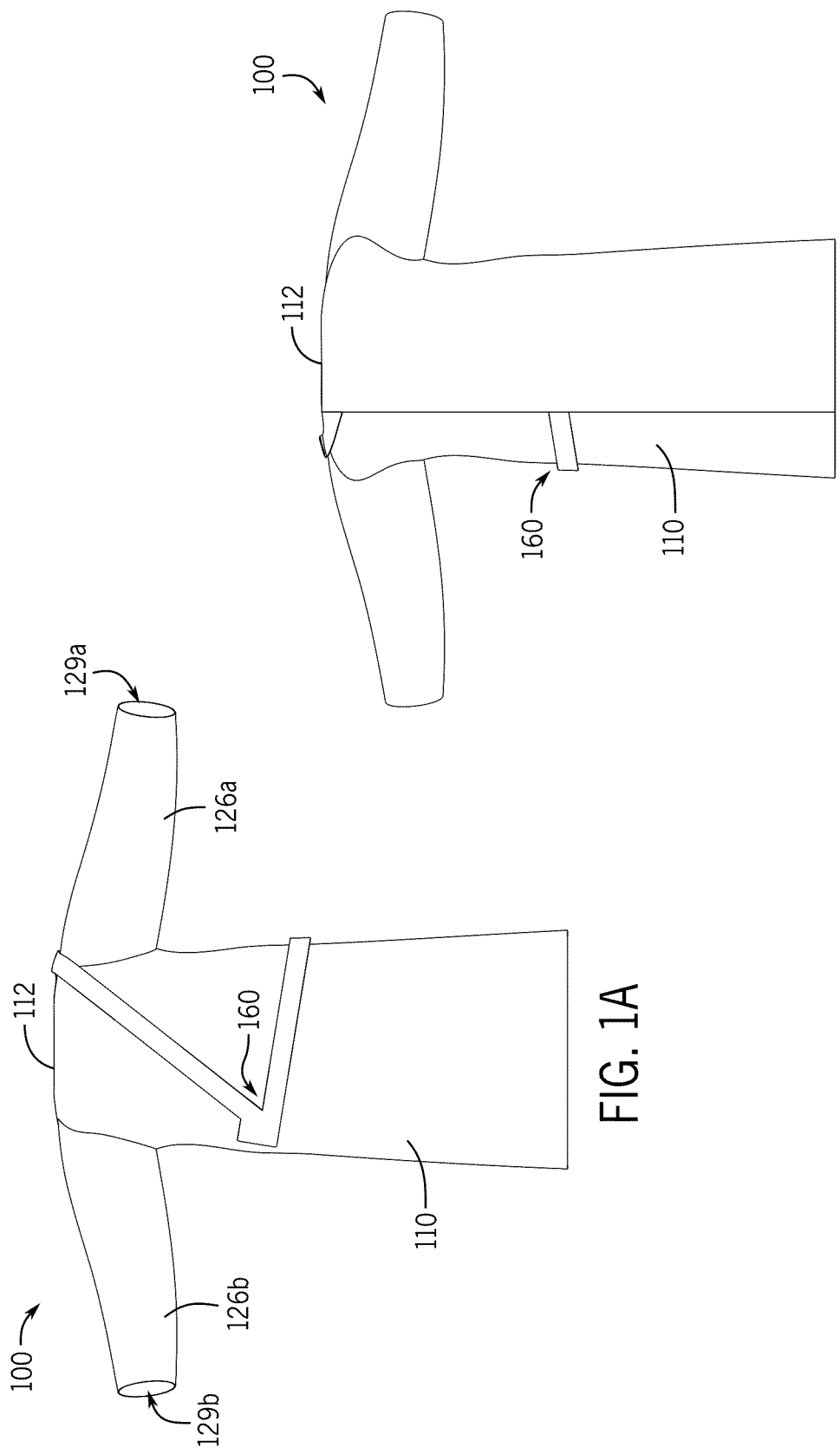
FIG. 1A depicts a front view of an example medical gown.
FIG. 1B depicts a back view of the medical gown of FIG. 1A.

In addition to the exemplary aspects and examples described above, further aspects and examples will become apparent by reference to the drawings and by study of the following description.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to medical gowns, packagings of same, and methods for expedited donning. Broadly, a medical gown may include substantially any gown, apron, smock, sheet, or other item that is used for personal protective equipment (PPE). Conventional PPE may be particularly cumbersome and inefficient to don. For example, conventional PPE may include a central sheet or material layer with free hanging bands of material coming off either side. A medical professional may don conventional PPE by placing the central sheet adjacent their torso and securing the sheet by tying the free hanging bands together. Tying or otherwise securing the bands in this manner may be difficult and time-consuming, and often can only be done with assistance from others. Further, conventional PPE and donning techniques may require substantial interaction with the central sheet and/or other materials by the medical professional and/or assistant(s), which may impact the effectiveness of the PPE in establishing a protective barrier between the professional and given area and/or patient.

The medical gowns of the present disclosure, and associated systems and methods, may mitigate such hindrances by providing PPE that may be easier, quicker, and more efficient to don. The medical gown may be used with a gown dispensing device or system that is broadly configured to automate donning of the medical gown. Accordingly, the medical gown may include various features and functions and may be configured to support the automated or substantially automated donning of the medical gown. Without limitation, such features may include those which allow the medical gown to be manipulated by the gown dispensing device in addition to those which allow the medical gown to be secured to a user without assistant of others.

It will be appreciated that many constructions of the medical gown are possible and described and contemplated herein. In one example, the medical gown may include a main body including a neck edge, and first and second side edges extending from opposite sides of the neck edge. The main body may define a main protective region of the medical gown that is configured to cover a torso of a user, and may extend to or beyond the user's knees. At the neck edge, the main body may define a neck feature for receiving a neck of a user, while the first and second side edges may be wrapped around either side of the torso such that the user is substantially wrapped in the main body.

The main body may be configured to be wrapped about the torso in a substantially automated process by the gown dispensing device. To facilitate the foregoing, the medical gown may include a plurality of retention features. In some embodiments, the retention features may be disposed along the neck edge. In these embodiments, the plurality of retention features may be configured for hanging or suspending the medical gown from a gown dispensing device. For example, the plurality of retention features may include a plurality of tabs that extend from the neck edge and define an aperture or other feature to facilitate suspending the medical gown from the tab. The plurality of retention features may also be used to bend, fold, or wrap the main body about the torso during donning of the medical gown. For example, and as described herein, the retention features may receive an input force from the gown dispensing device that causes a respective retention feature to move. The respective retention feature may move, and correspondingly pull the main body such that the material of the main body bends or folds or wraps about a user.

The medical gown of the present disclosure may be secured to a user substantially without the assistance of others, such as without the assistance of another user tying or otherwise securing the gown for the primary user or wearer of the medical gown. To facilitate the foregoing, the medical gown may include a first strap feature coupled with the main body and defining a first loop with the first side edge. Further, the medical gown may further include a second strap feature coupled with the main body and defining a second loop with the second side edge. One or both of the first and second strap feature may be wrapped or moved about the user during donning such that the user may conveniently manipulate the first and/or second strap features and fasten the medical gown to themselves and/or the main body of the medical gown.

To illustrate, during a sample donning operation, a user may insert a first arm (e.g., a left arm) into a first arm feature of the medical gown, which is adjacent the first side edge. Using a first subset of the plurality of retention features, a first material portion of the medical gown and the first strap feature may be partially wrapped about a backside of the user. This operation may bring the first strap feature adjacent to a second arm (e.g., a right arm) of the user, thereby allowing the user to insert the second arm in the first loop that is defined by the first strap feature and the first side edge. The first strap feature may include an elastic component to compress or conform the first strap feature to the user for a snug fit. Next, a user may insert the second arm into the second arm feature of the medical gown, which is adjacent the second side edge. Using a second subset of the plurality of retention features, a second material portion of the medical gown and the second strap features may be partially wrapped about the back of the user. This operation may bring the second strap feature adjacent to the first arm of the user, thereby allowing the user to insert the first arm in the second loop that is defined by the second strap feature and the second side edge. The second strap feature may then present at a front of the user, forming a cross-belt over the front, and permit the user to fasten the second strap feature to the medical gown as appropriate.

Turning to the Drawings, FIGS. 1A and 1B depict a medical gown 100, such as the medical gown discussed generally above and described in greater detail below. The medical gown 100 may broadly include substantially any form of PPE that is configured to form a protective barrier between a wearer of the gown and a given area or patient. Further, the medical gown 100 may be a gown, apron, smock, sheet or other item of a variety of constructions and purposes that is used in an automated or substantially automated donning process. In this regard, the medical gown 100 may include various features and components to facilitate use of the medical gown 100 with systems, device, assemblies, and so on that are capable of manipulating the medical gown 100 for automated or substantially automated donning.

The medical gown 100 may generally include a main body 110, a first arm feature 126a, and a second arm feature 126b. As shown in front view of FIG. 1A, the medical gown 100 is presented in a configuration in which the medical gown 100 may be worn, with the main body 110 and arm features 126a, 126b cooperating to establish a protective barrier along a front side of a prospective wearer. A strap feature 160 is also shown in the front view of FIG. 1A. As described in greater detail below, the strap feature 160 may define a lap and/or cross-belt for securing the medical gown 100 at the end of a process for donning the medical gown 100. As shown in the rear view of FIG. 1B, the medical gown 100 is presented in a configuration in which the medical gown 100 may be worn, with the main body 110 and arm features 126a, 126b cooperating to establish a protective barrier along a rear side of the prospective wearer. The strap feature 160 is shown extending from a portion of the main body 110 and about the first arm feature 126a to promote securing of the medical gown.

Figure 2:
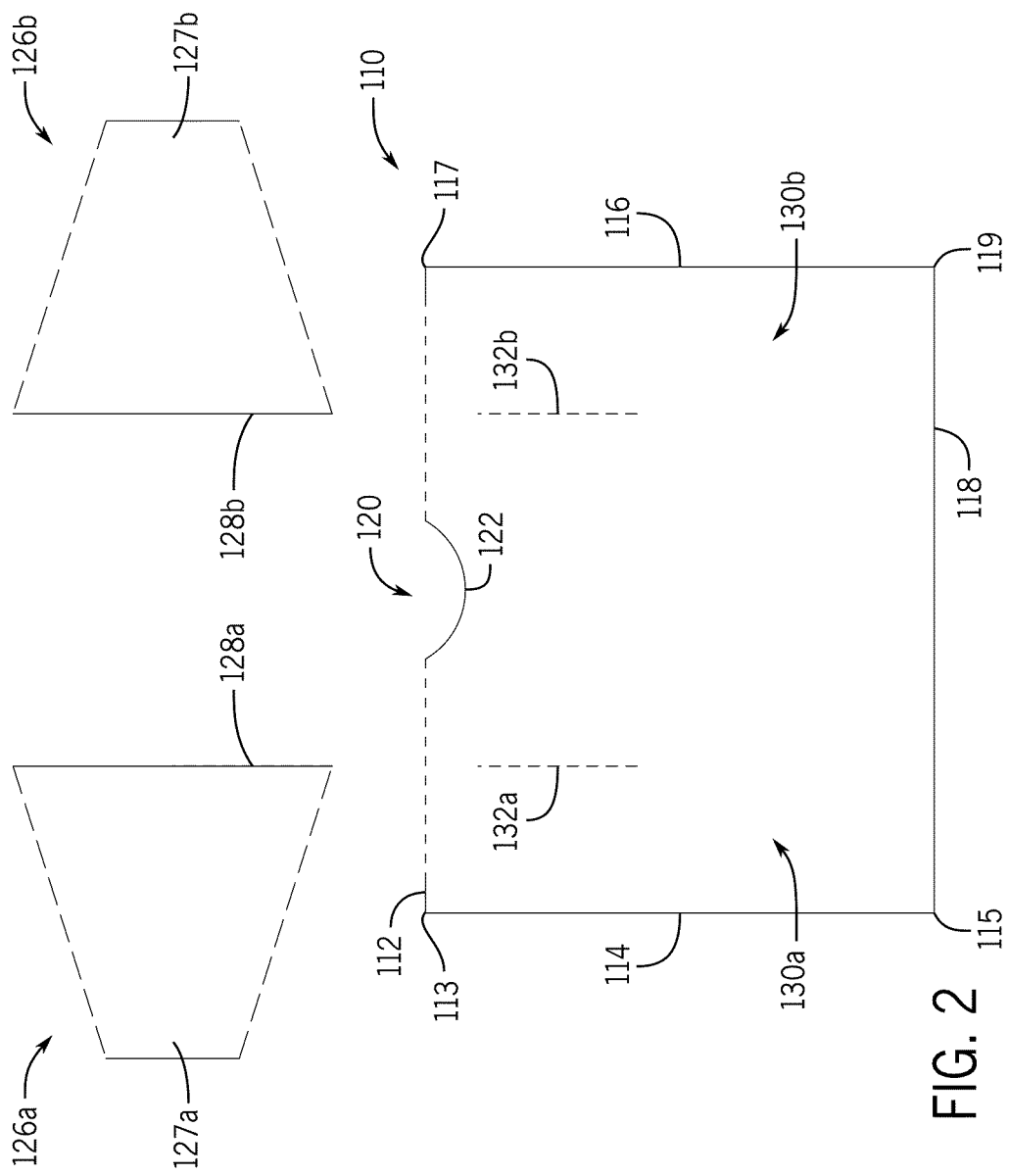
FIG. 2 depicts a material pattern for the medical gown of FIG. 1A.
Figure 3:
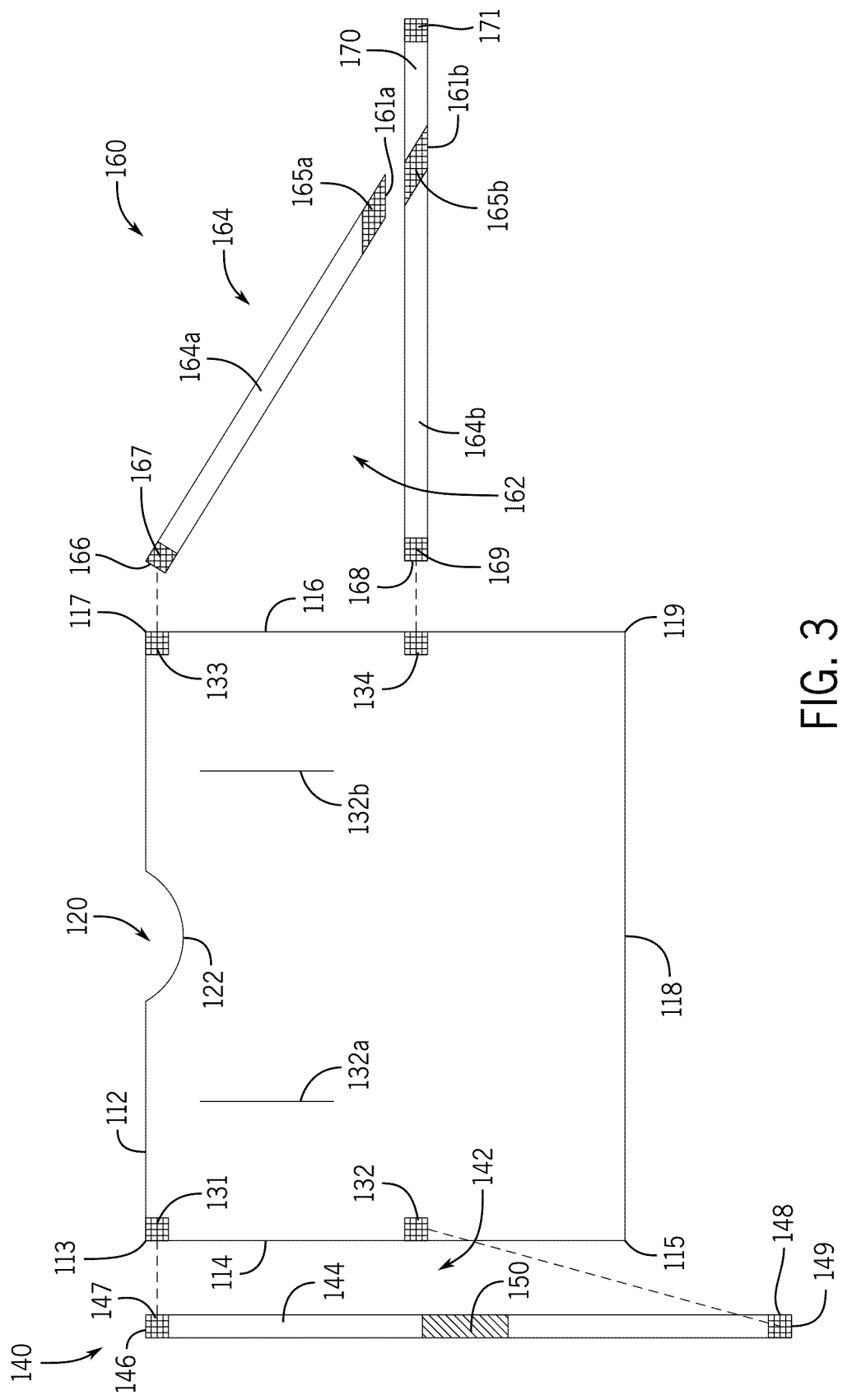
FIG. 3 depicts an exploded view of the medical gown of FIG. 1A.

With reference to FIGS. 2 and 3, example material patterns of the medical gown 100 are shown. For example, the medical gown 100 may be constructed by connecting individual material component to one another, such as connecting individual fabrics, bands, sheets, elastic components and so. The material component may have particular shapes and configurations such that upon assembly, the material components cooperate to form the medical gown 100. It will be appreciated however, that while various components are described below with reference to FIGS. 2 and 3, this is for purposes of illustration. Other constructions and patterns, including medical gowns 100 having more or fewer or differently shaped or configured material components are possible and contemplated herein.

FIG. 2 shows the medical gown 100 including the main body 110 and the first arm feature 126a and the second arm feature 126b. With reference to the main body 110, this component may formed form various materials, including spunbond polypropylene materials, polypropylene, polyester, or polyethylene. The main body 110 is shown in FIGS. 2 and 3, as including a neck edge 112, a first side edge 114, a second side edge 116, and a terminal edge 118. The first side edge 114 may generally extend from the neck edge 112, with the first side edge 114 and the neck edge 112 forming an intersection 113. Further, the second side edge 116 may generally extend from the neck edge 112 opposite the first side edge 114, with the second side edge 116 and the neck edge 112 forming an intersection 117. Further, the terminal edge 118 may extend between an intersection 115 with the first side edge 114 and an intersection 119 with the second side edge 116. The main body 110 may therefore have a generally rectangular shape and the intersections 113, 115, 117, 119 may define corners of the generally rectangular shape. In other configurations, different shapes are possible, including irregular shapes and those having more or fewer sides or edges.

The main body 110 may include a neck feature 120. The neck feature 120 may be defined along the neck edge 112. For example, the neck feature 120 may be defined by a contoured section 122 of the neck edge. The contoured section 122 may have a depth and width in order to partially receive a neck of a wearer of the medical gown 100. The contoured section 122 may be generally arranged between the first side edge 114 and the second side edge 116, such as being generally equidistant the edges 114, 116. In other cases, the contoured section 122 may be closer to one of the edges 114, 116 based on a particular application, pattern, or construction.

Broadly, the main body 110 may include a first material portion 130a and a second material portion 130b. The first and second material portions 130a, 130b may be defined by generally first and second, left and right, regions or roughly halves of the main body 110. As described herein below, the medical gown 100 may be further configured to permit manipulation or bending of the first and second material portions 130a, 130b relative to one another in order to facilitate substantially wrapping the main body 110 about a torso of a wearer. At the first material portion 130a, the main body 110 may include a first arm cut 132a. At the second material portion 130b, the main body 110 may include a second arm cut 132b. The first and second arm cuts 132a, 132b may be passages that extend through a complete thickness of the main body 110. The first and second arm cuts 132a, 132b may be large enough to receive an arm of the wearer.

With further reference to the material pattern of FIG. 2, the medical gown 100 is shown with the first arm feature 126a including a first arm material 127a. The first arm material 127a may define a first arm hole 128a. The medical gown 100 is further shown in FIG. 2 with the second arm feature 126b including a second arm material 127b. The second arm material 127b may define a second arm hole 128b. The medical gown 100 may be coupled such that the first arm material 127a may be attached to the main body 110. The first arm material 127a may be attached to the main body 110 and the first arm hole 128a and the first arm cut 132a may be substantially aligned with one another. The medical gown 100 may further be coupled such that the second arm material 127b may be attached to the main body 110. The second arm material 127b may be attached to the main body 110 and the second arm hole 128b and the second arm cut 132b may be substantially aligned with one another.

Turning to FIG. 3, the material pattern of the medical gown 100 is shown including various strap features. The strap features may facilitate donning of the medical gown in an automated or substantially automated process. The strap features may also be used to don the medical gown 100 manually. The strap features may further facilitate donning of the medical gown 100 without the assistant of others, such as without the assistance of other personal to tie loose hanging bands of the gown. For purposes of illustration, FIG. 3 shows a first strap feature 140 and a second strap feature 160. The first strap feature 140 may be coupleable with the main body 110 and define a first loop 142 with the first side edge 114 (FIG. 14A). The second strap feature 160 may be coupleable with the main body 110 and define a second loop 162 with the second side edge 116 (FIG. 14A).

In the example of FIG. 3, the first strap feature 140 is shown as including a first strap 144. The first strap 144 may include an elongated shape of material and/or combination of materials that extends in a band-like formation from one portion of the medical gown 100 to another. The first strap 144 may include a first strap top end 146 and a first strap bottom end 148. The ends 146, 148 may be terminal ends of the first strap 114 with a run of the first strap 144 extending therebetween. The first strap top end 146 may include or be associated with a connecting region 147. The first strap bottom end 148 may include or be associated with connecting region 149. The connecting regions 147, 149 may include adhesive and/or have other characteristics to facilitate coupling the first strap feature 140 the main body 110. In some cases, the medical gown 100 may further include an elastic component 150 disposed along a run of the first strap 144. The elastic component 150 may be configured to permit expansion of the first loop 142 to accommodate a user. The elastic component 150 may be further configured, in the expanded state, to exert a return force that causes the first strap feature 140 to substantially conform to a shape of the user.

The second strap feature 160 is shown in FIG. 3 as including a second strap 164. The second strap 164 may include one or more pieces of material that cooperate to define a lap belt and/or cross-belt type shape, such as that shown in the as worn configuration of FIG. 1A. To facilitate the foregoing, the second strap 164 may include a second strap first portion 164a and a second strap second portion 164b. The portions 164a, 164b may include an elongated shape or run of material and/or combination of materials that extends in a band-like formation and that cooperate with one to form the lap belt and/or cross-belt configuration. The second strap first portion 164a may include a second strap top end 166 and a cross-belt end 165a. The ends 166, 165a may be terminal ends of the second strap first portion 164a with a run of the second strap first portion 164a extending therebetween. The second strap top end 166 may be associated with a connecting region 167 and the cross-belt end 165a may be associated with a connecting region 161a. The connecting regions 167, 161a may include adhesive and/or have other characteristics to facilitate coupling the second strap feature 160. Further, the second strap second portion 164b may include a second strap bottom end 168 and a cross-belt end 165b. The ends 168, 165b may be terminal ends of the second strap second portion 164b with a run of the second strap second portion 164b extending therebetween. The second strap bottom end 168 may be associated with a connecting region 169 and the cross-belt end 165b may be associated with a connecting region 161b. The connecting regions 169, 161b may include adhesive and/or have other characteristics to facilitate coupling the second strap feature 160. The second strap second portion 164b is further shown in FIG. 3 as including a fastening end 170. The fastening end 170 may include one or more fastening features 171 to facilitate securing the medical gown 100, using the second strap feature 160. As one example, the fastening features 171 may include hook and loop type fasteners in order to removably attach the fastening end 170 to the main body 110.

In one example, the medical gown 100 may be coupled such that the first and second strap features 140, 160 are secured to the main body 110. To illustrate, the main body 110 may include or be associated with a mounting region 131 at the intersection 113. The connecting region 147 of the first strap feature 140 may be connected, such as being adhered to, the main body 110 at the mounting region 131. Further, the main body 110 may include or be associated with a mounting region 132, which may offset from or between the intersections 113, 115. The connecting region 149 of the first strap feature 140 may be connected, such as being adhered to, the main body 110 at the mounting region 132.

With respect to the second strap feature 160, the second strap feature first portion 164a may be connected to the second strap feature second portion 164b by connecting, such as adhering, the connecting regions 161a, 161b. The portions 164a, 164b may be connected with one another such that second strap first portion 164a extends from the second strap second portion 164b at an angle less than 90 degrees, such as being less than 75 degrees, such as being less than 60 degrees, such as being less than 45 degrees, such that the portions 164a, 164b form the cross-belt pattern shown in FIG. 1A. Further, the main body 110 may include or be associated with a mounting region 133, which may be at the intersection 117. The connecting region 167 of the second strap feature 160 may be connected, such as being adhered to, the main body 110 at the mounting region 133. Further, the main body 110 may include or be associated with a mounting region 134, which may offset from or between the intersections 117, 119. The connecting region 169 of the second strap feature 160 may be connected, such as being adhered to, the main body 110 at the mounting region 134.

The medical gown 100 may further include various features to facilitate suspending the medical gown 100 and/or manipulating the medical gown 100 during an automated or substantially automated donning operation. For example, and with reference to FIG. 4, the medical gown 100 may include a plurality of retention features 180. The plurality of retention feature 180 may generally be configured for hanging or suspending the medical gown 100. In this regard, the plurality of retention features 180 may include hooks, tabs, straps, and/or other features or combinations that allow the medical gown 100 to be suspended. Additionally, the plurality of retention features 180 may generally be configured to cause a manipulation of the main body 110 in response to an input force. For example, the plurality of retention features 180 may cause one or both of the first or second material portions 130a, 130b to bend or flex about a user in response to a force received at one or more of the plurality of retention features 180. In this regard, the plurality of retention features 180 may be sufficiently robust to cause the material to move without tearing or separating from the material as appropriate.

Figure 4:
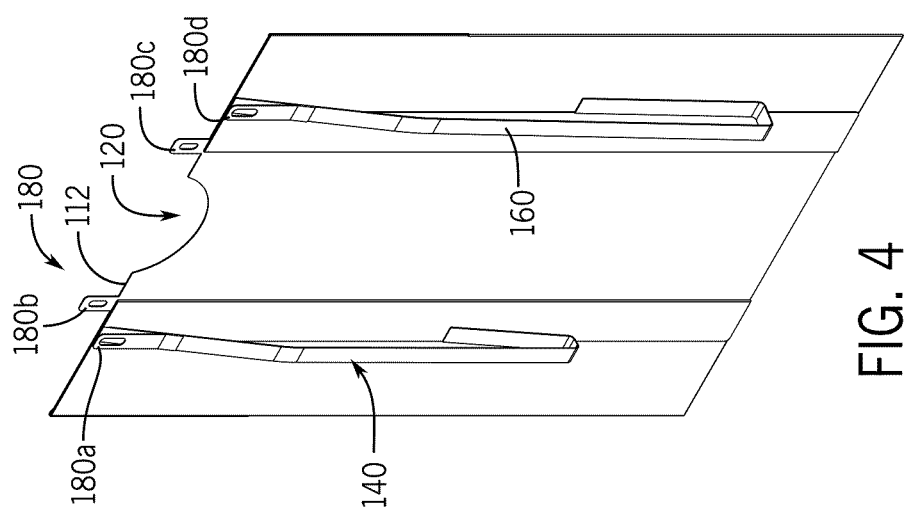
FIG. 4 depicts the medical gown of FIG. 1A include a plurality of retention features.

The plurality of retention features 180 may generally be disposed along a neck edge 112 of the main body 110 with the neck feature 120 interposed with the features. For example, and as shown in FIG. 4, a first retention features 180a and a second retention feature 180b may define a first subset of the plurality of retention features 180 and be disposed at a first side of the neck feature 120. Further, a third retention feature 180c and a fourth retention feature 180d may define a second subset of the plurality of retention features 180 and be disposed at a second side of the neck feature 120 opposite the first side. As shown in FIG. 4, the first retention feature 180a may be coupled to and extend from the first strap feature 140. The second retention feature 180b may be coupled to and extend from the main body 110. The third retention feature 180c may be coupled to and extend from the main body 110. The fourth retention feature 180d may be coupled to and extend from the main body second strap feature 160.

Figure 5A:
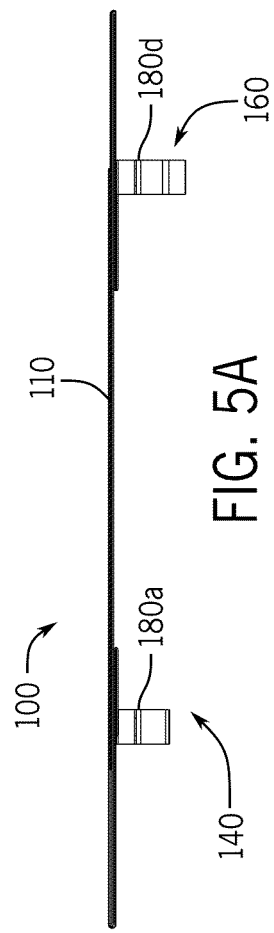
FIG. 5A depicts a top view of the medical gown of FIG. 4 in a first configuration.
Figure 5B:
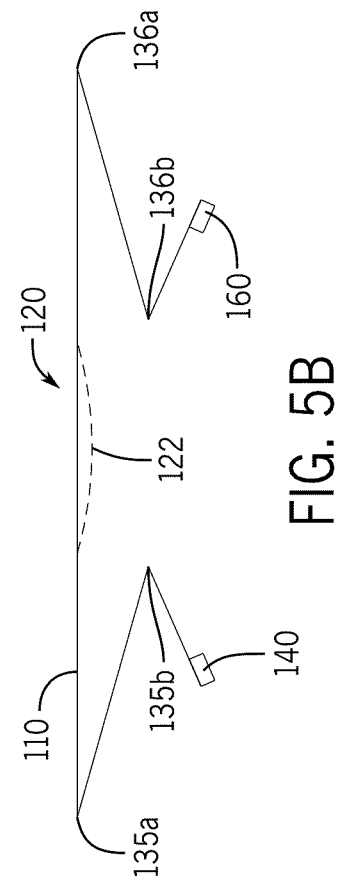
FIG. 5B depicts a top view of the medical gown of FIG. 4 in a second configuration.

In one example, the medical gown 100 may be presented, suspended from the plurality of retention features 180, and folded, as shown in FIG. 4. The plurality of retention features 180 may be configured to manipulate the main body 110 such that the main body 110 unfolds to facilitates donning. To illustrate, FIG. 5A shows a top view of the suspended medical gown 100 of FIG. 4. In the top view shown in FIG. 5A, the medical gown 100 appears folded and exhibits a compressed or flattened contour. One or more or all of the plurality of retention features 180 may be used to help unfold the main body 110. For example, and as shown in FIG. 5B, a top view of medical gown 100 is depicted in a partially unfolded configuration. In the partially unfolded configuration, the first subset of the plurality of retention features 180 may cooperate to unfold the main body 110, for example, by moving the main body 110 and unfolding first and second first side folds 135a, 135b.

Further, the second subset of the plurality of retention features 180 may cooperate to unfold the main body 110, for example, by moving the main body 110 and unfolding first and second side folds 136a, 136b. In some cases, the unfolding may occur in the context of a donning operation in which the plurality of retention features 180 are manipulate in order to wrap the main body 110 about a user, as described herein.

FIGS. 9A-10C provide example constructions of the retention features contemplated herein. For purposes of illustration, the second retention feature 180b is shown and described. It will be appreciated that the following description of the retention feature 180b may be applicable to any of the retention features described herein. The second retention feature 180b may include a tab that extends from the main body 110 (or the strap feature, in the case of the first or fourth retention features 180a, 180d). The tab may be a protruding strip of material from the main body 110. For example, the second retention feature 180b may include a tab body 181 that is fixed to the main body 110 at one end. The other opposing end of the tab body 181 may be a free end that is moveable relative to the main body 110. The tab body 181 may include a peripheral region 182 that extends about an aperture 184 of the tab. A shape of the aperture 184 may be defined by an aperture edge 183. The aperture 184 may extend through a complete thickness of the tab body 181. The aperture 184 may be configured to receive a manipulation feature of a gown hanging or gown dispensing device, such as the manipulation feature 822a shown in FIG. 9B. The peripheral region 182, in combination with the peripheral regions of the other tabs, may collectively be configured to support a weight of the medical gown 100. In this regard, the medical gown 100 may be placed on the manipulation feature 822a and suspended therefrom, using the plurality of retention features 180. Notwithstanding the robustness, the peripheral region 182, may be configured to rupture in response to a sufficient downward force supplied by a user of the medical gown 100. In this regard, the medical gown 100 may be suspended from a manipulation feature and pulled off of the manipulation feature as needed, this may obviate the need for the user to disengage the retention feature 180b from the manipulation feature 822a by, for example, sliding or lifting the tab 182 and/or aperture 184.

Figure 10C:
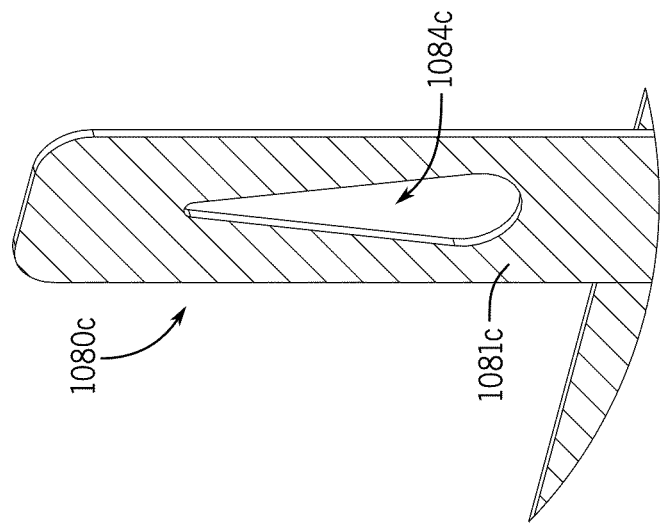
FIG. 10C depicts another example retention feature.
Figure 10B:
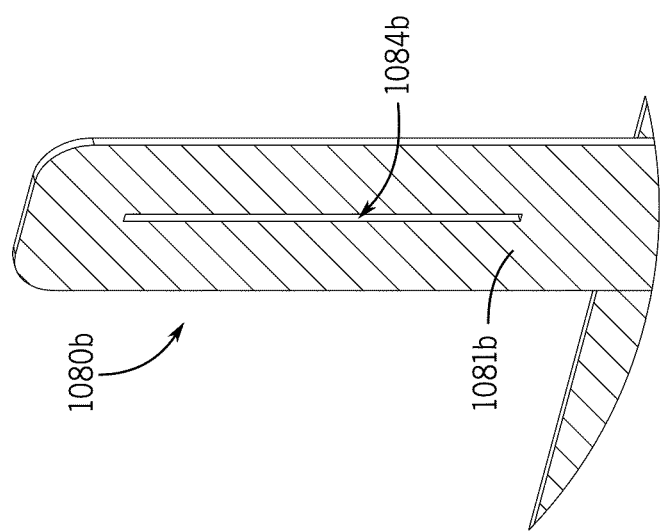
FIG. 10B depicts another example retention feature.
Figure 10A:
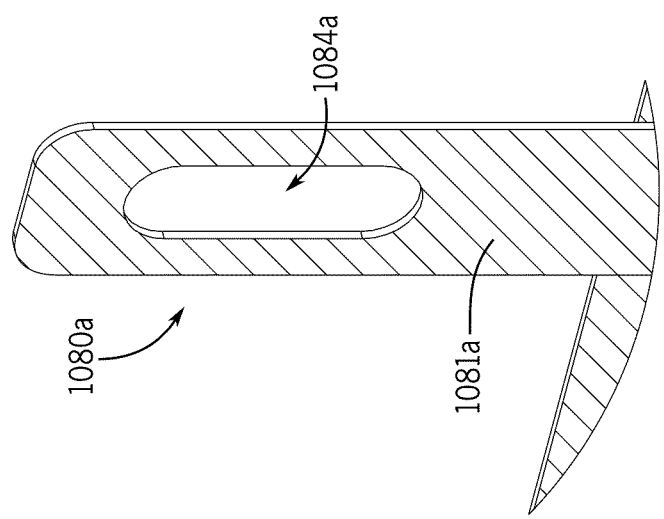
FIG. 10A depicts an example retention feature.

In other examples, other constructions and geometries are possible. For example, FIG. 10A shows a retention feature 1080a formed form a tab body 1081a that defines an aperture 1084a. The retention feature 1080a may be substantially analogous to the retention feature 180b. Notwithstanding, the aperture 1084a may be elongated as compared with the aperture 184. As another example, FIG. 10B shows a retention feature 1080b formed form a tab body 1081b that defines an aperture 1084b. The retention feature 1080b may be substantially analogous to the retention feature 180b. Notwithstanding, the aperture 1084b may be defined by an elongated slit. For example, the aperture 1084b may long and narrow, and include a minimally sized opening. As another example, FIG. 10C shows a retention feature 1080c formed form a tab body 1081c that defines an aperture 1084c. The retention feature 1080c may be substantially analogous to the retention feature 180b. Notwithstanding, the aperture 1084c may have a different shape, such as a teardrop shape, as compared to the opening shape in FIG. 9A. In many embodiments, the shape of the aperture may be configured to engage a shape of a given manipulation feature.

Figure 6:
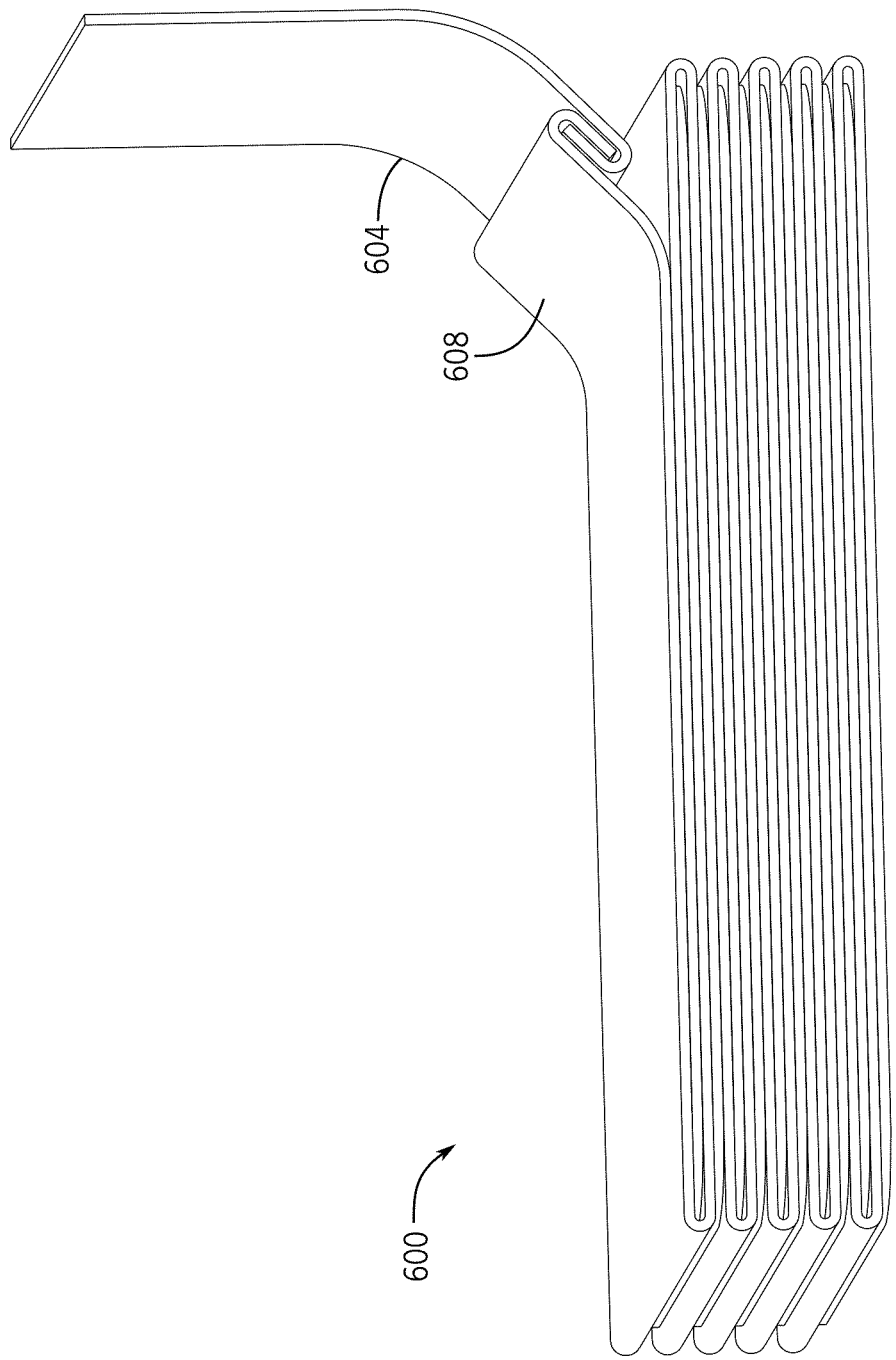
FIG. 6 depicts a stack of medical gowns.

The medical gowns of the present disclosure may be arranged in packaging assembly. For example, multiple medical gowns may be packaged together in order to facilitate efficient storage and use of the medical gowns from a common location or structure. With reference to FIG. 6, an assembly 600 of medical gowns in shown, schematically. The assembly 600 is shown as a substantially continuous assembly of gown material 604. The gown material 604 may schematically represent multiple individual medical gowns, such as multiple individual medical gown substantially analogous to the medical gown 100 described herein. The medical gowns may be substantially continuous with respect to having at least some portion of each medical gown contact at least one other, adjacent medical gown. For example, the medical gowns may be arranged in a stack having fold or pleats 608, as shown in FIG. 6, or a roll (FIG. 8A), such that the medical gowns are removably connected to one another, end-to-end, for dispensing in an efficient and centralized manner. In some examples, such as the mobile gown dispensing device 2200 shown in FIG. 22, the stack 600 or a similar stack may be located at a bottom portion of the mobile gown dispensing device 2200 for efficient storage of the medical gowns.

Figure 7A:
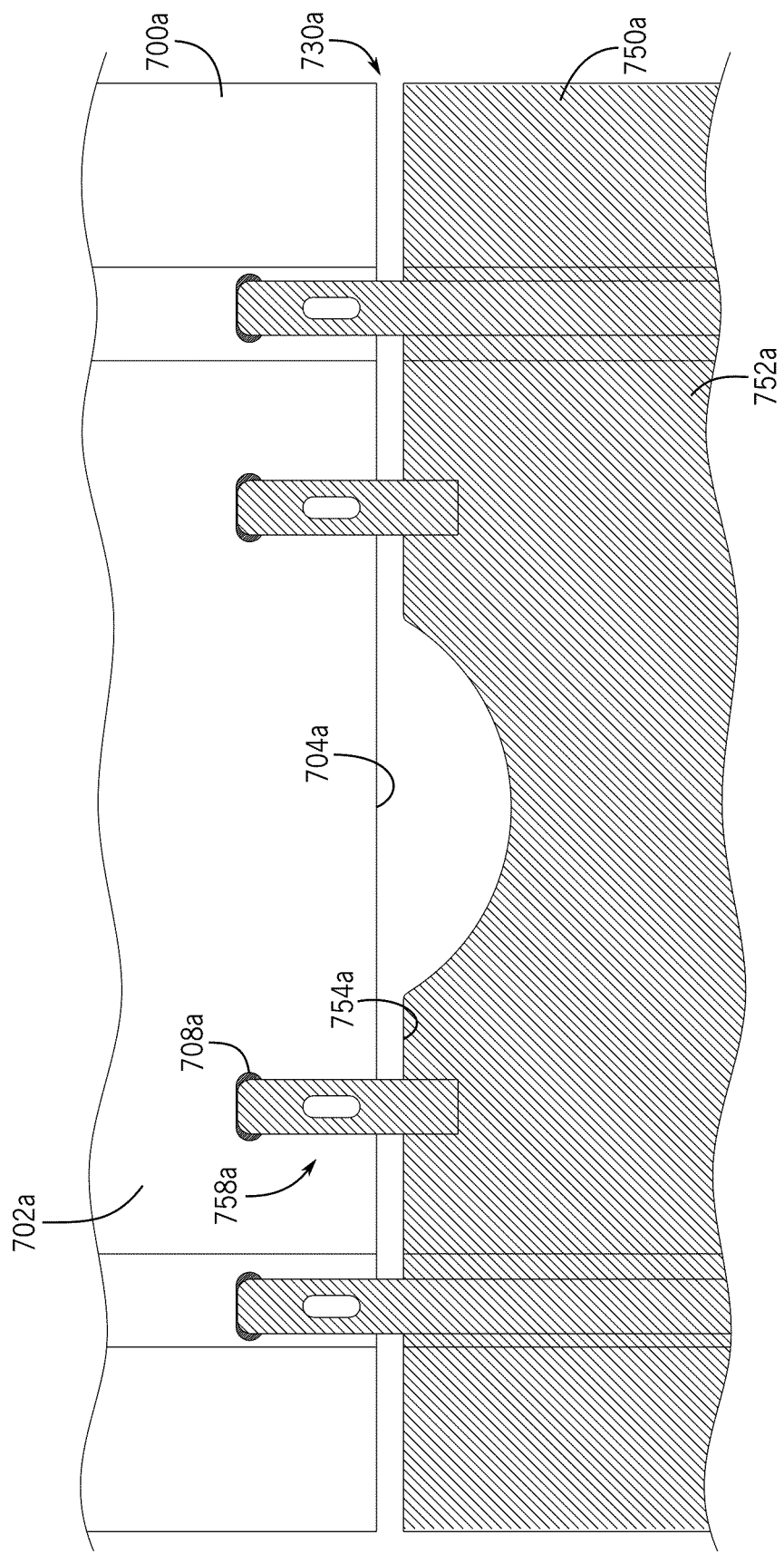
FIG. 7A depicts an example packaging assembly.
Figure 7B:
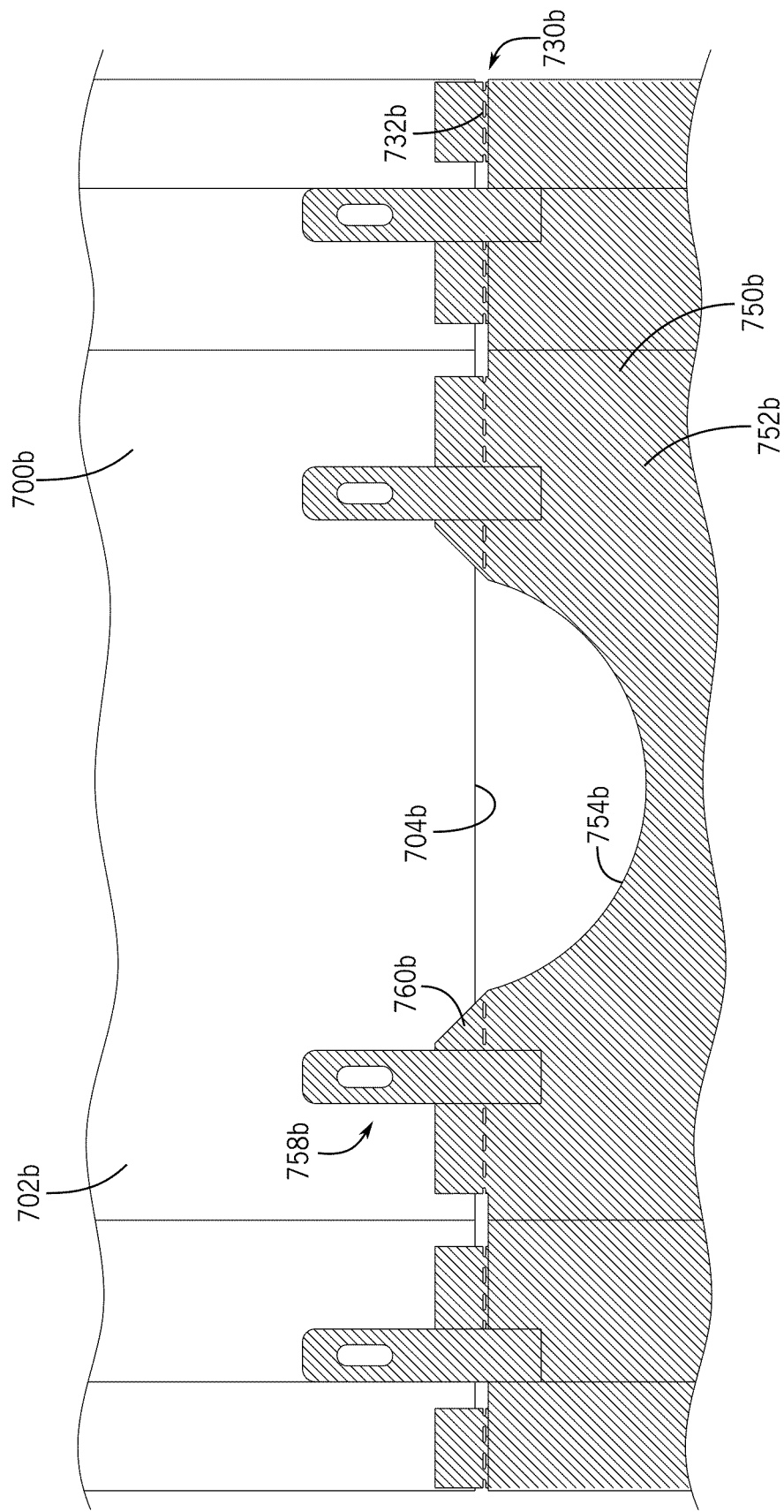
FIG. 7B depicts another example packaging assembly.
Figure 9B:
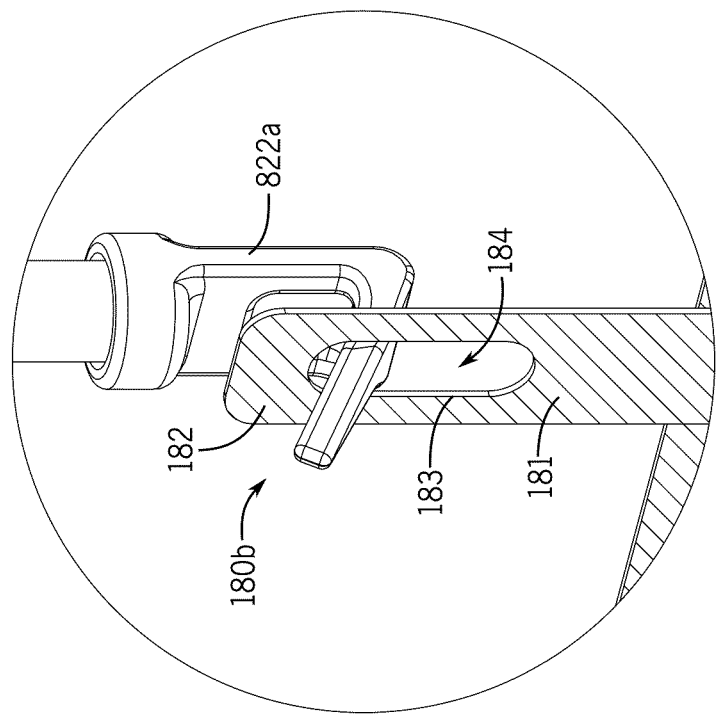
FIG. 9B depicts detail 9B-9B of FIG. 9A.
Figure 9A:
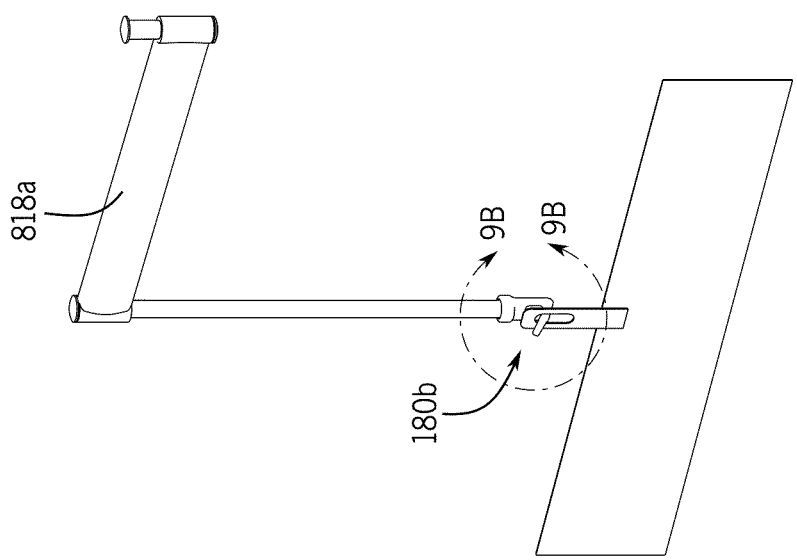
FIG. 9A depicts a retention feature of the medical gown of FIG. 4 engaged with a manipulation feature of a gown dispensing device.

With reference to FIGS. 7A and 7B, two examples of connecting medical gowns to one another, such as in a roll or stack, are presented. In FIG. 7A, a first medical gown 700a and a second medical gown 750a are shown. The first and second medical gowns 700a, 750a may be substantially analogous to the medical gown 100 shown and described above. The first medical gown 700a is shown in FIG. 7A as having a first main body 702a and a terminal edge 704a. Along the terminal edge 704a, the main body 702a may define a series of receiving ports 708a. Further, the second medical gown 750a is shown in FIG. 7A as having a second main body 752a and a neck edge 754a. Along the neck edge 754a, the main body 752a may be connected with a plurality of tabs 758a, such as any of the retention features or tabs described herein. The first and second medical gowns 700a, 750a may be removably coupled to one another along an interface 730a. The interface 730a may generally extend along and between the terminal edge 704a and the neck edge 754a. The first and second medical gowns 700a 750a may be removably coupled to one another using the plurality of tabs 758a. For example, each tab of the plurality of tabs 758a may be adhered or otherwise connected to corresponding receiving ports of the receiving ports 708a. This may allow a user to advance medical gowns from a stack or roll by pulling one of the medical gowns. For example, the medical gown may be advanced with respect to a gown dispensing device. The advanced medical gown may then be separated from a bulk of the roll or stack of gowns for use in the dispensing device, as needed.

In FIG. 7A, the plurality of tabs 758a may be used to releasably secure adjacent gowns to one another. The tabs 758a may further be subsequently used to suspend and manipulate the medical gown 750a. In the example of FIG. 7B, an arrangement is shown in which additional features are used to facilitate the removable coupling of adjacent gowns of the roll or the stack. For example, FIG. 7B shows a first medical gown 700b having a main body 702b and terminal edge 704b. FIG. 7B further shows a second medical gown 750b having a main body 752b, a neck edge 754b, and a plurality of tabs 758b. The arrangement of FIG. 7B further includes a plurality of sacrificial connectors 760b. The plurality of sacrificial connectors 760b may be generally connected to and formed from the same material as the main body 752b of the medical gown 750b. A line of perforations 732b may separate the plurality of sacrificial connectors 760b from the main body 752b. The plurality of sacrificial connectors 760b may be connected to, such as being adhered to, the main body 702b of the medical gown 700b along the terminal edge 704b, opposite the line of perforations 732b. The line of perforations 732b may extend along the interface 730b. The line of perforations 732b may be sufficiently robust such that the second medical gown 750b may pull the first medical gown 700b and advance the gown 700a in the roll or stack. Additionally, the second medical gown 750b may be separated from the first medical gown 700b as needed by tearing the sacrificial connectors 760a along the interface 730b.

The packaging assembly, including a stack or a roll, of the medical gowns may be used and advanced with respect a gown dispensing device, as shown in FIGS. 8A-8C. In FIG. 8A, a gown dispensing device 800 is shown. One such gown dispensing device is described in U.S. Pat. Application No. 63/227,440, entitled "DONNING STATION FOR PERSONAL PROTECTIVE EQUIPMENT," which is incorporated by reference herein. In FIG. 8A, the gown dispensing device 800 is shown loaded with a roll 802 of medical gowns. The roll 802 may include a packaging of multiple medical gowns, arranged end-to-end, as shown in the examples above with respect to FIGS. 6-7B. The roll 802 may include an axial component 804 about which the medical gowns are arranged. The gown dispensing device 800 may include a support structure 812 and roll mount 814. The support structure 812 may be used to connect the gown dispensing device 800 to a wall or other structure in order to support a weight of the roll and various mechanism components of the device. The roll mount 814, in the example of FIG. 8A, may include a seat for the axial component 804 of the roll 802. The axial component 804 may be seated in the roll mount 814 and allow to rotate therein.

Figure 25:
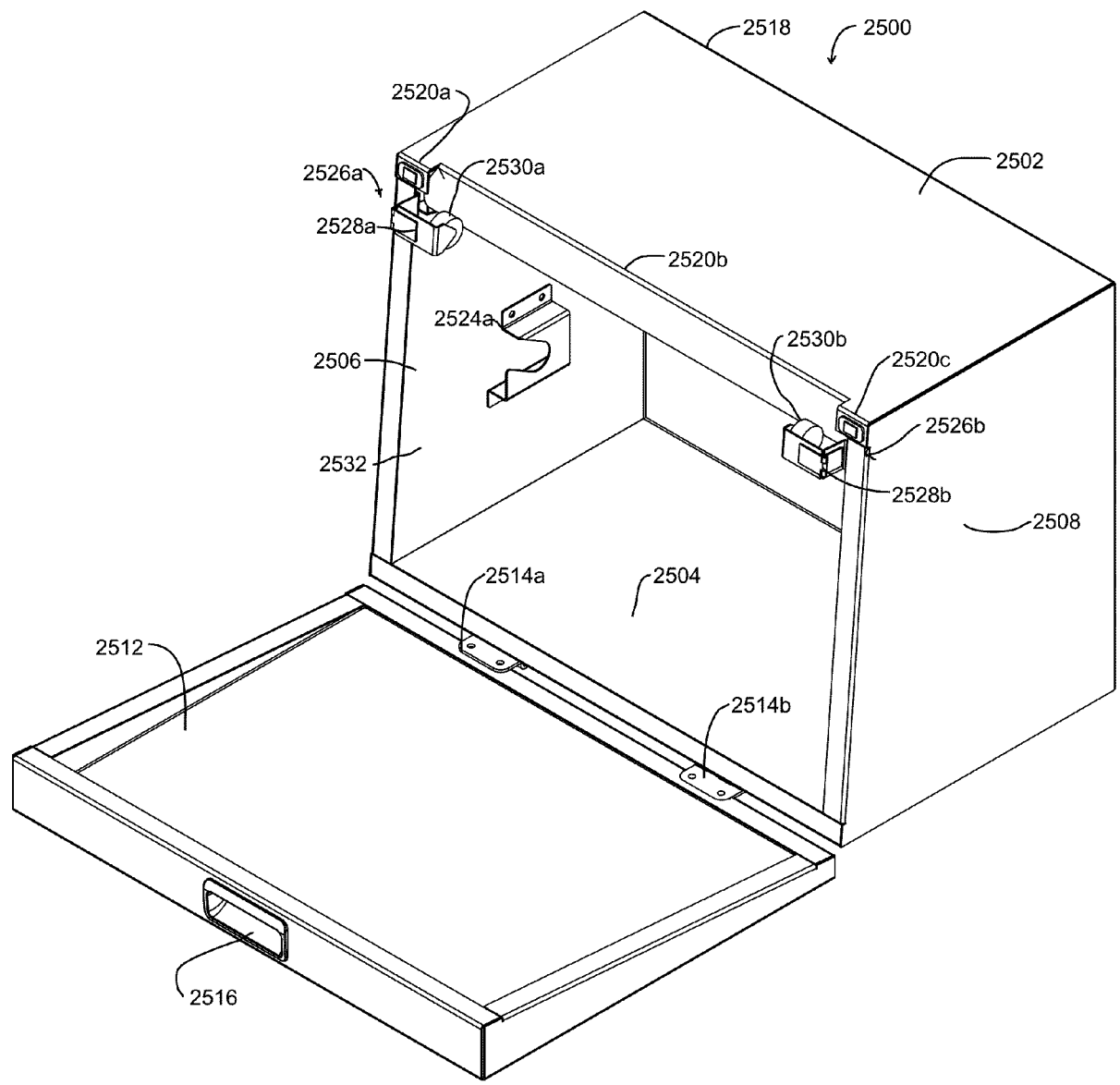
FIG. 25 depicts a perspective view of a gown container for use with a gown dispensing device.

In other examples, a gown dispensing device may include a gown container 2500, as shown in FIG. 25. The gown container 2500 may be constructed of a top wall 2502, bottom wall 2504, first side wall 2506, second side wall 2508, and rear wall 2510. The top wall 2502 may be substantially parallel to the bottom wall 2504 and the first side wall 2506 may be substantially parallel to the second side wall 2508. A front cover 2512 may be attached to the bottom wall 2504 by hinges 2514a and 2514b. The front cover 2512 may rotate about the hinges 2514a and 2514b to close the gown container 2500. A handle 2516 may be utilized to disengage the front cover 2512 from the remainder of the gown container 2500 to open and/or close the gown container.

In various examples, the top wall 2502 of the gown container 2500 may extend from a back edge 2518 to a front edge including a first portion 2520a, a second portion 2520b, and a third portion 2520c, where the first portion 2520a and the third portion 2520c may be a greater distance from the back edge 2518 than the second portion 2520b. Accordingly, with reference, for example to FIG. 30, an opening 2522 may be formed in the container 2500 when the front cover 2512 is closed. The opening 2522 may provide an opening for a medical gown to be dispensed from the gown container 2500.

Returning to FIG. 25, the gown container 2500 may further include a roll mount assembly including a first seat 2524a mounted on an inner surface 2532 of the first side wall 2506 and a second seat (not depicted) mounted on an inner surface of the second side wall 2508 opposite the first seat 2524a. The first seat 2524a and the second seat may, together, provide a seat for the axial component 804 of the roll 802 allowing the axial component 804 to rotate within the roll mount assembly.

The gown container 2500 may further include retention assemblies 2526a and 2526b. The retention assembly 2526a may include an arm 2528a and a roller 2530a and may be connected to, and movable with respect to, the inner surface 2532 of the first side wall 2506. The retention assembly 2526b may similarly include an arm 2528b and a roller 2530b and may connected to, and movable with respect to, the inner surface of the second side wall 2508. Such retention assemblies 2526a and 2526b may be configured to contact a gown retained in the gown container 2500, such that the gown is in contact with the rollers 2530a and 2530b and the second portion 2520b of the front edge of the top wall 2502 of the gown container 2500.

Figure 26:
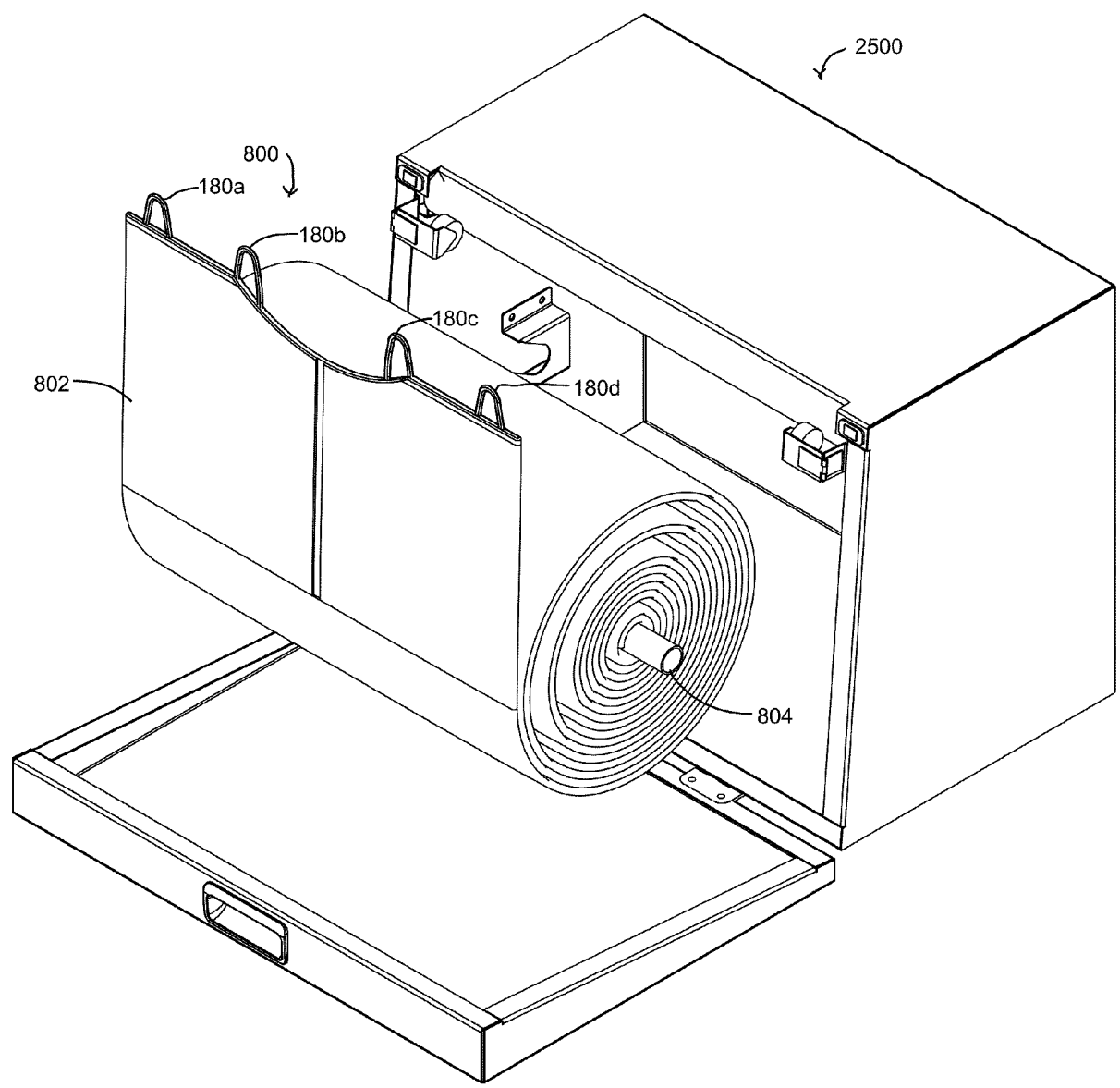
FIG. 26 depicts a perspective view of the gown container and a roll of medical gowns for use with the gown dispensing device.
Figure 28A:
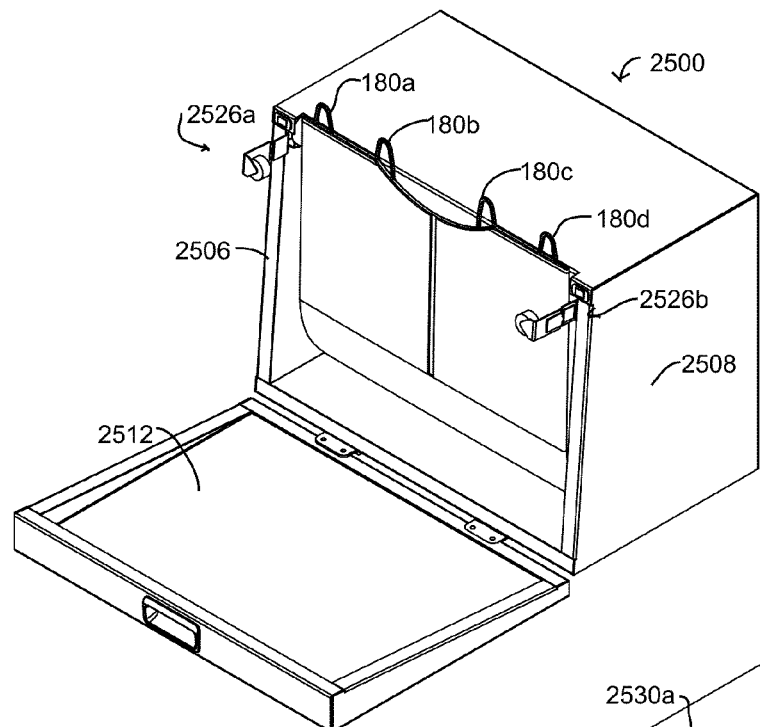
FIG. 28A depicts a perspective view of a gown container retaining a roll of medical gowns for use with the gown dispensing device.
Figure 28B:
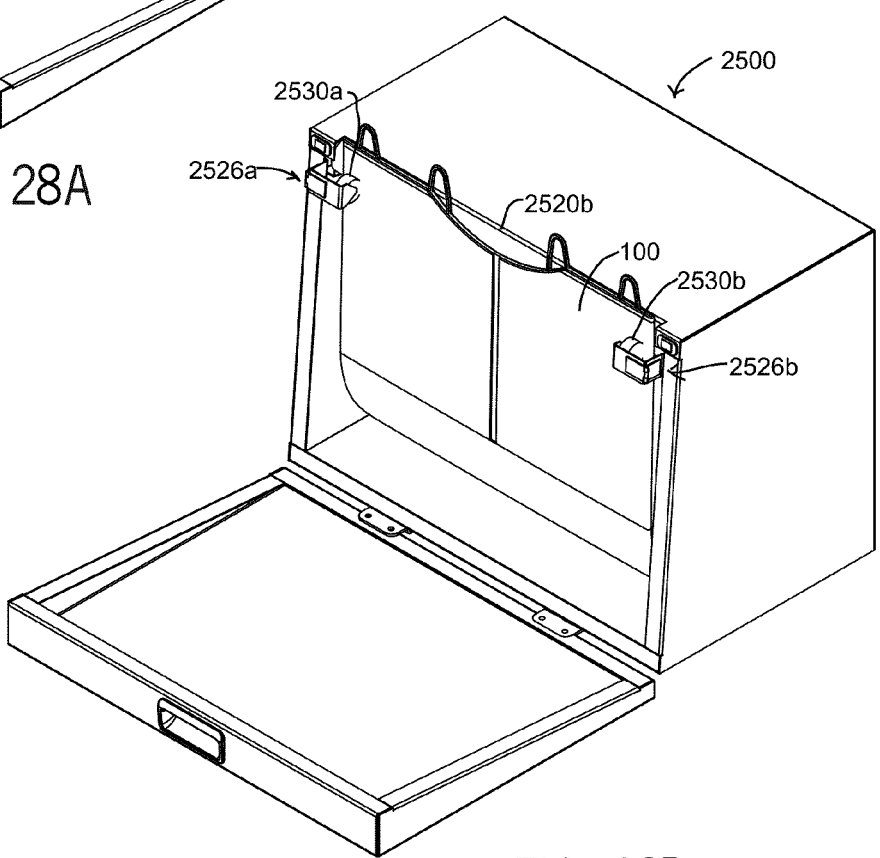
FIG. 28B depicts another perspective view of the gown container retaining the roll of medical gowns for use with the gown dispensing device.

With reference to FIGS. 26, 28A, and 28B, The gown dispensing container 2500 may retain a roll 800 of medical gowns. As shown in FIG. 26, the roll 800 may include the rolled gowns 802 and an axial component 804, with the gowns 802 rolled about the axial component 804. The roll 800 of gowns may be oriented within the gown container 2500 such that the engagement features 180a-180d of the gown being dispensed from the gown container protrude through the opening 2522 of the gown container 2500.

Figure 30:
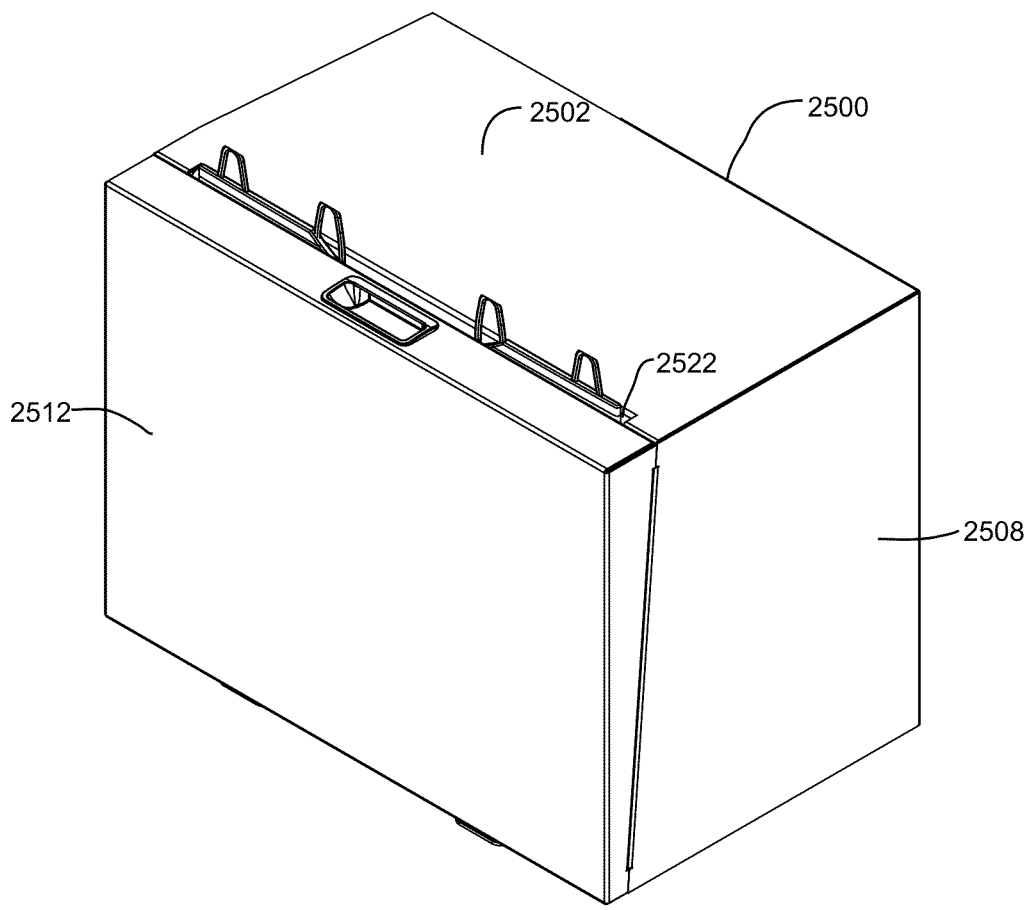
FIG. 30 depicts a perspective view of a gown container with a medical gown positioned for use with the gown dispensing device.

As shown in FIGS. 28A and 28B, the roll 800 of gowns may be loaded into the gown container 2500 for dispensing the gowns. As shown in FIG. 28A, the roll 800 of gowns is loaded into the container 2500 such that the axial component 804 of the roll 800 is seated in the first seat 2524a and the second seat 2524b and the engagement features 180a-180d of the first gown 100 are protruding through the opening 2522 of the gown container 2500. To load the roll 800 into the container 2500, the retention assemblies 2526a and 2526b may be moved such that the arms 2528a and 2528b of the assemblies are parallel with the first side wall 2506 and the second side wall 2508, respectively, allowing the roll 800 to slide into the gown container 2500. With reference to FIG. 28B, the retention assemblies 2526a and 2526b may then be rotated such that the rollers 2530a and 2530b are in contact with the first gown 100 and the gown 100 is held between the second portion of the front edge 2520b of the gown container 2500 and the rollers 2530a and 2530b. The retention assemblies 2526a and 2526b may include spring loaded components to facilitate retention of the gown. In various examples, when the gown 100 is dispensed from the gown container 2500, the rollers 2530a and 2530b may rotate to facilitate movement of the gown 100. After the roll 800 is loaded, the front lid 2512 may be closed, as shown in FIG. 30.

Figure 27:
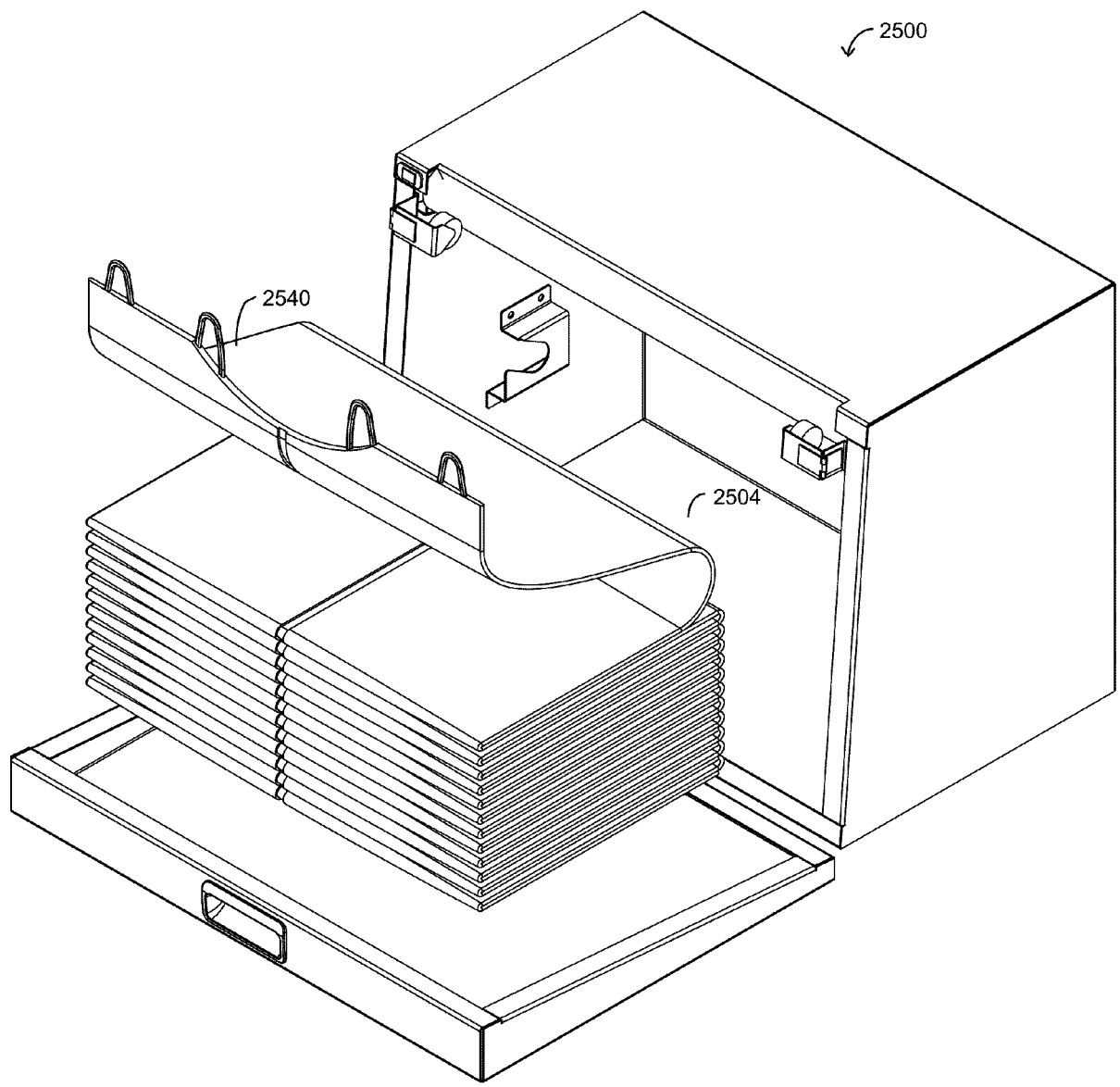
FIG. 27 depicts a perspective view of the gown container and a stack of medical gowns for use with the gown dispensing device.
Figures 29A, 29B:
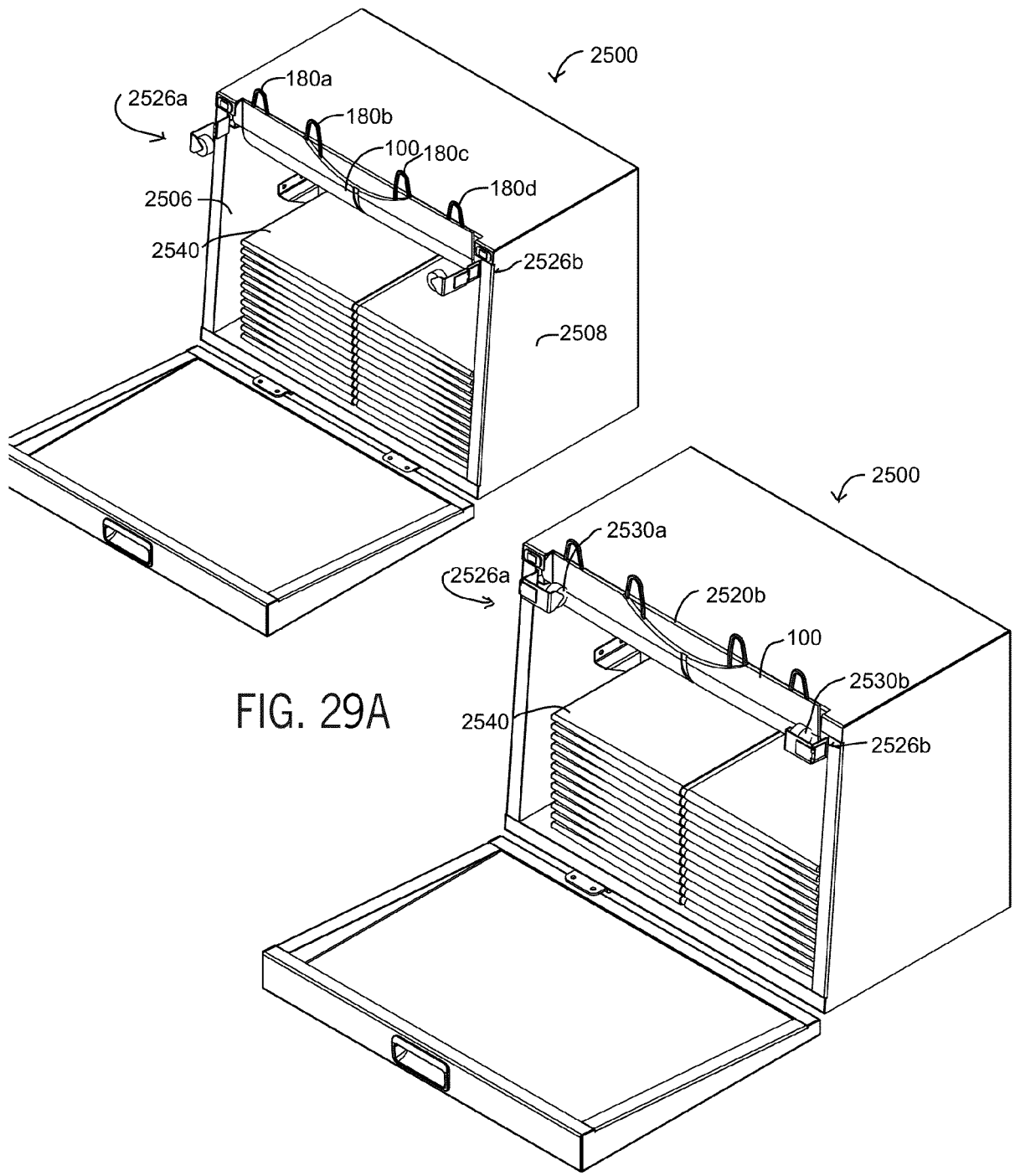
FIG. 29A depicts a perspective view of a gown container retaining a stack of medical gowns for use with the gown dispensing device.
FIG. 29B depicts another perspective view of the gown container retaining the stack of medical gowns for use with gown dispensing device.

The gown dispensing container 2500 may also retain a stack of medical gowns 2540, as shown in FIG. 27. The stack of gowns 2540 may be the same or similar to the stack 600 shown in FIG. 6. As shown in FIG. 27, the stack of gowns 2540 may be placed in the gown container 2500 and may rest on the bottom wall 2504 of the gown container. With reference to FIG. 29A, when the stack of gowns 2540 is placed in the gown container 2500, the retention assemblies 2526a and 2526b may be moved such that the arms 2528a and 2528b of the assemblies are parallel with the first side wall 2506 and the second side wall 2508, respectively. With reference to FIG. 29B, the retention assemblies 2526a and 2526b may then be rotated such that the roller 2530a and 2530b are in contact with the first gown 100 and the gown 100 is held between the second portion of the front edge 2520b of the gown container 2500 and the rollers 2530a and 2530b. The retention assemblies 2526a and 2526b may include spring loaded components to facilitate retention of the gown. In various examples, when the gown 100 is dispensed from the gown container 2500, the rollers 2530a and 2530b may rotate to facilitate movement of the gown 100. After the stack 2540 is loaded, the front lid 2512 may be closed, as shown in FIG. 30.

The gown dispensing device 800 is also shown as including a manipulation assembly 810. The manipulation assembly 810 may broadly include a collection of components of the gown dispensing device that are configured to facilitate the advancement of a medical gown form the roll 802 and manipulate the medical gown for an automated or substantially automated donning operation, described herein. In the example of FIG. 8A, the manipulation assembly 810 is shown including a rolling component 816. The rolling components 816 may include a pair of rollers through which a medical gown of the roll 802 is received. The rolling components 816 may operate, via an electromechanically assisted operation, to pull a medical gown from the roll 802. In this regard, and as shown in FIG. 8A, the medical gown 100 may be pulled from the roll 802 for suspension and manipulation by the gown dispensing device 800.

In FIG. 8B, the medical gown 100 is shown separated from the roll 802 and engagement on one or more manipulation features of the gown dispensing device 800. In one example, the gown dispensing device 800 may include a first manipulation feature 822a, a second manipulation feature 822b, a third manipulation feature 822c, and a fourth manipulation feature 822d. The first manipulation feature 822a may be movable relative to the support structure 812 via an engagement arm 818a. The fourth manipulation feature 822d may be movably relative to the support structure 812 via an engagement arm 818b. The second and the third manipulation features 822b, 822c may generally be stationary relative to the support structure 812. In other cases, the second and third manipulation features 822b, 822c may be movable as well. In FIG. 8B, the medical gown 100 is shown separated from the roll 802 and suspended from one or more of the manipulation features 822a-822d via the plurality of tabs 180. As described herein, one or more of the manipulation features 822a-822d may subsequently operate to manipulation the main body 110 of the medical gown 100 in order to facilitate donning.

Figure 24A:
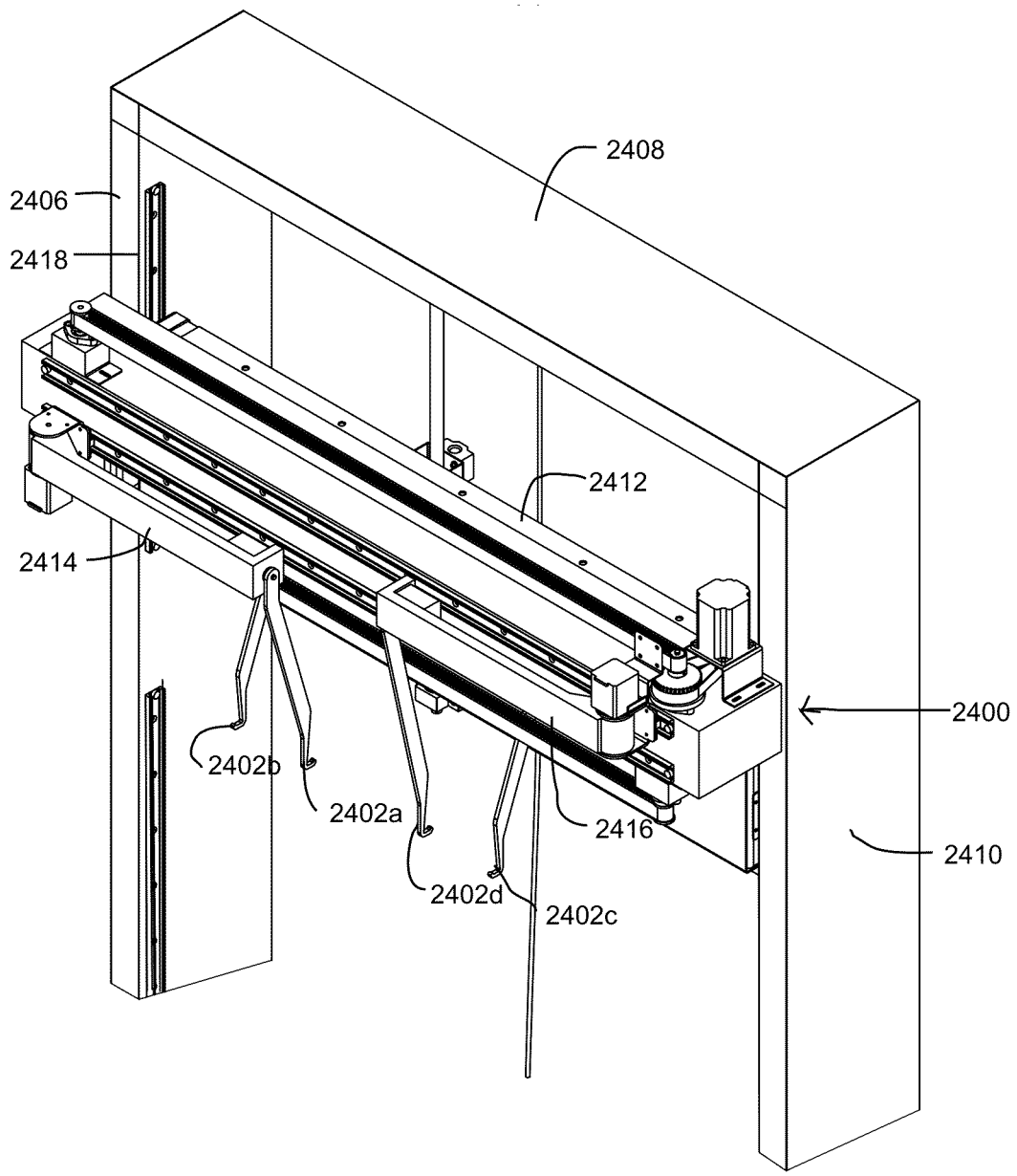
FIG. 24A depicts a perspective view of a manipulation assembly of a gown dispensing device.

Another example of a manipulation assembly 2400 including manipulation features 2402a-2402d is shown in FIGS. 24A-24E. With reference to FIG. 24A, the manipulation assembly 2400 may generally include a support structure 2412, arms 2414 and 2416 coupled to the support structure 2412, manipulation features 2402a and 2402d coupled to the arms 2414 and 2416, respectively, and manipulation features 2402b and 2402 coupled to the support structure 2412. As shown in FIG. 24A, the manipulation assembly may be mounted to a support frame 2404 of a gown dispensing device. The support frame 2404 may generally include a first side 2406, and second side 2410, and a top portion 2408 spanning between the first side 2406 and the second side 2408. The support structure 2412 of the manipulation assembly 2400 may be mounted to the support frame 2404 through connection to the first side 2408 and the second side 2410. In some examples, the support structure 2412 may be movably connected to the support frame 2400 (e.g., via tracks 2418 on inner surfaces of the first side 2406 and second side 2410 of the support frame 2410). Accordingly, the manipulation assembly 2400 may move relative to the support frame 2404 of the gown dispensing device.

Figure 24B:
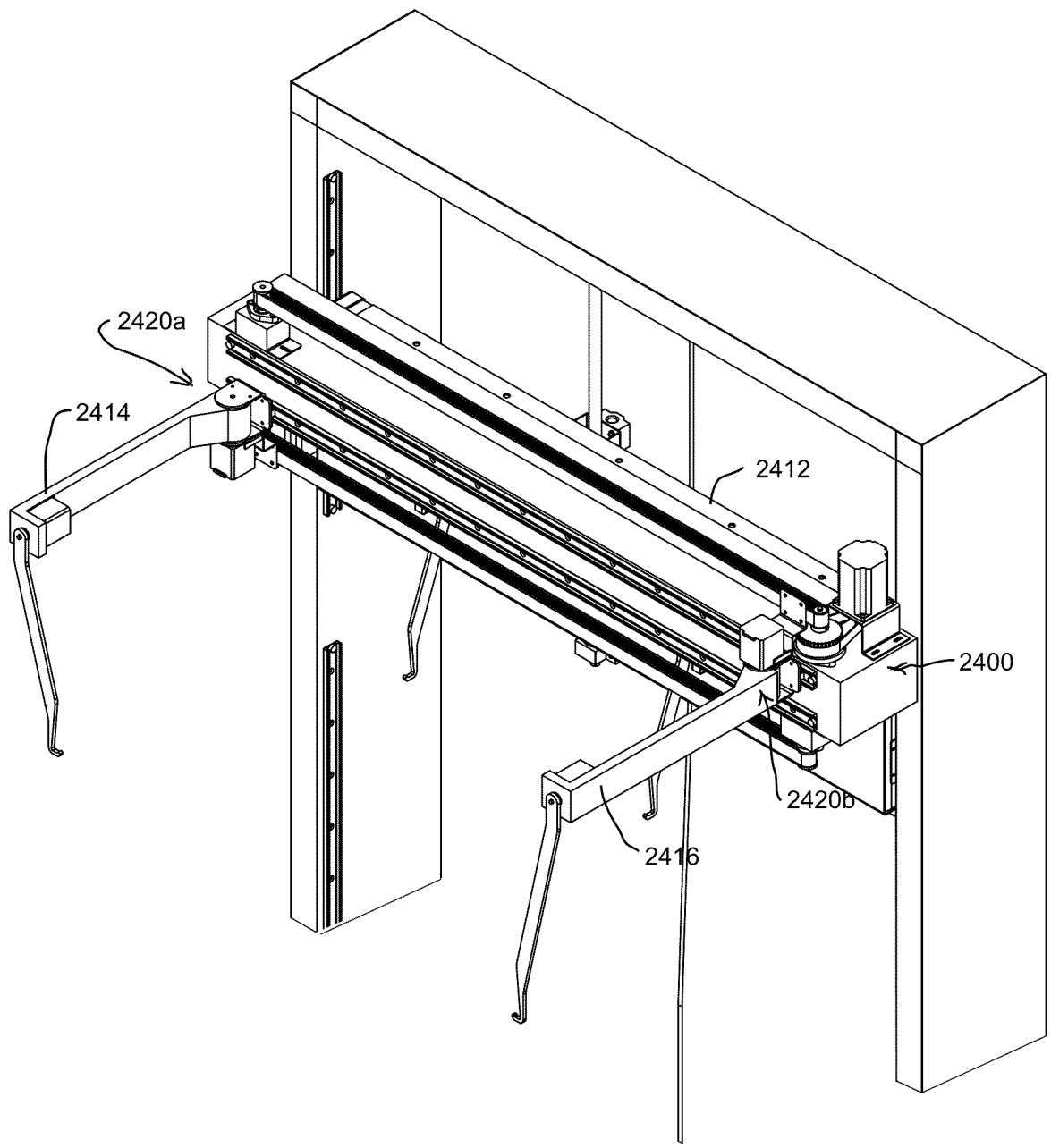
FIG. 24B depicts a perspective view of an operation of the manipulation assembly of the gown dispensing device.
Figure 24C:
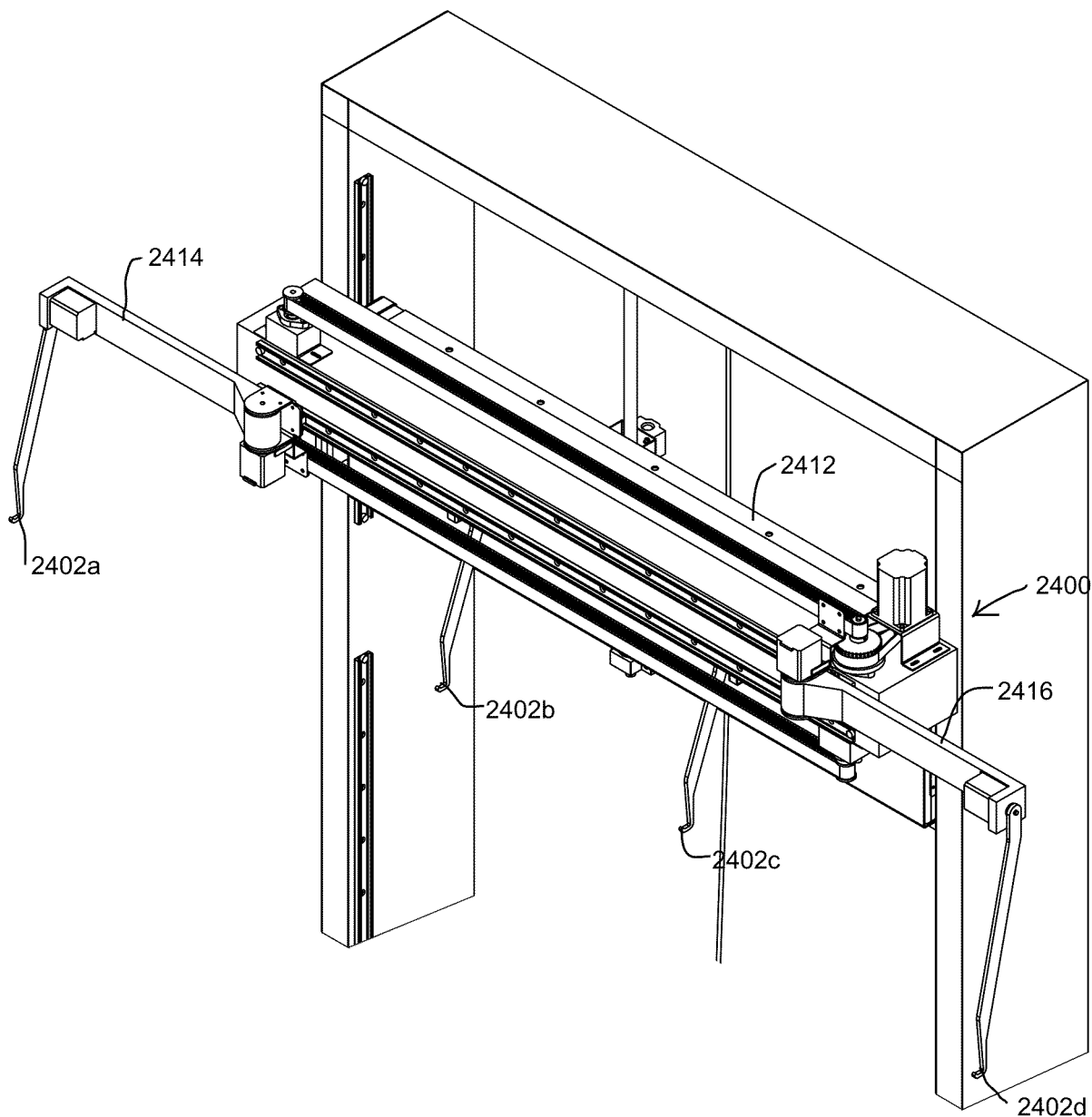
FIG. 24C depicts a perspective view of another operation of the manipulation assembly of the gown dispensing device.
Figure 24D:
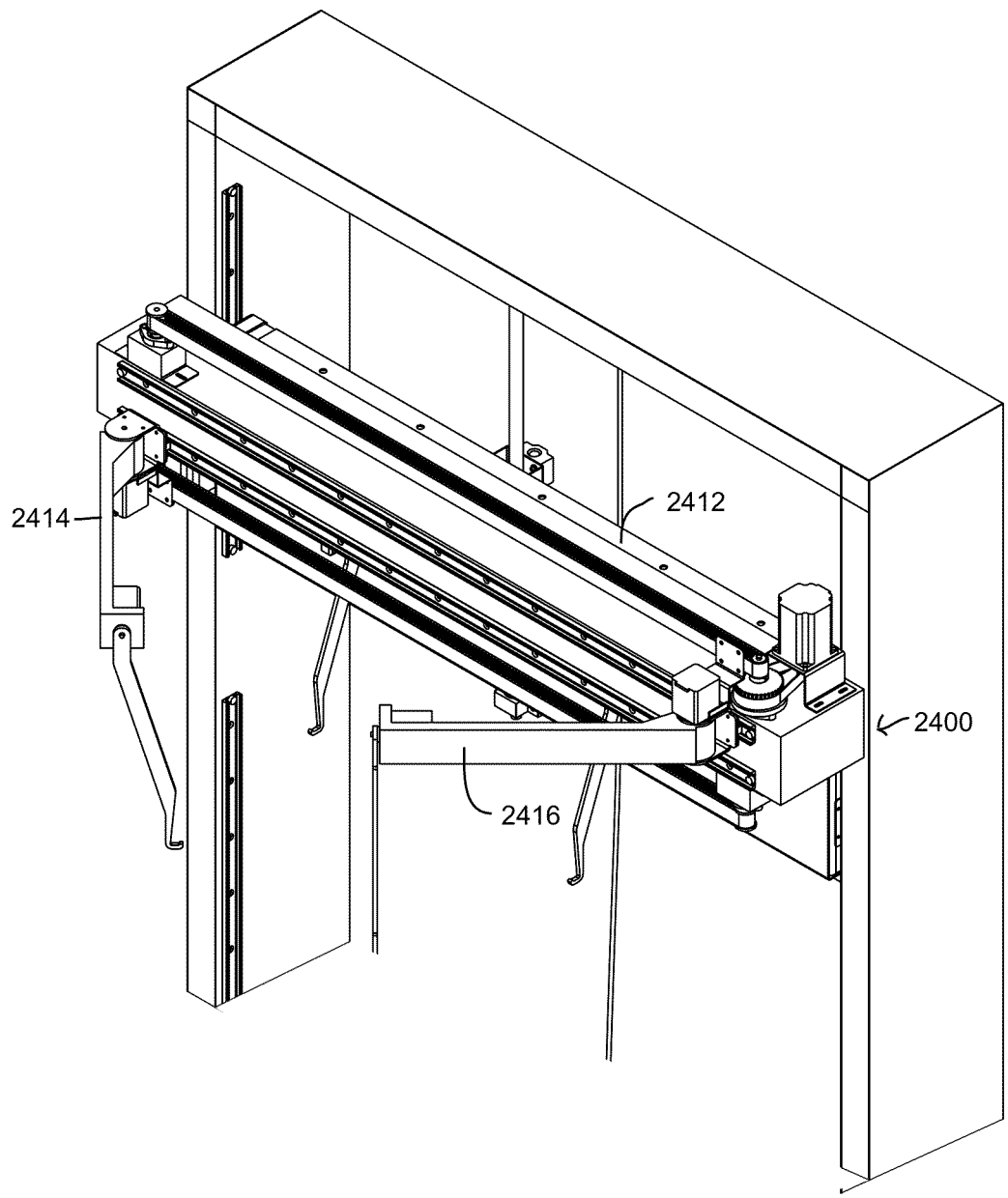
FIG. 24D depicts a perspective view of another operation of the manipulation assembly of the gown dispensing device.
Figure 24E:
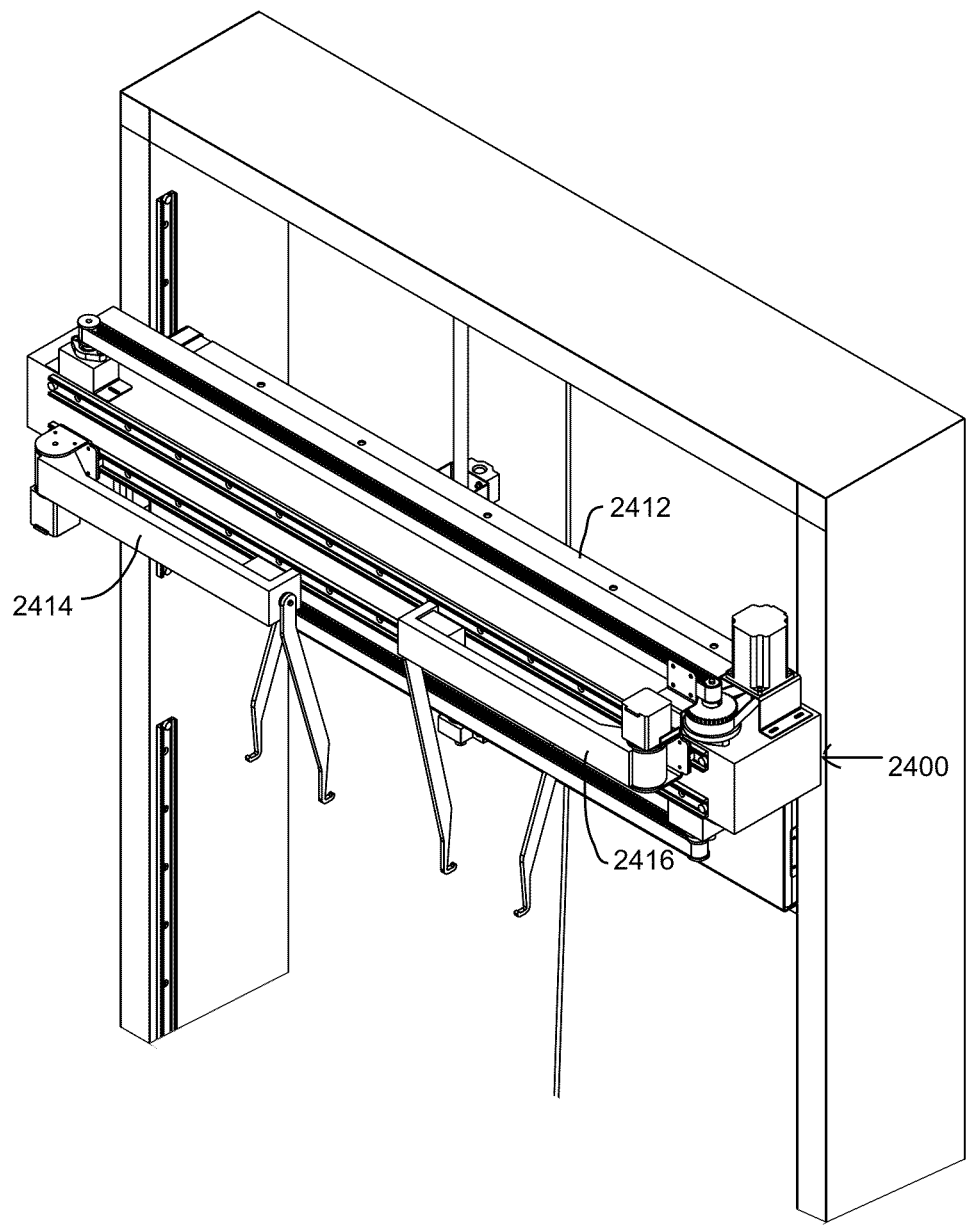
FIG. 24E depicts a perspective view of another operation of the manipulation assembly of the gown dispensing device.

With reference to FIG. 24B, the arms 2414 and 2416 may be rotatably connected to the support structure 2412 using hinge assemblies 2420a and 2420b, respectively. Such hinge assemblies may be formed by a socket portion of the arms 2414 and 2416 rotatable about a pin of the support structure 2412. In various examples, the hinge assemblies 2420a and 2420b may allow the arms 2414 and 2416 to rotate outward and inward in various positions relative to the support structure 2412, as shown in FIGS. 24C-24E. In various examples, the manipulation assembly 2400 may include motors or other means to automatically rotate the arms 2414 and 2416 relative to the support structure 2412. In some examples, the manipulation assembly 2400 may further include motors, pulleys, or other means to move the manipulation assembly 2400 relative to the support frame 2404. For example, the support structure 2412 may include wheels, rollers, or other elements engaged with tracks 2418 on the support frame 2404, which elements may be movable using a motor, pulley, or other means.

Figure 32A:
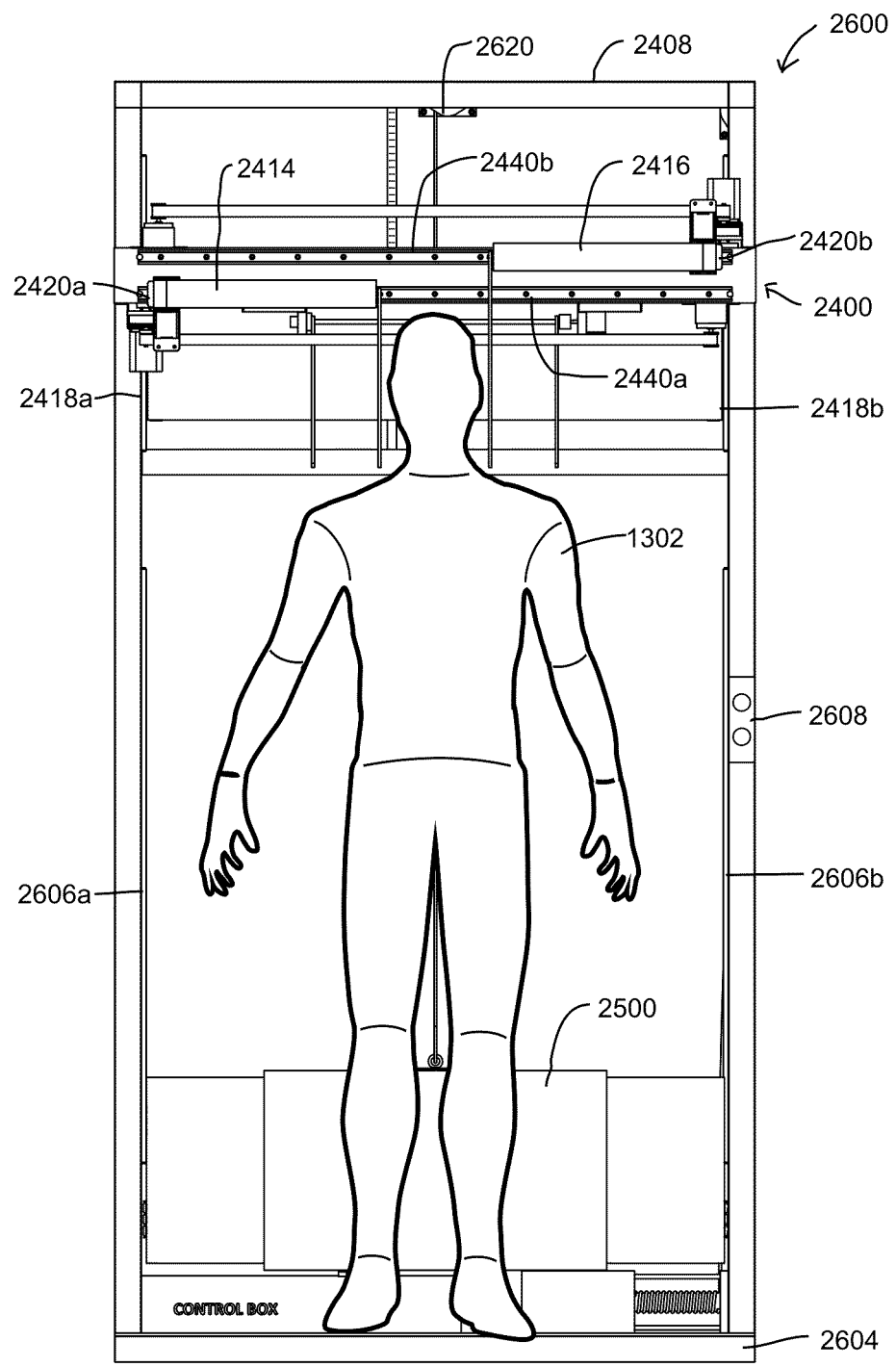
FIG. 32A depicts a rear view of an operation of donning a medical gown.

With reference to FIG. 32A, the arms hinge assemblies 2420a and 2420b may be connected to tracks 2440a and 2440b respectively, such that the hinge assemblies 2420a and 2420 may move with respect to the first and second sides of the frame 2404. In this manner, the arms 2414 and 2416 may rotate about the hinge assemblies 2420a and 2420b and may, additionally, move laterally across the width of a gown dispensing device, facilitating automated donning of a medical gown by the user.

With reference to FIG. 24A, the manipulation features 2402a-2402d may be configured to interface or interconnect with engagement features (e.g., tabs) 180a-180d of a medical gown 100, similar to the manipulation features 822a-822d discussed herein. The manipulation features 2402a-2402d may, for example, include hooks configured to engage with apertures or openings in the engagement features 180a-180d of the medical gown 100 to suspend the medical gown 100 for donning by a user. In various examples, the manipulation features 2402a and 2402d may be rotatably connected to arms 2414 and 2416, respectively. The manipulation features 2402b and 2402c may be rotatably connected to the support structure 2412. Accordingly, when the arms 2414 and 2416 are fully extended with respect to the support structure 2412, as shown in FIG. 24C, the gown 100 may be fully opened for donning. As the arms 2414 and 2416 move relative to the support structure 2412, the manipulation features 2402a-2402d may move to, for example, wrap the gown 100 around portions of a user donning the gown 100 using the gown dispensing device.

Figure 11:
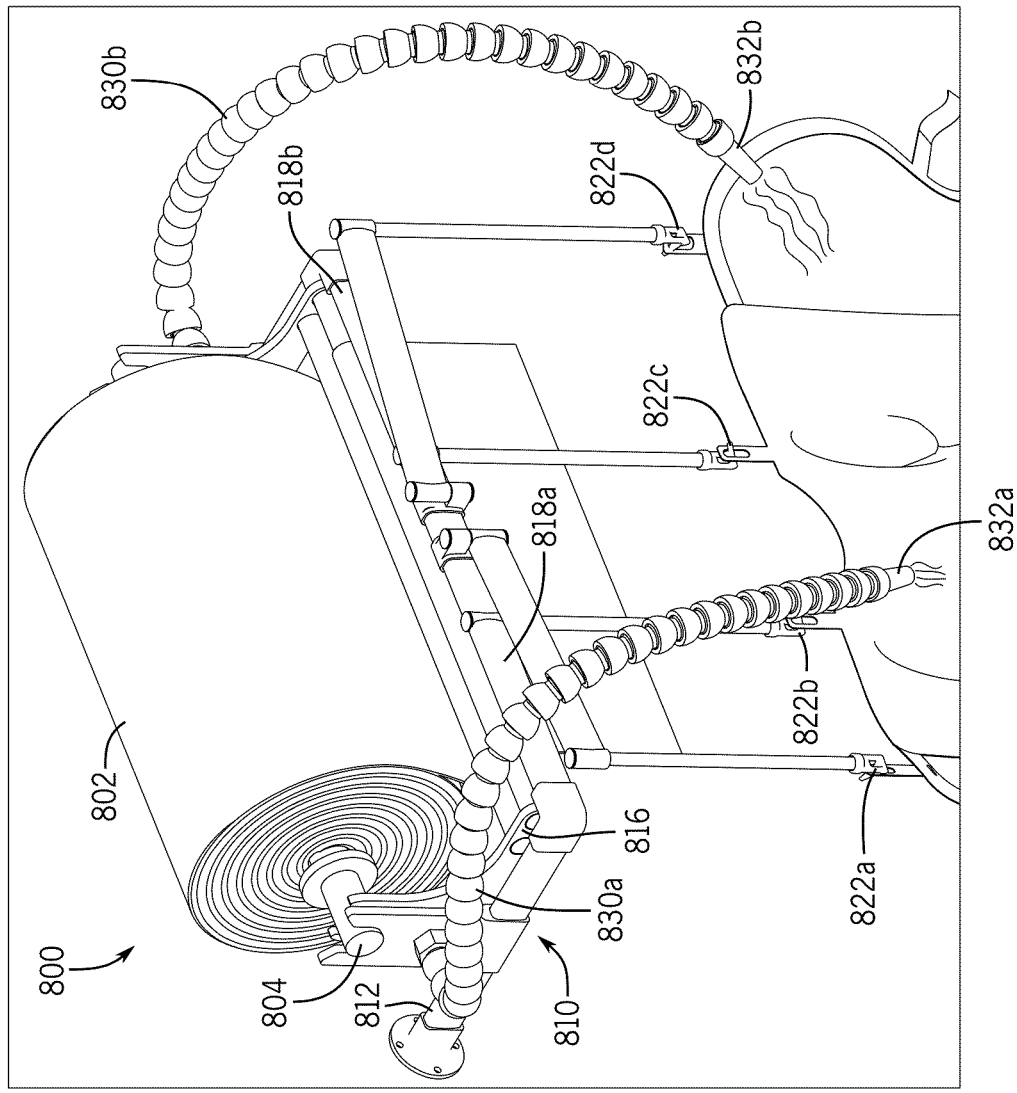
FIG. 11 depicts the gown donning system of FIG. 8A including an unfurling feature.

The medical gown 100 may initially be presented in the folded pstate in FIG. 8B. In FIG. 8C, the medical gown 100 is shown unfurled or unfolded, and ready for donning. In the unfurled state, each retention feature of the plurality of retention features 180 is engaged with a respective manipulation feature 822a-822d. In some cases, the material construction of the medical gown may make the medical gown clingy or otherwise difficult to unfurl. In this regard, and as shown in FIG. 11, the gown dispensing device 800 may include a first air hose 830a with a first air nozzle 832a, and a second air hose 830b with a second air nozzle 832b. The first and second air hoses 830a, 830b may be connected to fans, air pumps, an air supply, etc., such as a building's compressed air supply and/or other source. The hoses 830a, 830b may be manipulateable in order to direct the nozzles 832a, 832b toward the main body 110. On command, a burst of air may be delivered through one or both of the hoses 830a, 830b, which in turn may facilitate separating material layers or portions of main body 110.

Figure 12:
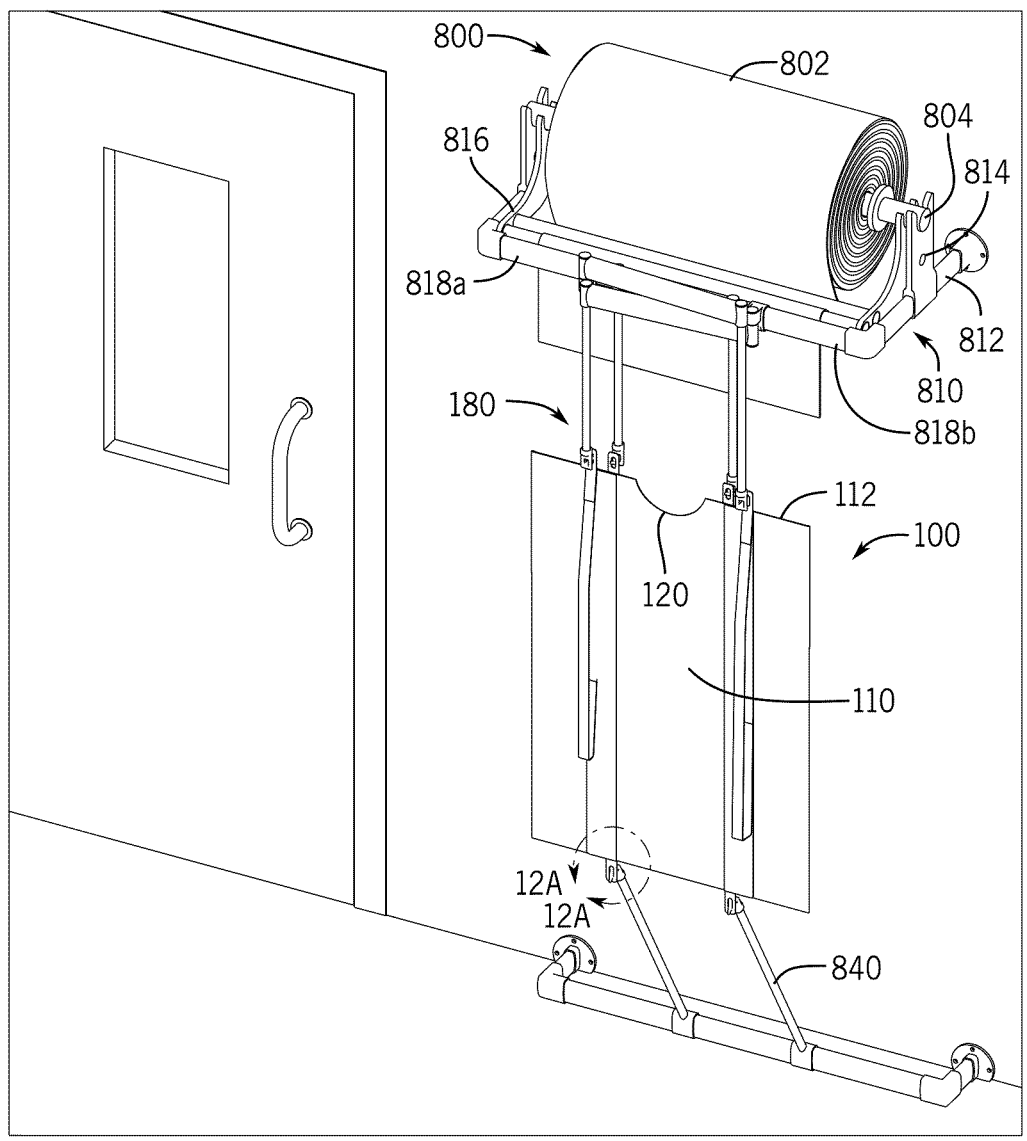
FIG. 12 depicts the gown donning system of FIG. 8A including terminal edge tabs.
Figure 12A:
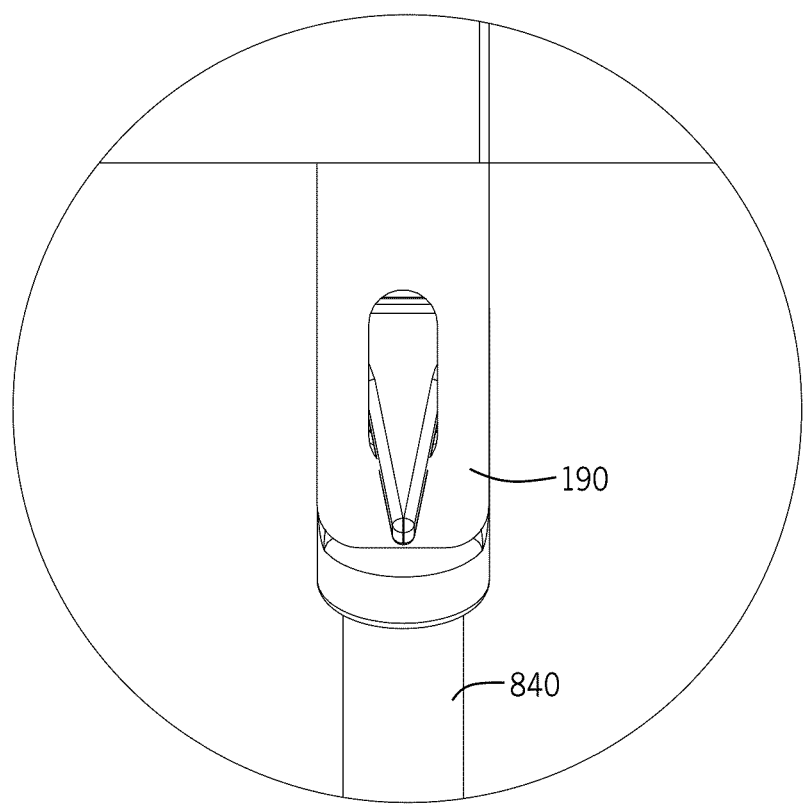
FIG. 12A depicts details 12A-12A of FIG. 12.

In some cases, it may be desirable to secure the terminal edge 118 of the medical gown 100 in the gown dispensing device 800. Securing the terminal edge 118, for example, may help anchor the medical gown during unfurling, for example, while receiving the burst of air. Additionally or alternatively, anchoring the terminal edge 118 may help provide additional support or firmness to the medical gown 100 during a donning process, for example, by making the main body 110 taught. In this regard, FIGS. 12 and 12A shows the gown dispensing device 800 including optional bottom anchors 840. The bottom anchors 840 may include elongated poles with hooks or other features at the end that are adapted to engage the terminal edge 118 of the medical gown 100. In some cases, as shown in the detail view of FIG. 12A, the medical gown 100 may include bottom tabs 190 that may be configured to receive the bottom anchor 840, and thereby anchoring the medical gown 100 with respect to the gown dispensing device 800.

Figure 31:
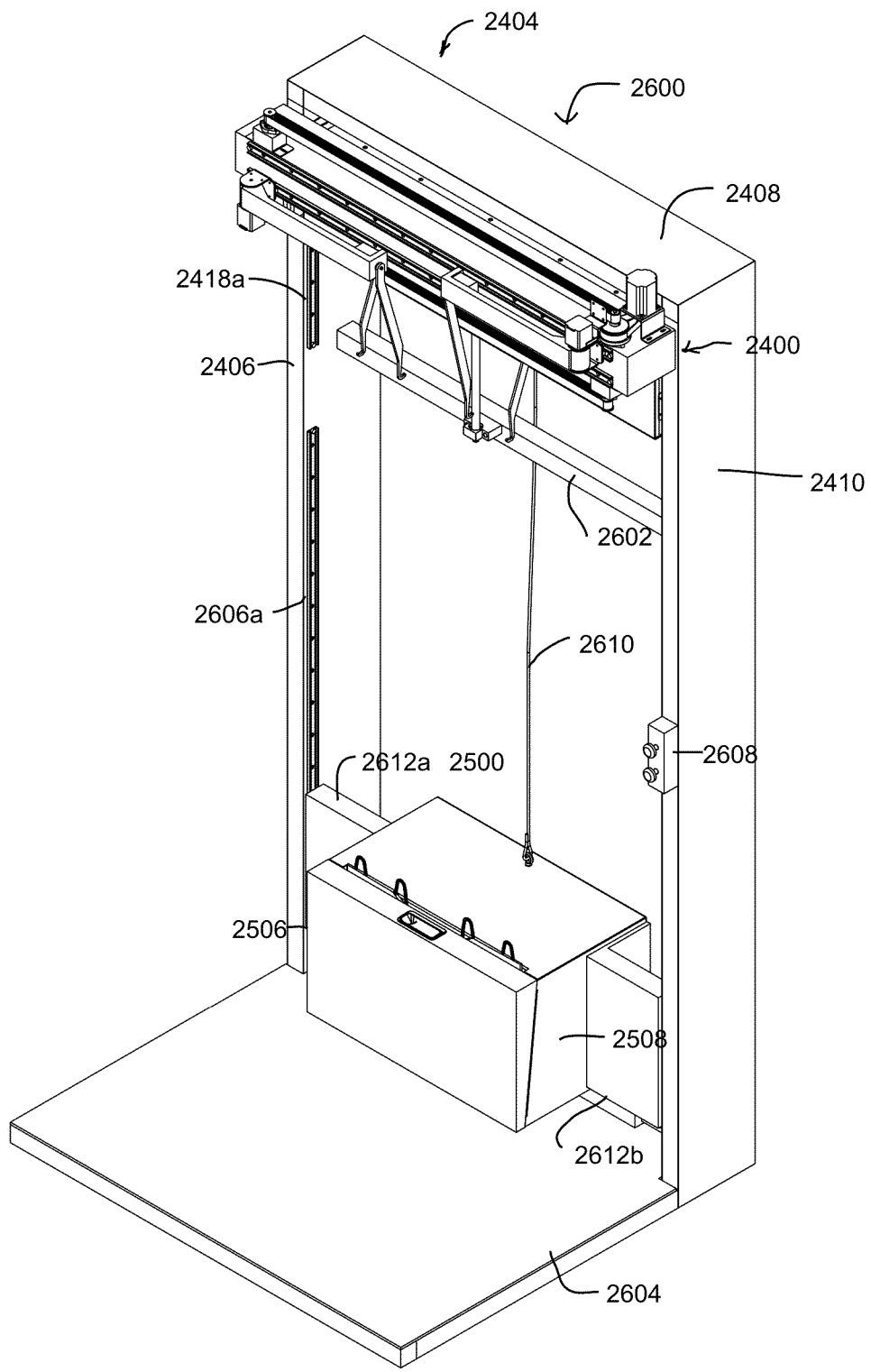
FIG. 31 depicts a perspective view of a gown dispensing device.

FIG. 31 shows another example gown dispensing device 2600 including a manipulation assembly 2400 and a gown container 2500. The gown dispensing device 2600 may include a base 2604 and the frame 2404 attached to the base 2604. Though shown as a freestanding device, the gown dispensing device 2600 may, in various examples, be mobile, mounted to a wall, and the like. As shown, the frame 2404 may include a first side 2406 and a second side 2410 each attached to the base 2604 and a top portion 2508 connecting the first side 2406 to the second side 2410. In some examples, the frame 2404 may include additional components, such as a bracing element 2602 extending from the first side 2406 and the second side 2410 to strengthen the frame 2404.

As shown, the gown container 2500 may be placed at, on, or near the base 2604. The gown container 2500 may be attached or connected to supports 2612a and 2612b on either side of the gown container 2500. The support 2612a extends between the first side 2406 of the frame 2404 and the first wall 2506 of the gown container 2500. The support 2612b extends between the second wall 2508 of the gown container 2500 and the second side 2410 of the frame 2404. In various examples, the supports 2612a and 2612b may engage with tracks 2606a and 2606b, respectively, to allow the gown container 2500 to move with respect to the frame 2404. For example, the gown container 2500 may move upward from the base 2604 at the beginning of a donning process and/or the manipulation assembly 2400 moves downward so that the manipulation features of the manipulation assembly 2400 may engage with retention features of the gown 100 being dispensed. For example, the supports 2612a and 2612b may include wheels, rollers, or other elements received in the tracks 2606a and 2606b, respectively. In some examples, the wheels or rollers may be motor driven. In other examples, the gown container 2500 may be connected to a pulley assembly mounted in or on the frame 2404 by a cord 2610. Such a pulley assembly may be motor driven to automatically move the gown container 2500 with respect to the frame 2404. For example, the pulley assembly may wind the cord 2610 around the pulley, shortening the cord 2610, to move the gown container 2500 upward from the base 2604.

The gown dispensing device 2600 may further include a control, which may, when activated, begin an automated donning process and/or a step of the automated donning process. The control 2608 may be mounted on the frame 2404, the base 2604, a wall next to the gown dispensing device 2600, or may be separate from the gown dispensing device 2600. In various examples, the control 2608 may include one or more buttons, motion sensors, switches, or other components which may be activated to power operations of the gown dispensing device 2600. For example, the control 2608 may include a motion sensor such that a user may wave at the sensor to begin operation of the gown dispensing device 2600, or to begin/complete a step thereof. In another example, the control 2608 may be mounted on the base 2604 of the gown dispensing device 2600 and the user may activate the control 2608 using a foot.

Figure 21:
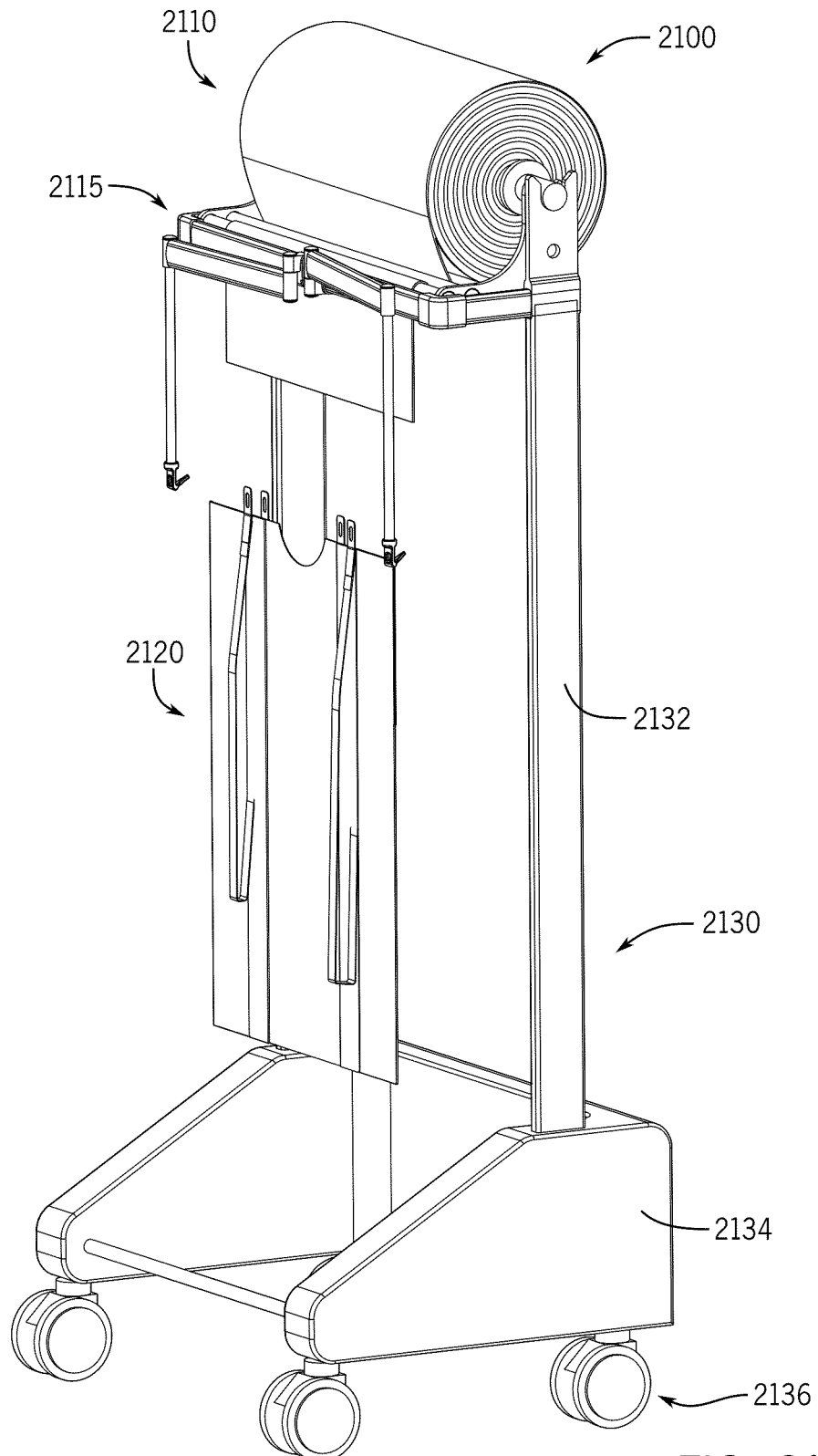
FIG. 21 depicts a mobile gown donning system.

The gown dispensing device 800 is shown for purposes of illustration as a wall-mounted system. In other examples, a mobile application is contemplated herein. For example, and with reference to FIG. 21, a mobile gown dispensing device 2100 is shown. The mobile gown dispensing device 2100 may be substantially analogous to the gown dispensing device 800 described above and include, among other components, a roll of medical gowns 2110, manipulation assembly 2115, and medical gown 2120; redundant explanation of which is omitted here for clarity. Notwithstanding the foregoing similarities, the mobile gown dispensing device 2100 is shown as including a mobile assembly 2130, including a support structure 2132, a base 2134, and wheels 2136. The wheels 2136 may be coupled to the base 2134 and permit movement of the base 2134, as needed. In some cases, the wheels 2136 may be selectively lockable to fix a position of the mobile gown dispensing device 2100 relative to a ground floor. The support structure 2132 may extend from the base 2134 and define a support or mount for the various components and systems described herein, including the roll 2110 and manipulation assembly 2115.

Figure 22:
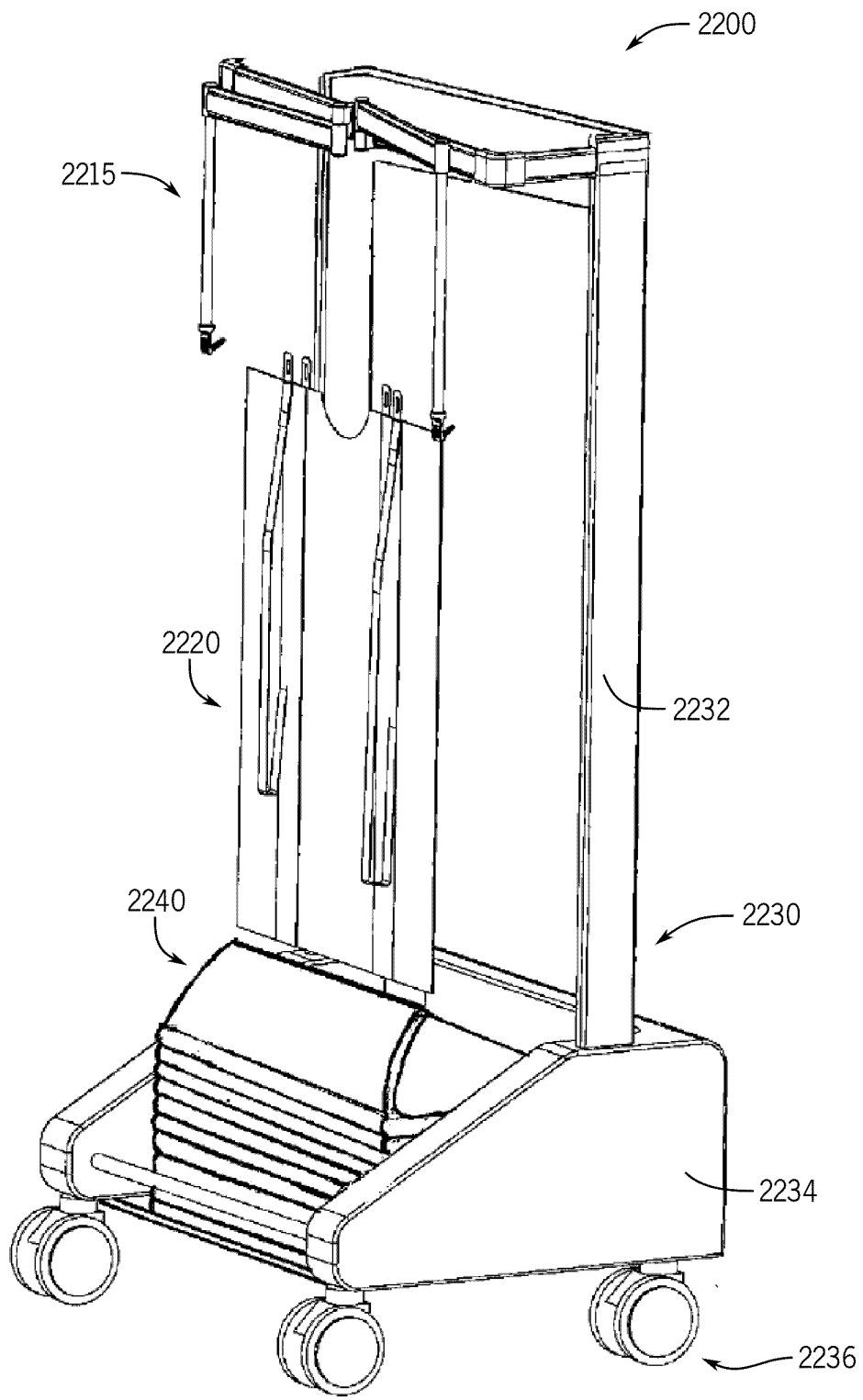
FIG. 22 depicts another example mobile gown donning system.

In another example, with reference to FIG. 22, a mobile gown dispensing device 2200 is shown. The mobile gown dispensing device 2200 may be substantially analogous to the mobile gown dispensing device 2100 described above and include, among other components, manipulation assembly 2215, a medical gown 2220, and a mobile assembly 2230 including support structure 2232, base 2234, and wheels 2236; redundant explanation of which is omitted here for clarity. Notwithstanding the foregoing similarities, the mobile gown dispensing device 2200 is shown as including a stack 2240 of medical gowns, positioned below the manipulation assembly 2215 within the base 2234. In various examples, a gown from the stack 2240 of medical gowns may be manually moved to the manipulation assembly 2215. In other examples, the manipulation assembly 2215 and/or portions of the manipulation assembly 2215 may be movable with respect to the base 2234. For example, arms of the manipulation assembly 2215 may be configured to move along the support structure 2232 (e.g., towards and away from the base 2234) to engage with a medical gown on top of the stack 2240 of gowns. For example, manipulation features of the manipulation assembly 2215 may engage with retention features of a gown in the stack 2240 such that, when the manipulation assembly 2215 moves upward along the support structure 2232 (e.g., away from the base 2234), the gown unfurls from the stack 2240 to prepare for donning using the mobile gown dispensing device 2200.

In operation, the medical gown 100 may be used in an automated or substantially automated donning process. For example, the medical gown 100 may be used with the gown dispensing device 800, or other gown dispensing devices, for automatically or substantially automatically donning the medical gown 100 on a user. With reference to the flow diagram of FIG. 23, a process 2300 is disclosed directing to donning the medical gown, such as donning the medical gown 100 in an automated or substantially automated process. It will be appreciated, however, that the medical gown 100, in other examples, may be donned free of assistance of the dispensing device and/or other system. For example, the medical gown 100 may be donned by a wearer separate from, or independent from, an operation of a dispensing device or automated or substantially automated system. With reference to the automated or substantially automated process 2300, at operation 2304, the medical gown 100 is presented suspended from a plurality of retention features. Steps for donning the disclosed gown are shown, schematically and step-wise, at FIGS. 13A-20B. Distances may not be drawn to scale. For example, and with reference to FIGS. 13A and 13B, the medical gown 100 is shown suspended from the gown dispensing device 800 and, the plurality of retention features 180 may be engaged with corresponding manipulation features of the manipulation features 822a-822d. The medical gown 100 is shown in FIGS. 13A and 13B suspended from the gown dispensing device 800 and presented at a front side of a user 1302. For purposes of illustration, the user 1300 is shown in FIGS. 13A and 13B as including a torso 1304, a first arm 1306 (e.g., a left arm) and a second arm 1308 (e.g., a right arm), at a distance from the gown dispensing device 800. The distance from user to device may not be to scale.

Subsequently or in combination with the operation 2304, the medical gown 100 may be unfurled, as described herein. The medical gown 100 may be unfurled or unfolded with a burst of air from the air hoses 830a, 830b. Additionally or alternatively, the medical gown 100 may be unfurled manually, such as by a user. Next, at operation 2308, the first arm 1306 of the user 1302 is received in the first arm feature 126a of the medical gown 100, as shown in FIGS. 14A and 14B. For example, the user 1302 may insert the first arm 1306 fully or partially within the first arm feature 126a such that the first arm 1306 is within the first sleeve 129a. With the first arm 1306 of the user 1302 within the first arm feature 126a, at operation 2312, the first material portion 130a of the medical gown 100 may be caused to wrap partially around the torso 1304 of the user 1302 using a first subset of the plurality of retention features 180. For example, and as shown in FIGS. 15A and 15B, the first manipulation feature 822a may operate to move first material portion 130a using the first retention feature 180a. In some cases, the first manipulation feature 822a may be engaged with the first retention feature 180a and may proceed in an arcuate path about a first side of the user 1302. The first retention feature 180a may be attached to the first strap feature 140, which is in turn attached to the first material portion 130a. In this regard, movement of the first manipulation feature 822a may cause the first retention feature 180a, the first strap feature 140, and the first material portion 130a to move, correspondingly, and wrap partially about the torso 1304.

The first manipulation feature 180a may continue moving about the torso 1304 until the first strap feature 140 presents at or adjacent to the second arm 1308. Subsequently, at operation 2316, and as shown in FIGS. 16A and 16B, the second arm 1308 of the user 1302 is received through the first loop 142 of the first strap feature 140. The first strap feature 140 may include the elastic component 150. In this regard, the first strap feature 140 may be flexible and expandable in order to accommodate a shape of the user 1300 and facilitate the receipt of the second arm 1308 into the first loop. Then, when the second arm 1308 is received through the first loop 142, the elastic component 150 may be allowed to contract and cause the first strap feature 140 to substantially conform to the user 1302. In other cases, the elastic component 150 may be omitted and/or the first strap feature 140 may be secured via another manner, including uses fasteners of various types.

The method of donning may proceed with operation 2320, and as shown in FIGS. 17A and 17B, in which the second arm 1308 of the user 1302 is received in the second arm feature 126b of the medical gown 100. For example, the user 1302 may insert the second arm 1306 fully or partially within the second arm feature 126b such that the second arm 1308 is within the second sleeve 129b. With the second arm 1308 of the user 1302 within the second arm feature 126b, at operation 2324, the second material portion 130b of the medical gown 100 may be caused to wrap partially around the torso 1304 of the user 1302 using a second subset of the plurality of retention features 180. For example, and as shown in FIGS. 18A and 18B, the fourth manipulation feature 822d may operate to move the second material portion 130b using the fourth retention feature 180d. In some cases, the fourth manipulation feature 822b may be engaged with the fourth retention feature 180d and may proceed in an arcuate path about a second side of the user 1302. The fourth retention feature 180b may be attached to the second strap feature 160, which is in turn attached to the second material portion 130b. In this regard, movement of the fourth manipulation feature 822d may cause the fourth retention feature 180d, the second strap feature 160, and the second material portion 130b to move, correspondingly, and wrap partially about the torso 1304.

At operation 2328, the first arm 1306 of the user 1302 is received through the second loop 162 of the medical gown 100. For example, and as shown in FIGS. 19A and 19B, the fourth manipulation feature 180d may continue moving about the torso 1304 until the second strap feature 160 presents at or adjacent to the first arm 1306. This may allow the user to insert the first arm 1306 into the first loop 142. With the first arm 1306 in the first loop 142, the fastening end 170 may present at or near a front side of the user 1302. The user 1302 may proceed at operation 2332, and as shown in FIGS. 20A and 20B, to secure the fastening feature 171 of the fastening end 170 to the main body 110 or other portion of the medical gown 100 for a snug fit, as desired.

Figure 23:
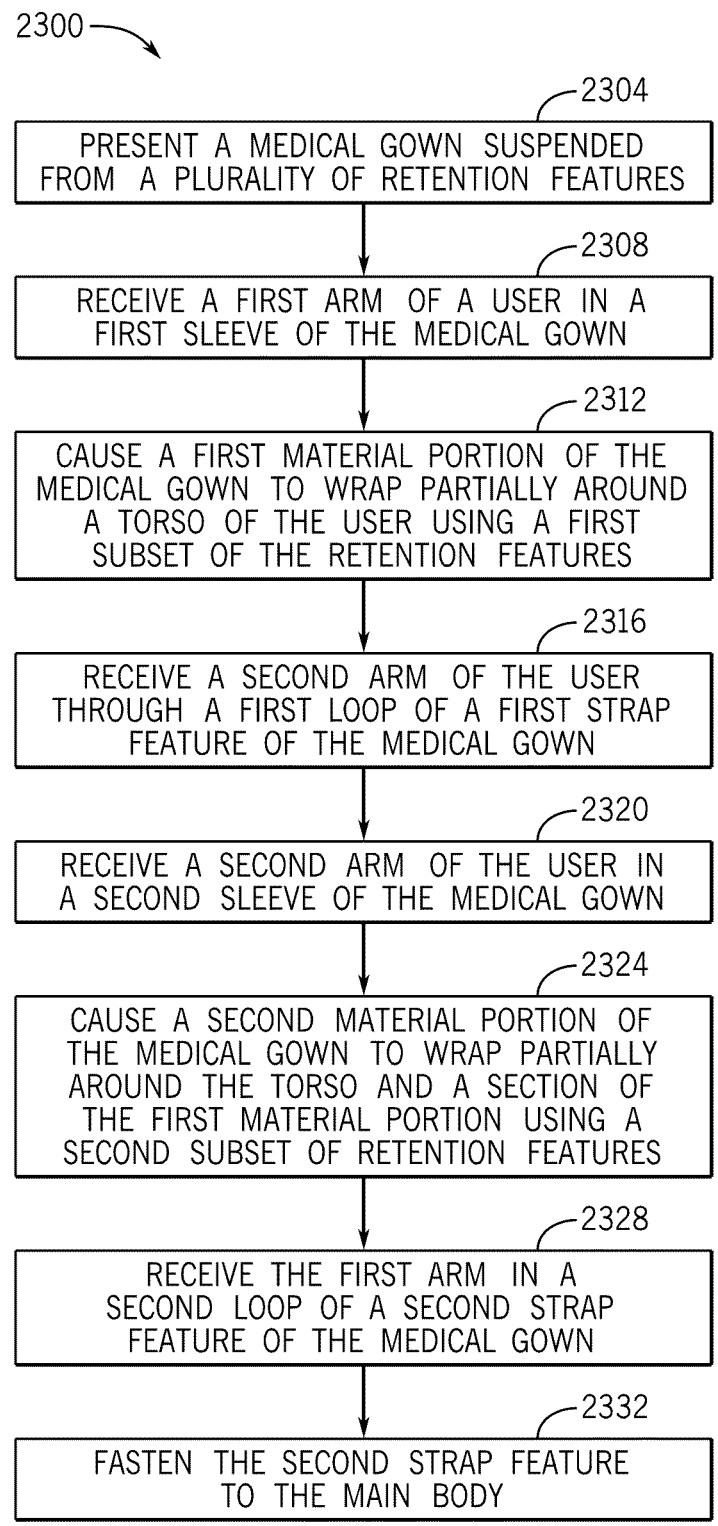
FIG. 23 depicts a flow diagram of a method of donning the medical gown.
Figure 32B:
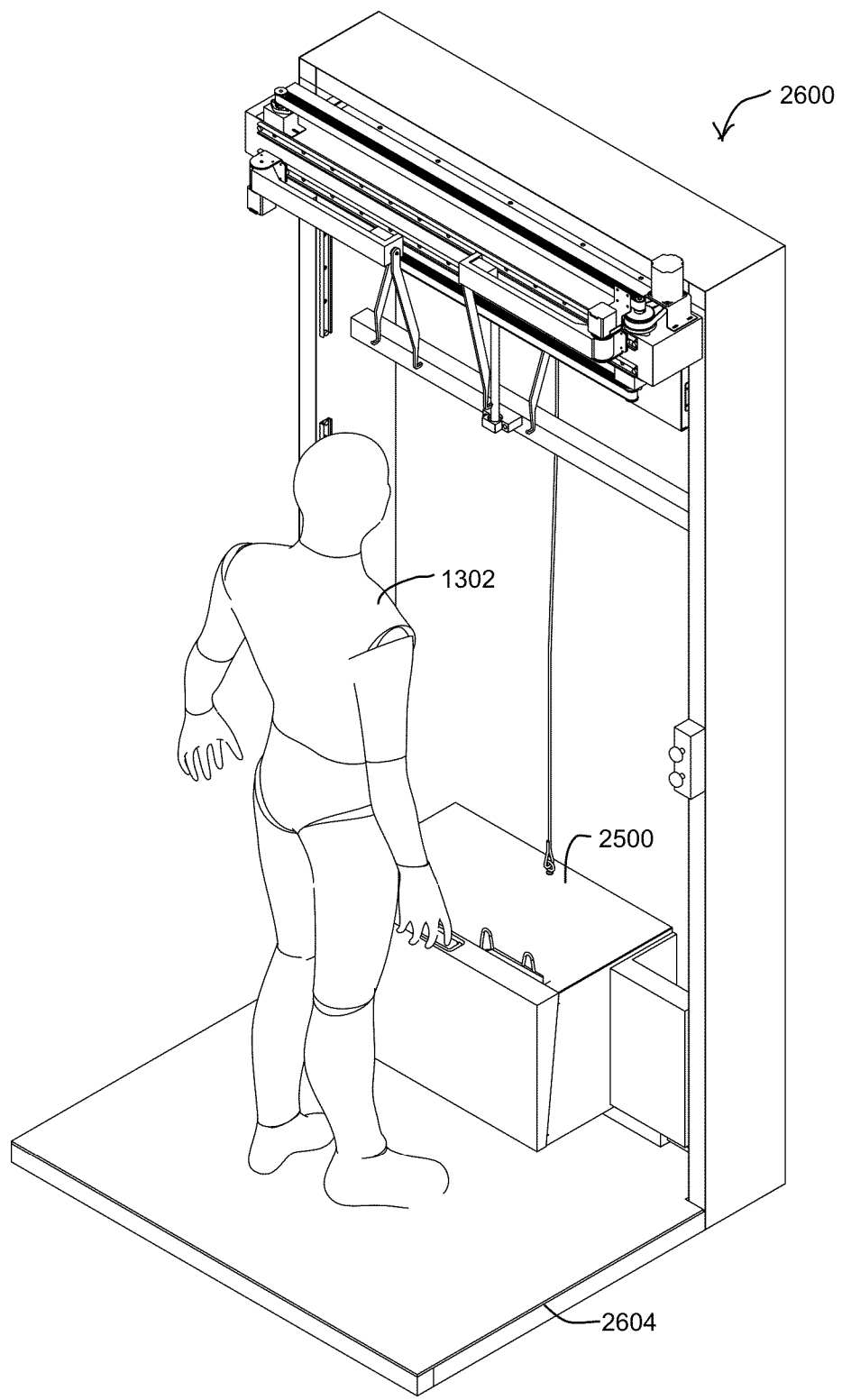
FIG. 32B depicts a perspective view of the operation of donning a medical gown of FIG. 32A.

The process 2300 of FIG. 23 may further be completed using a gown dispensing device 2600 including a gown container 2500 and a manipulation assembly 2400 as shown in FIG. 31. For example, and with reference to FIGS. 32A-32D, a gown may be dispensed from the gown dispensing device 2600 for donning by the user before operation 2304. With reference to FIG. 32A, a user 1302 may begin a process of donning a medical gown 100 using the gown dispensing device 2600 standing on or near the base 2604 of the gown dispensing device 2600. The gown dispensing device 2600 may begin at a neutral or starting position, with the arms 2414 and 2416 of the manipulation assembly 2400 folded entirely inward and the gown container 2500 at its lowest point with respect to the frame 2404. In some examples, the gown container 2500 may be in contact with the base 2604. The user 1302 may begin the gown donning process by actuating the control 2608 with a hand, foot, by standing on the base 2604, or other method. In some examples, the control 2608 may be actuated once to begin the entire process described herein. In other examples, the user 1302 may actuate the control 2608 to complete individual steps or operations of the process described herein. Generally, at the beginning of the gown donning process using the gown dispensing device 2600, the user is facing the gown dispensing device 2600, as shown in perspective view in FIG. 32B.

Figure 32C:
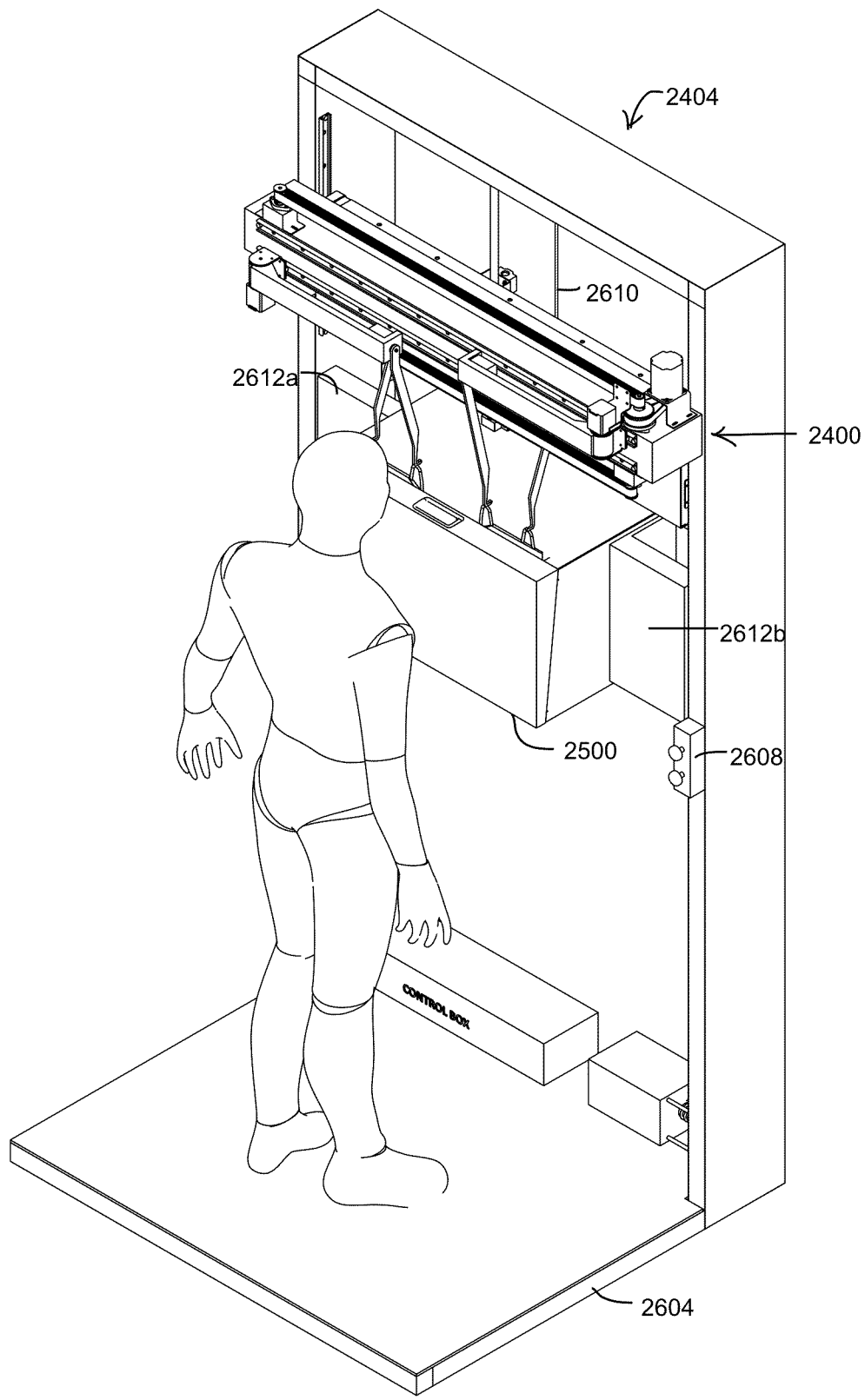
FIG. 32C depicts a perspective view of another operation of donning a medical gown.

With reference to FIG. 32C, at the beginning of the gown donning process, the gown container 2500 may move upward from the base 2604 and the manipulation assembly 2400 may move downward with respect to the frame 2404 until the manipulation features of the manipulation assembly engage with retention features of the gown 100 protruding from the gown container 2500. For example, the supports 2612a and 2612b may move upward along tracks 2606a and 2606b shown in FIG. 32A, while the manipulation assembly 2400 may move downward along tracks 2418a and 2418b. The supports 2612a and 2612b may move along the tracks 2606a and 2606b, respectively, responsive to an upward force on the gown container 2500 from the cord 2610, which forms part of a pulley assembly 2620 mounted on a top portion 2408 of the frame 2404 of the gown dispensing device.

Figure 32D:
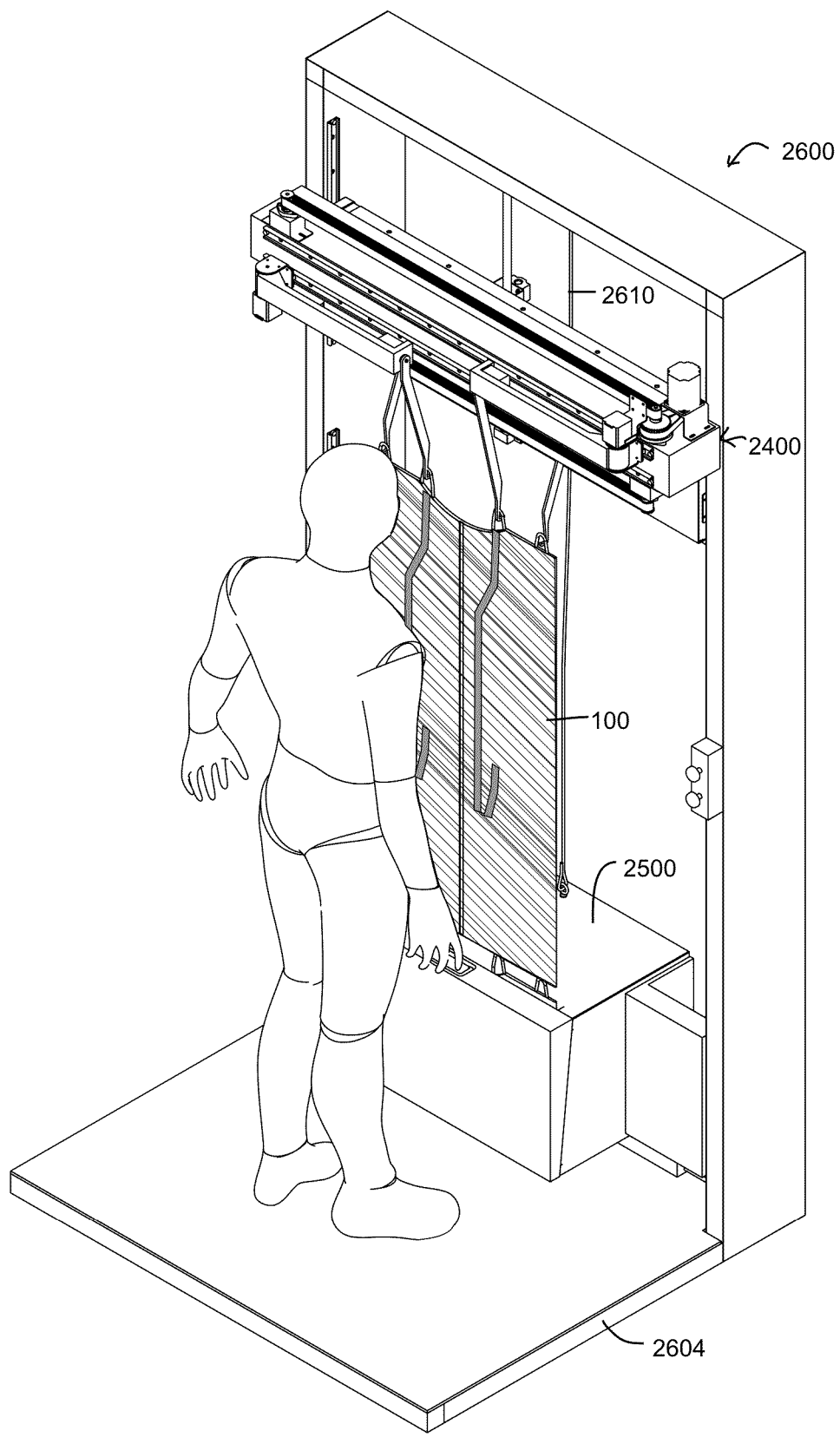
FIG. 32D depicts a perspective view of another operation of donning a medical gown.

With reference to FIG. 32D, after the manipulation features of the manipulation assembly 2400 engage with retention features of the gown 100, the gown container 2500 may move downward towards the base 2604 to pull the gown 100 from the gown container 2500 and suspend the gown 100 from the manipulation features. For example, the pulley 2620 may release the cord 2610, lengthening the cord 2610, causing the gown container 2500 to move downward to the base 2604.

Figure 33A:
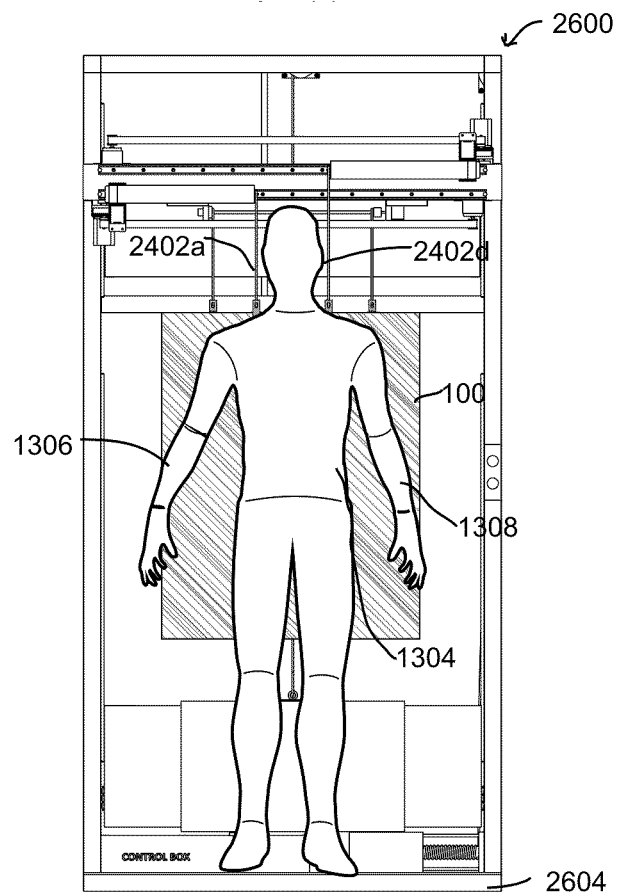
FIG. 33A depicts a rear view of another operation of donning a medical gown.
Figure 33B:
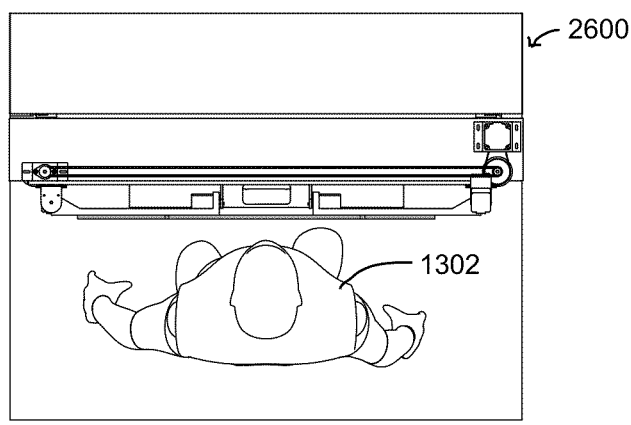
FIG. 33B depicts a top view of the operation of donning a medical gown of FIG. 33A.

With reference to the automated or substantially automated process 2300, at operation 2304, the medical gown 100 is presented suspended from a plurality of retention features. Steps for donning the disclosed gown using the gown dispensing device 2600 are shown, schematically and stepwise, at FIGS. 33A-40B. With reference to FIGS. 33A and 33B, the medical gown 100 is shown suspended from the gown dispensing device 2600 and the plurality of retention features 180 are engaged with corresponding manipulation features 2402a-2402d of the manipulation assembly 2400. In some examples, manipulation features 2402a and 2402d may be engaged with the first strap feature 140 and the second strap feature 160 directly (e.g., by hooking onto the strap features themselves). The medical gown 100 is shown in FIGS. 33A and 33B suspended from the gown dispensing device 2600 and presented at a front side of a user 1302. For purposes of illustration, the user 1302 is shown in FIGS. 33A and 33B as including a torso 1304, a first arm 1306 (e.g., a left arm) and a second arm 1308 (e.g., a right arm), standing on a base 2604 of the gown dispensing device 2600.

Figure 34A:
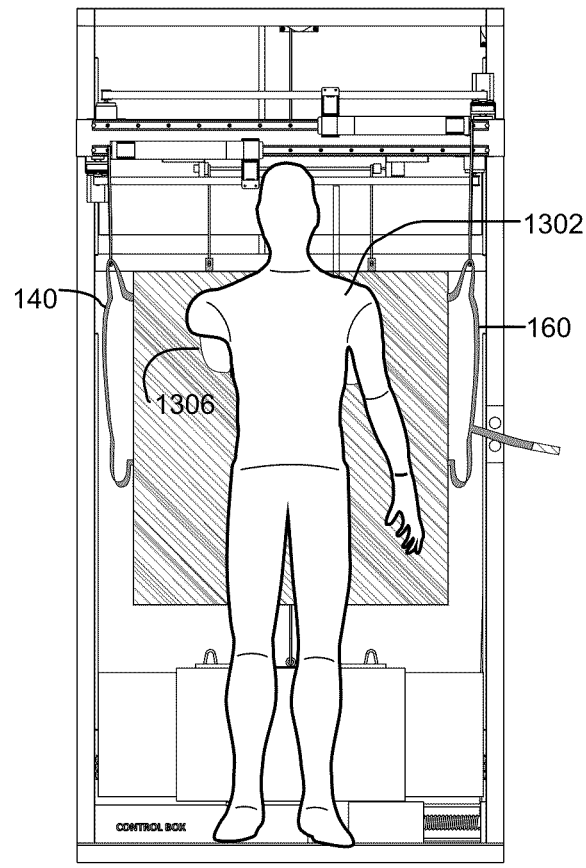
FIG. 34A depicts a rear view of another operation of donning a medical gown.
Figure 34B:
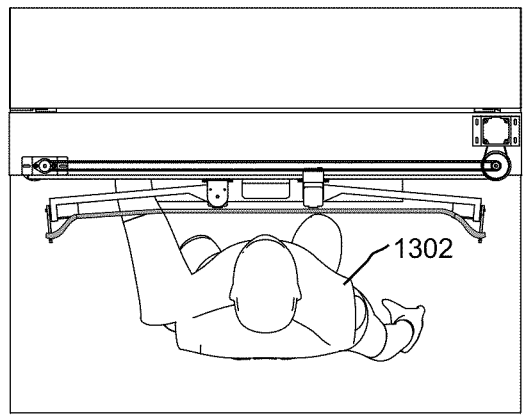
FIG. 34B depicts a top view of the operation of donning a medical gown of FIG. 34A.
Figure 35A:
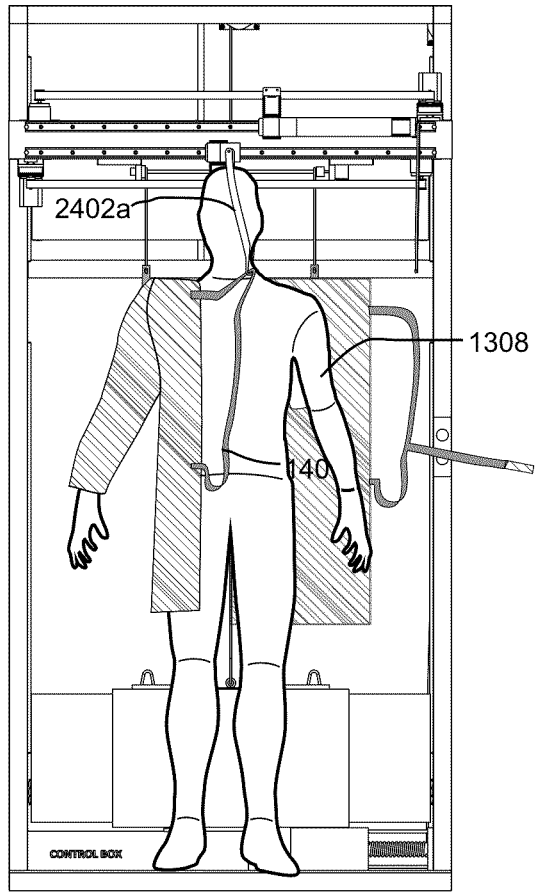
FIG. 35A depicts a rear view of another operation of donning a medical gown.
Figure 35B:
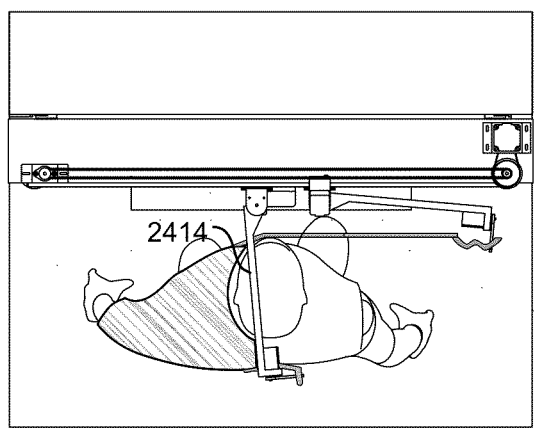
FIG. 35B depicts a top view of the operation of donning a medical gown of FIG. 35A.

Subsequently or in combination with the operation 2304, the medical gown 100 may be unfurled or unfolded. For example, the arms 2414 and 2416 of the manipulation assembly 2400 may swing outward with respect to the support 2412 of the manipulation assembly, unfolding the gown 100 my moving the retention features of the gown 100 as the arms 2414 and 2416 and manipulation features 2402a-2404d swing outward. Next, at operation 2308, the first arm 1306 of the user 1302 is received in the first arm feature 126a of the medical gown 100, as shown in FIGS. 34A and 34B. For example, the user 1302 may insert the first arm 1306 fully or partially within the first arm feature 126a such that the first arm 1306 is within the first sleeve 129a. With the first arm 1306 of the user 1302 within the first arm feature 126a, at operation 2312, the first material portion 130a of the medical gown 100 may be caused to wrap partially around the torso 1304 of the user 1302 using a first subset of the plurality of retention features 180. For example, as shown in FIGS. 35A and 35B, the arm 2414 may swing inward, moving the manipulation feature 2402a, connected to the first strap feature 140 in an arcuate path around the torso of the user 1302. The arm 2414 may further move along the track 2440a, laterally along the width of the gown dispensing device 2600, to facilitate movement of the first strap feature 140 around the user. In some examples, a first retention feature 180a may be attached to the first strap feature 140, which is in turn attached to the first material portion 130a. In this regard, movement of the manipulation feature 2402a may cause the first retention feature 180a, the first strap feature 140, and the first material portion 130a to move, correspondingly, and wrap partially about the torso 1304.

Figure 36A:
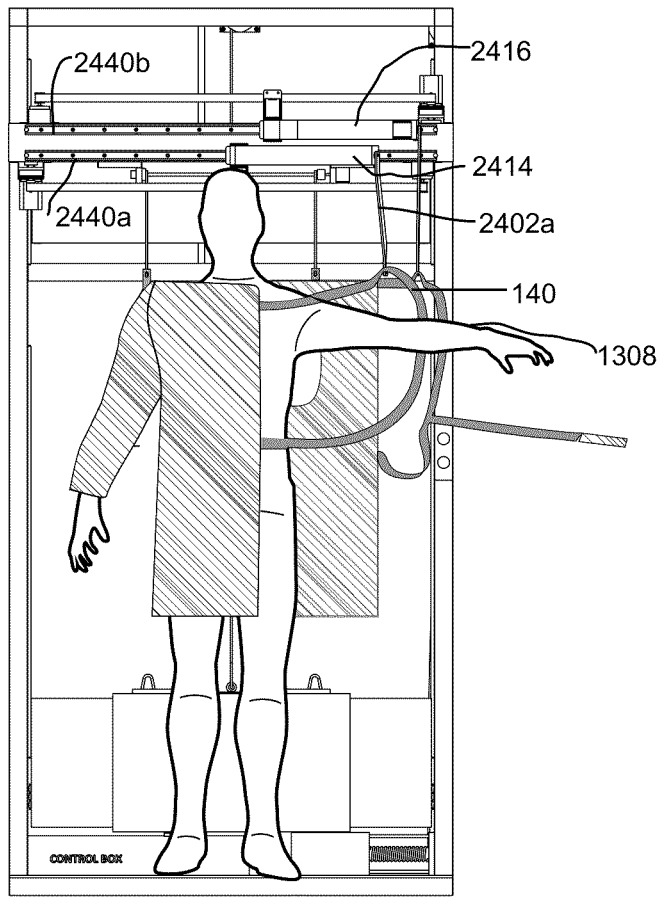
FIG. 36A depicts a rear view of another operation of donning a medical gown.
Figure 36B:
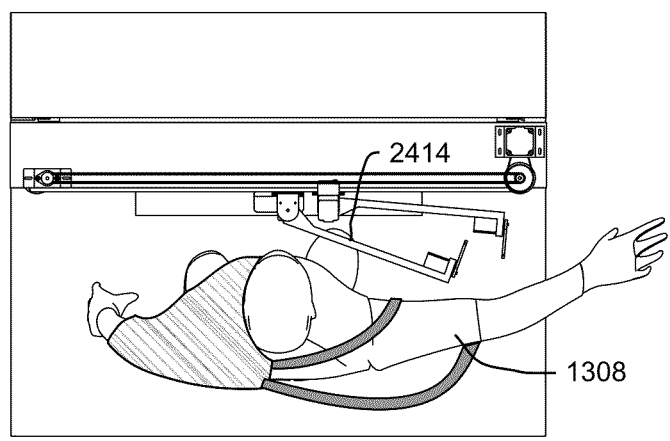
FIG. 36B depicts a top view of the operation of donning a medical gown of FIG. 36A.
Figure 37:
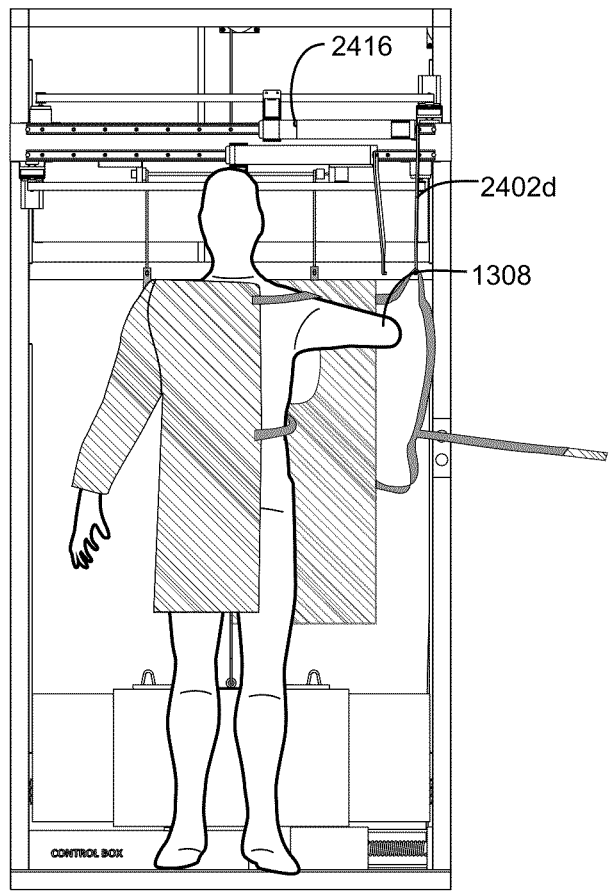
FIG. 37A depicts a rear view of another operation of donning a medical gown.
FIG. 37B depicts a top view of the operation of donning a medical gown of FIG. 37A.
Figure 37:
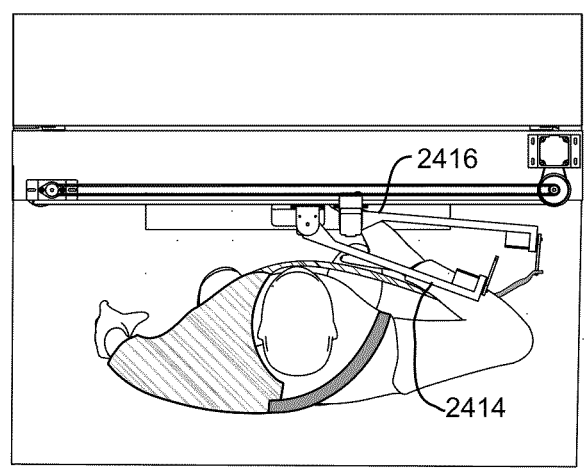

The manipulation feature 2402a may continue moving about the torso 1304 until the first strap feature 140 presents at or adjacent to the second arm 1308. Subsequently, at operation 2316, and as shown in FIGS. 36A and 36B, the second arm 1308 of the user 1302 is received through the first loop 142 of the first strap feature 140. The first strap feature 140 may include the elastic component 150. In this regard, the first strap feature 140 may be flexible and expandable in order to accommodate a shape of the user 1300 and facilitate the receipt of the second arm 1308 into the first loop. Then, when the second arm 1308 is received through the first loop 142, the elastic component 150 may be allowed to contract and cause the first strap feature 140 to substantially conform to the user 1302. In other cases, the elastic component 150 may be omitted and/or the first strap feature 140 may be secured via another manner, including uses fasteners of various types.

Figure 38A:
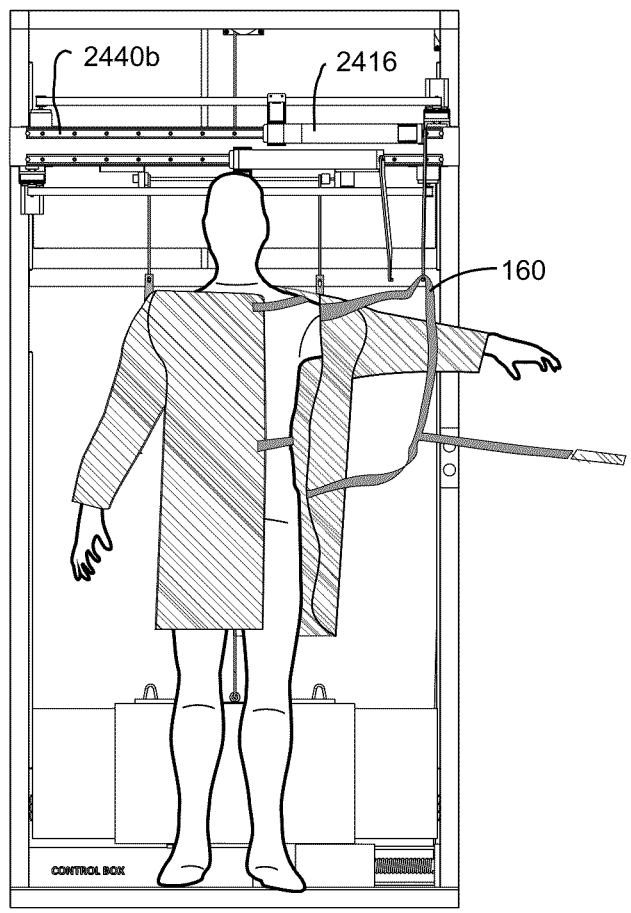
FIG. 38A depicts a rear view of another operation of donning a medical gown.
Figure 38B:
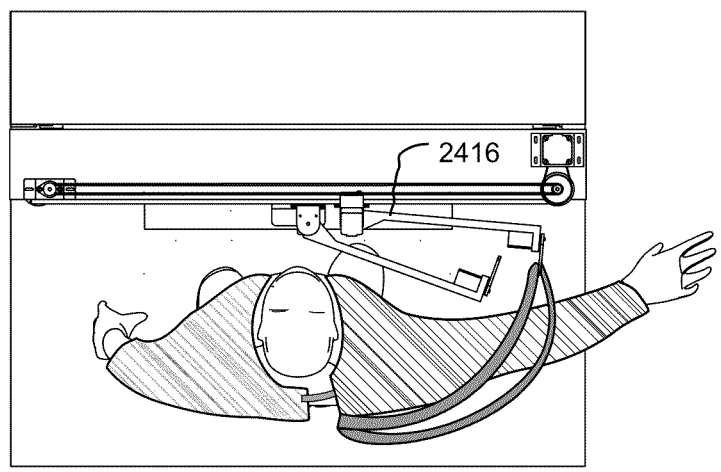
FIG. 38B depicts a top view of the operation of donning a medical gown of FIG. 38A.

The method of donning may proceed with operation 2320, and as shown in FIGS. 37A and 37B, in which the second arm 1308 of the user 1302 is received in the second arm feature 126b of the medical gown 100. For example, the user 1302 may insert the second arm 1306 fully or partially within the second arm feature 126b such that the second arm 1308 is within the second sleeve 129b. With the second arm 1308 of the user 1302 within the second arm feature 126b, at operation 2324, the second material portion 130b of the medical gown 100 may be caused to wrap partially around the torso 1304 of the user 1302 using a second subset of the plurality of retention features 180. For example, and as shown in FIGS. 38A and 38B, the manipulation feature 2402d may operate to move the second material portion 130b using the second strap feature 160 and/or the retention feature 180d. In some cases, the manipulation feature 2402d may be engaged with the retention feature 180d or the second strap feature 160 and may proceed in an arcuate path about a second side of the user 1302. The arm 2416 may further move laterally along the track 2440b, further facilitating movement of the manipulation feature 2402d about the user 1302. In some examples, the fourth retention feature 180b may be attached to the second strap feature 160, which is in turn attached to the second material portion 130b. In other examples, the manipulation feature 2402d may engage with the second strap feature 160. In this regard, movement of the manipulation feature 2402d may cause the retention feature 180d and/or the second strap feature 160, and the second material portion 130b to move, correspondingly, and wrap partially about the torso 1304.

Figure 39A:
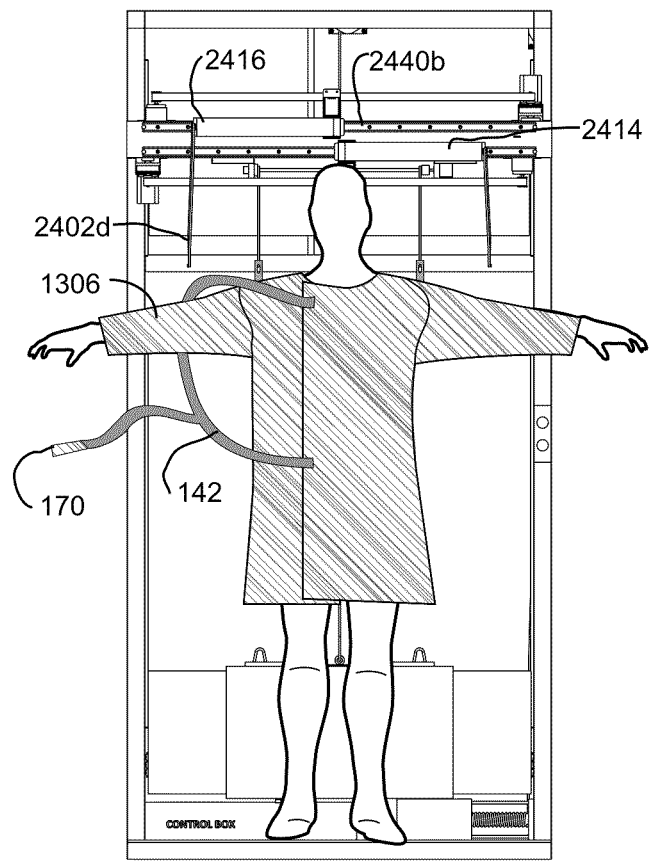
FIG. 39A depicts a rear view of another operation of donning a medical gown.
Figure 39B:
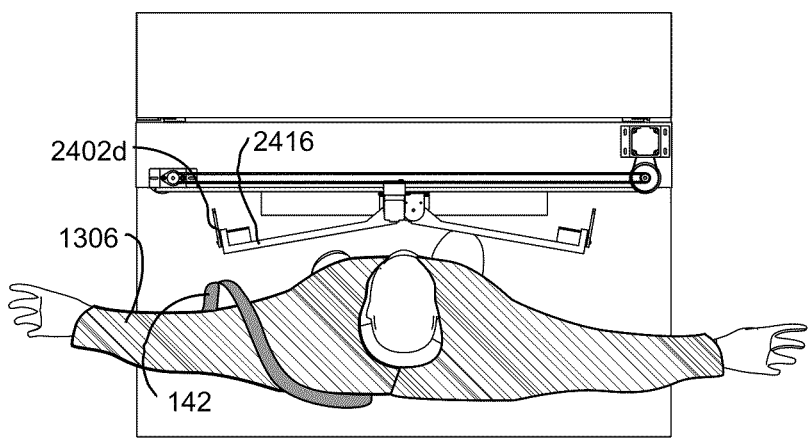
FIG. 39B depicts a top view of the operation of donning a medical gown of FIG. 39A.
Figure 40A:
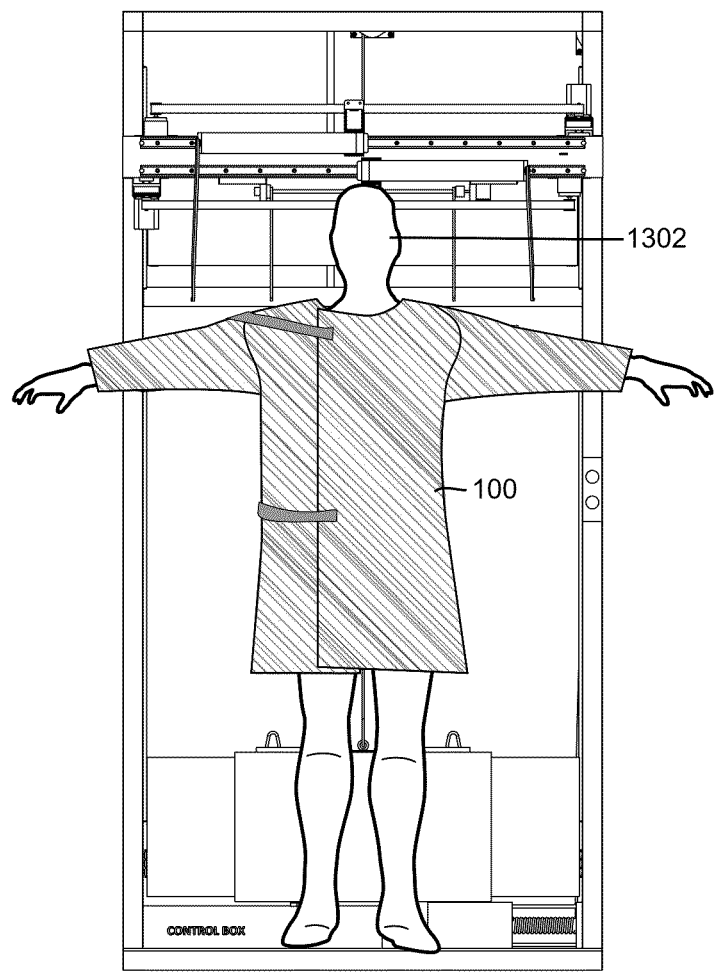
FIG. 40A depicts a rear view of another operation of donning a medical gown.
Figure 40B:
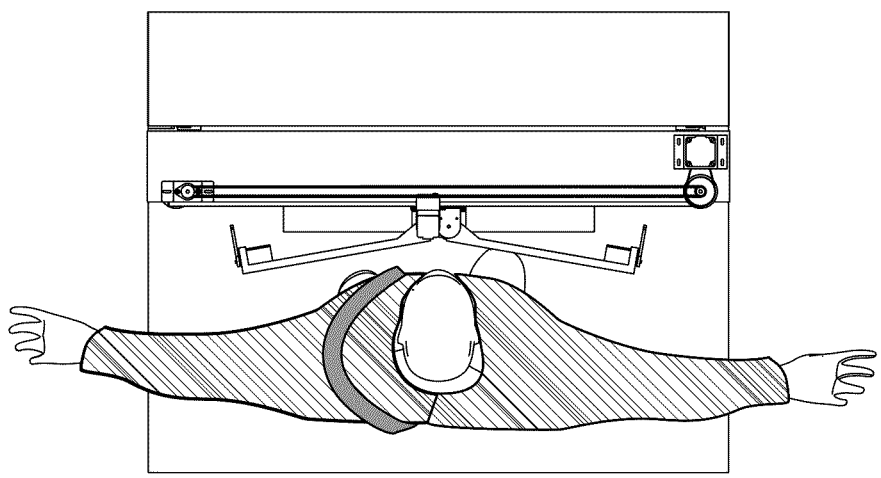
FIG. 40B depicts a top view of the operation of donning a medical gown of FIG. 40A.

At operation 2328, the first arm 1306 of the user 1302 is received through the second loop 162 of the medical gown 100. For example, and as shown in FIGS. 39A and 39B, the manipulation feature 2402d may continue moving about the torso 1304 until the second strap feature 160 presents at or adjacent to the first arm 1306. The arm 2416 may further continue moving along the track 2440b to facilitate the movement of the manipulation feature 2402d about the torso 1304. This may allow the user to insert the first arm 1306 into the first loop 142. With the first arm 1306 in the first loop 142, the fastening end 170 may present at or near a front side of the user 1302. The user 1302 may proceed at operation 2332, and as shown in FIGS. 40A and 40B, to secure the fastening feature 171 of the fastening end 170 to the main body 110 or other portion of the medical gown 100 for a snug fit, as desired.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A device for donning a gown, comprising:
   a support structure; and
   a manipulation assembly, the manipulation assembly comprising:
   a first engagement arm,
   a second engagement arm,
   a first hinge assembly allowing horizontal movement of the first engagement arm relative to the support structure,
   a second hinge assembly allowing horizontal movement of the second engagement arm relative to the support structure,
   each of the first engagement arm and the second engagement arm comprising a one or more manipulation features for engaging a retention feature of the gown, and
   wherein at least one of the first engagement arm and the second engagement arm is movable along a portion of the width of the support structure.

2. The device of claim 1, wherein at least one of the first or second engagement arm is movable relative to the other of the first or second engagement arm.

3. The device of claim 1, wherein the at least one of the first or second engagement arm is movable to unfold the gown.

4. The device of claim 1, wherein the at least one of the first or second engagement arm are movable to assist a user of the device in donning the gown.

5. The device of claim 1, further comprising:
   a gown storage container, the gown storage container retains a plurality of gowns including the gown, the plurality of gowns being contained in a packaging assembly.

6. The device of claim 5, wherein the packaging assembly is one of a stack or a roll.

7. The device of claim 5, wherein the gown storage container is movable relative to the support structure.

8. The device of claim 7, wherein the plurality of manipulation features engage the retention feature of the gown responsive to the movement of the gown storage container relative to the support structure.

9. A system for donning a medical gown, comprising:
   a device for hanging and manipulating the medical gown comprising:
   a frame;
   an engagement arm,
   a manipulation feature rotatably coupled with the engagement arm for engaging a feature of the medical gown, and
   wherein the engagement arm is movable along a portion of a width of the frame; and
   a gown storage container.

10. The system of claim 9, wherein the gown storage container comprises at least two medical gowns.

11. The system of claim 10, wherein the medical gown comprises;
- a main body having a neck edge, a first side edge, and a second side edge, wherein
- the first side edge extends from the neck edge,
- the second side edge extends from the neck edge, opposite the first side edge, and
- the neck edge defines a neck engagement feature between the first and second side edges;
- a first strap feature coupled with the main body and defining a first loop with the first side edge;
- a second strap feature coupled with the main body and defining a second loop with the second side edge; and
- a plurality of retention tabs coupled to the medical gown, wherein each retention tab of the plurality of retention tabs comprises:
  - a strip of material protruding from the medical gown,
  - a first end fixed to the medical gown,
  - a second end opposite the first end and moveable relative to the medical gown, and
  - an aperture extending through the strip of material, wherein the aperture is configured to suspend the medical gown from the manipulation feature of a gown dispensing device.

12. The system of claim 10, wherein the at least two medical gowns are at least partially folded and arranged in the packaging assembly in one of a roll, or a stack.

13. The device of claim 1, wherein:
- the first hinge assembly is defined in part by a first socket portion of the first engagement arm; and
- the second hinge assembly is defined in part by a second socket portion of the first engagement arm.

14. The device of claim 1, wherein the manipulation assembly further comprises:
- one or more motors operatively associated with at least one of the first engagement arm or the second engagement arm; and
- wherein the one or more motors are configured to rotate the at least one of the first engagement arm about the first hinge assembly or the second engagement arm about the second hinge assembly.

15. The device of claim 1, wherein the manipulation assembly further comprises:
- a track extending across a portion of the width of the support structure, and
- wherein the track allows at least one of the first engagement arm or the second engagement arm to move along the portion of the width of the support structure.

16. The device of claim 15, wherein at least one of the first hinge assembly or second hinge assembly is coupled to the track.

17. The device of claim 1, wherein the manipulation features are rotatable relative to each of the first engagement arm and the second engagement arm.

18. The system of claim 9, wherein the device further comprises:
- a hinge assembly allowing rotational movement of the engagement arm relative to the frame.

19. The system of claim 9, wherein the gown storage container is movable between a first position at a base of the frame and a second position above the base of the frame.

20. The system of claim 9, wherein the device further comprises:
- a track extending across a portion of the width of the support structure, and
- wherein the track allows at least one of the first engagement arm or the second engagement arm to move along a portion of the width of the support structure.

* * * * *